United States Patent [19]
Akiyama et al.

[11] Patent Number: 5,982,530
[45] Date of Patent: Nov. 9, 1999

[54] APPARATUS FOR DRIVING AN OPTICAL MODULATOR TO MEASURE, AND COMPENSATE FOR, DISPERSION IN AN OPTICAL TRANSMISSION LINE

[75] Inventors: Yuichi Akiyama; George Ishikawa; Hiroki Ooi; Shigeki Watanabe, all of Kawasaki, Japan

[73] Assignee: Fujitsu Limited, Kawasaki, Japan

[21] Appl. No.: 09/245,920

[22] Filed: Feb. 8, 1999

Related U.S. Application Data

[62] Division of application No. 09/045,121, Mar. 20, 1998.

[30] Foreign Application Priority Data

Aug. 28, 1997 [JP] Japan .................................. 9-232011

[51] Int. Cl.$^6$ ...................................................... G02F 1/01
[52] U.S. Cl. .......................... 359/279; 359/245; 359/259; 385/2; 385/3; 356/345
[58] Field of Search .................................. 359/237, 238, 359/245, 259, 279, 618, 629, 634; 385/2, 3, 9; 356/345

[56] References Cited

U.S. PATENT DOCUMENTS

| | | | |
|---|---|---|---|
| 5,359,449 | 10/1994 | Nishimoto et al. | 359/245 |
| 5,400,417 | 3/1995 | Allie et al. | 385/2 |
| 5,420,868 | 5/1995 | Chraplyvy et al. | 359/238 |
| 5,428,697 | 6/1995 | Dolfi et al. | 359/245 |
| 5,432,634 | 7/1995 | Dupont et al. | 359/245 |
| 5,644,665 | 7/1997 | Burne et al. | 385/3 |
| 5,724,459 | 3/1998 | Banba et al. | 385/3 |
| 5,835,212 | 11/1998 | Kissa et al. | 356/345 |

FOREIGN PATENT DOCUMENTS

| | | |
|---|---|---|
| A-63-3236 | 1/1988 | Japan . |
| A-02-269309 | 11/1990 | Japan . |

*Primary Examiner*—Loha Ben
*Attorney, Agent, or Firm*—Staas & Halsey

[57] ABSTRACT

An apparatus includes a driving voltage generator that generates a pulse driving voltage having a rising edge and a decaying edge. An optical modulator produces a first pulse at the rising edge of the pulse driving voltage and a second pulse at the decaying edge of the pulse driving voltage. Therefore, the first and second pulses are both produced from a single driving pulse voltage. The frequency of the first pulse is determined by the slope of the rising edge of the pulse driving voltage and the frequency of the second pulse is determined by the slope of the decaying edge of the pulse driving voltage. The first and second pulses are transmitted through a transmission line. A detection device detects the first and second pulses after being transmitted through the transmission line. A processor then determines the amount of dispersion in the transmission line by comparing the time interval between the detected first and second pulses to the time interval of the first and second pulses before being transmitted. Generally, the optical modulator is a Mach-Zehnder modulator driven with a pulse driving voltage exceeding the half-wavelength voltage of the modulator.

11 Claims, 30 Drawing Sheets

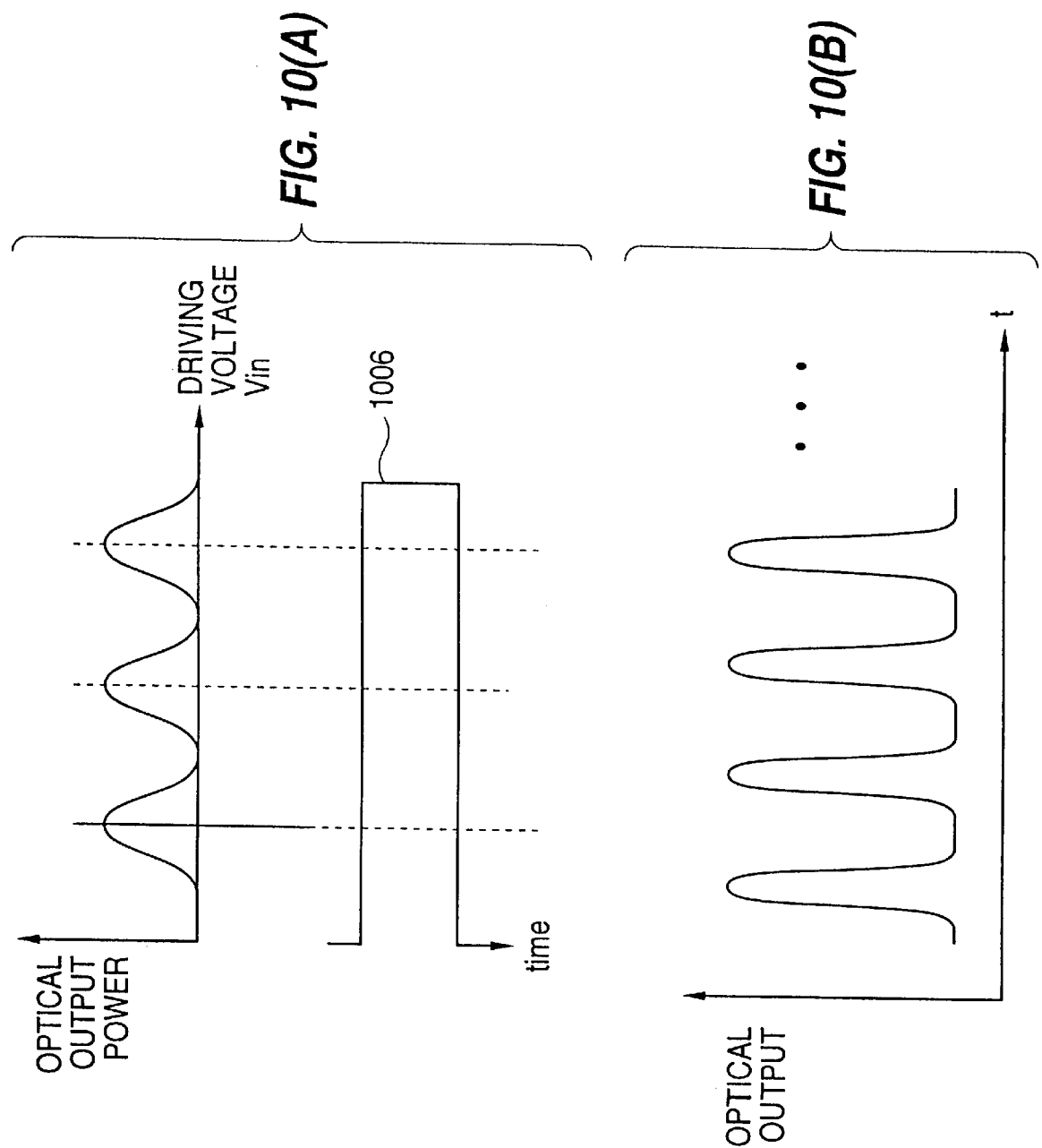

200ps/div

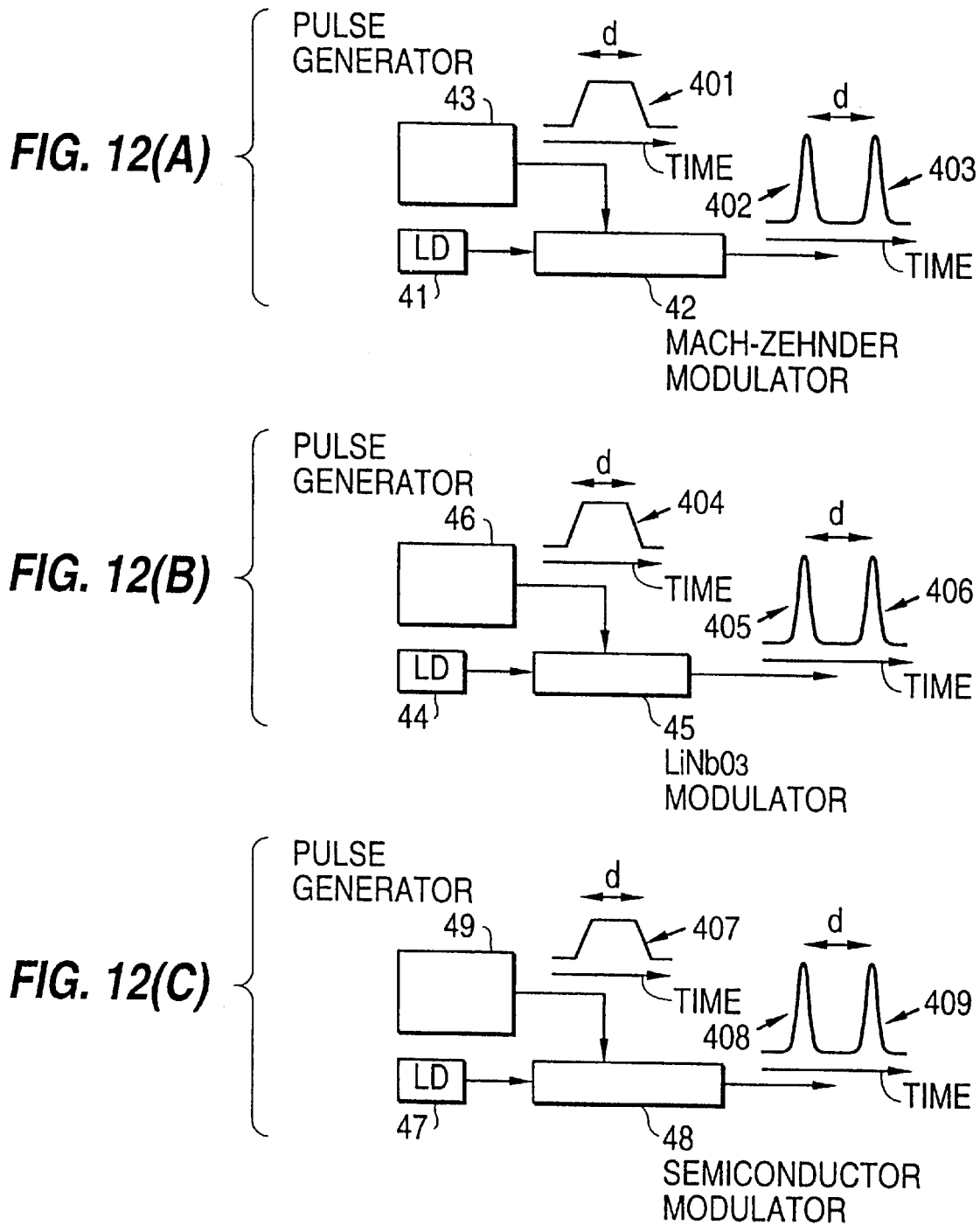

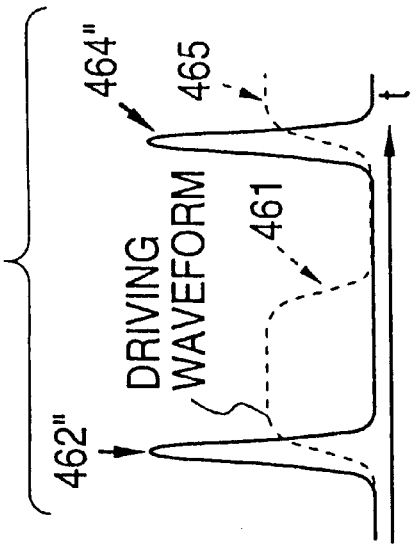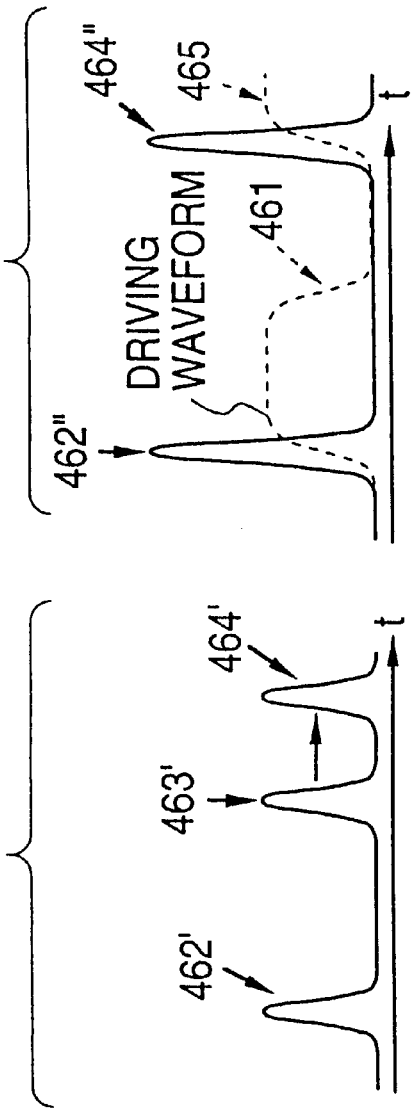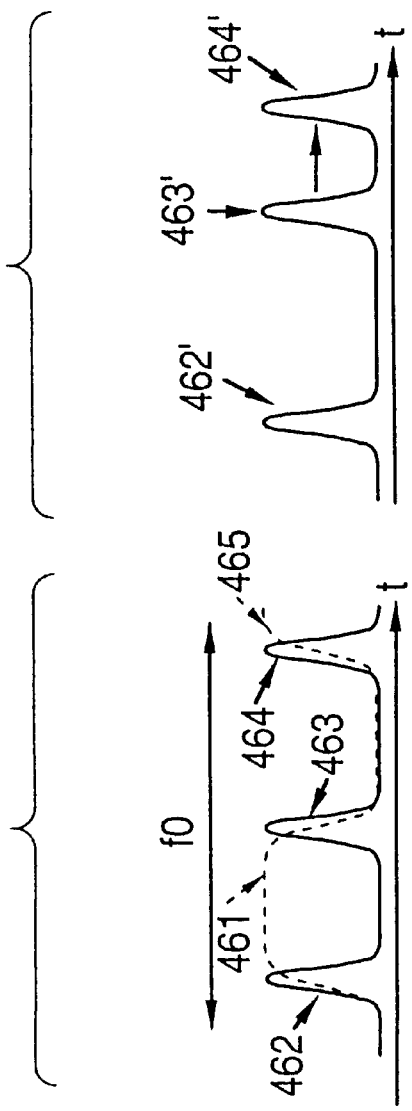

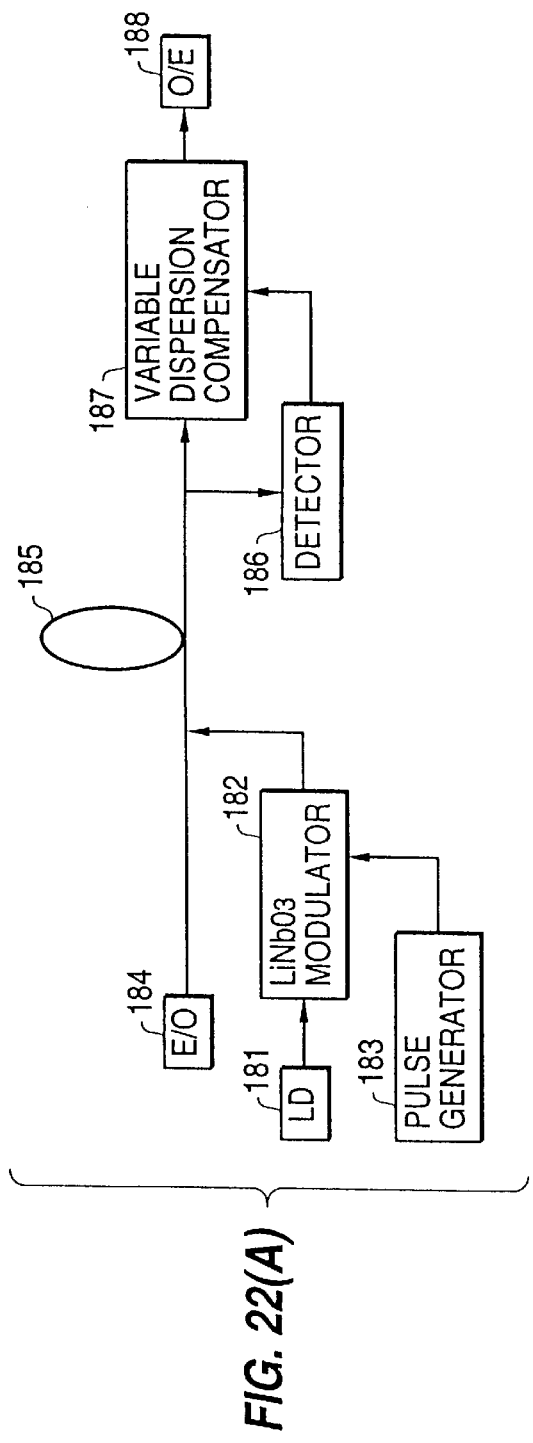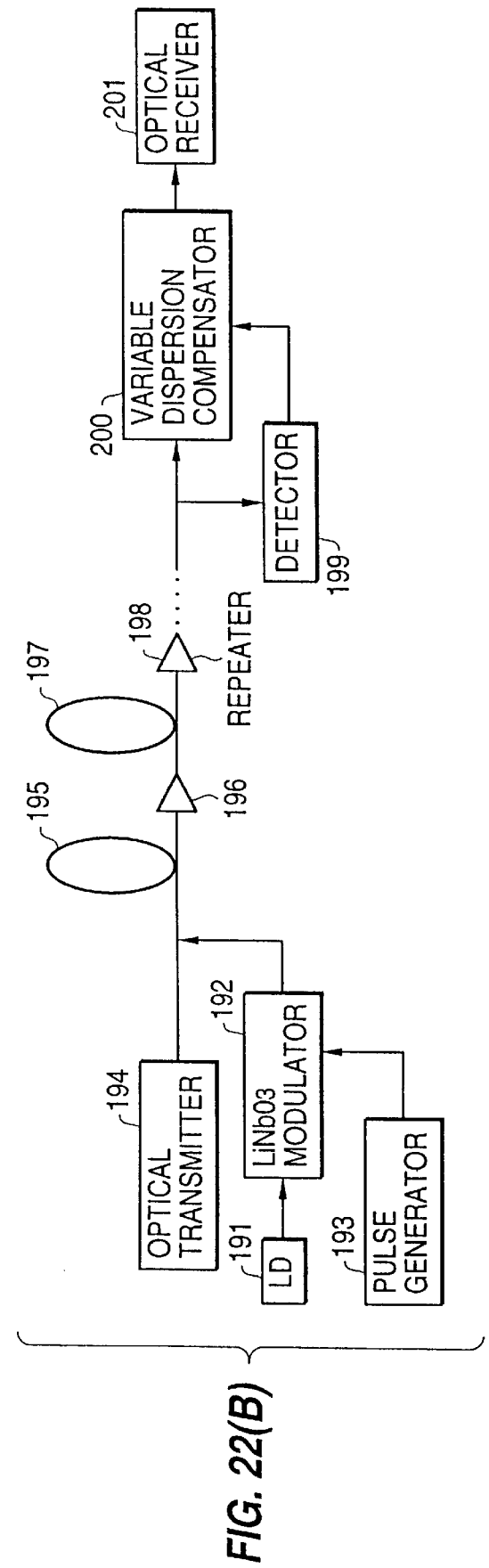
FIG. 22(A)
FIG. 22(B)

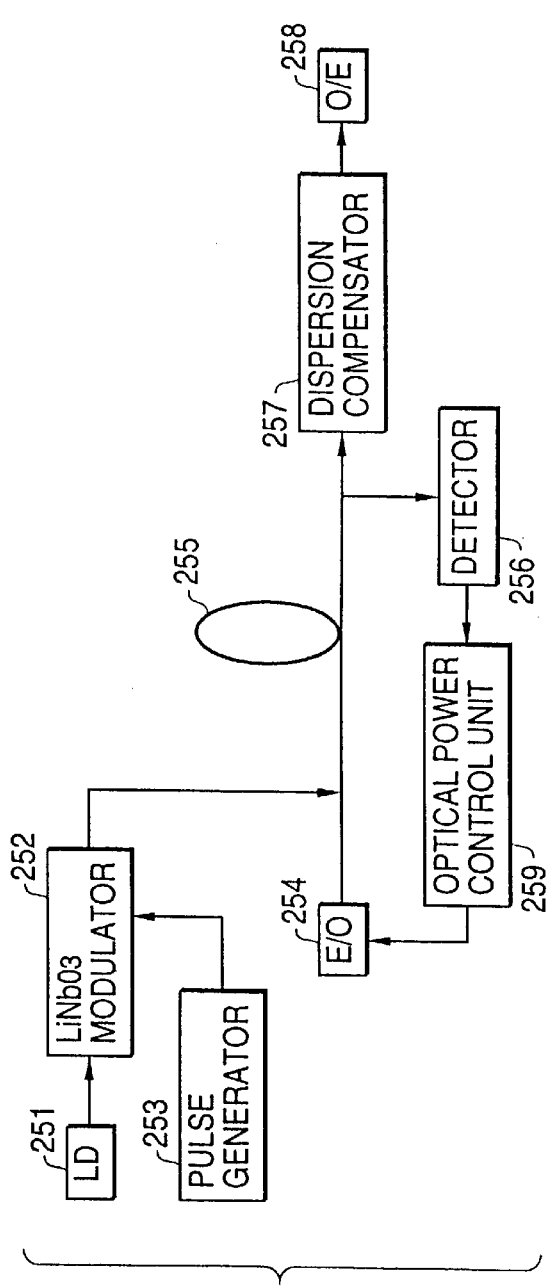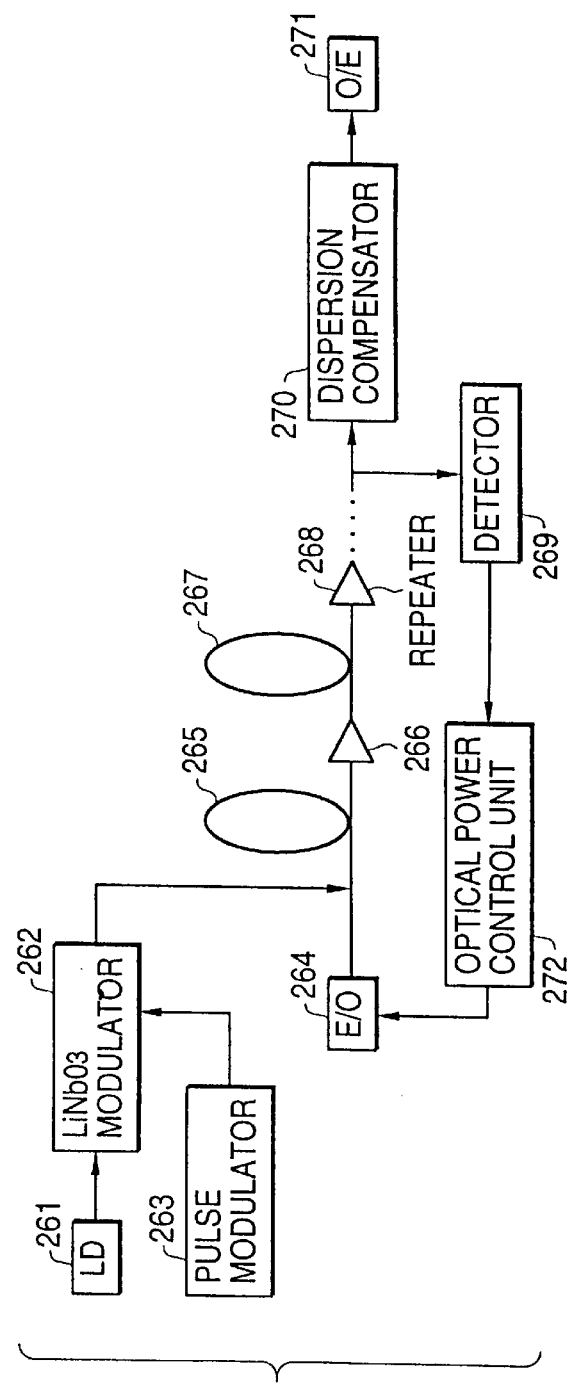

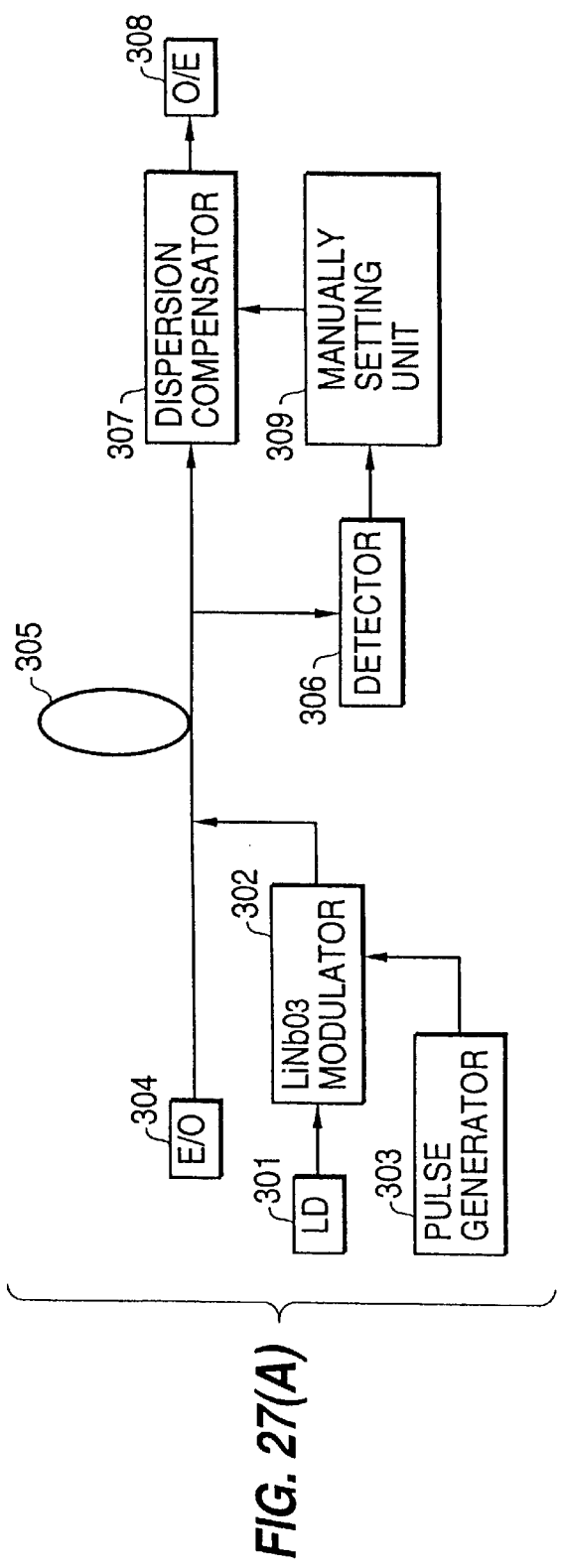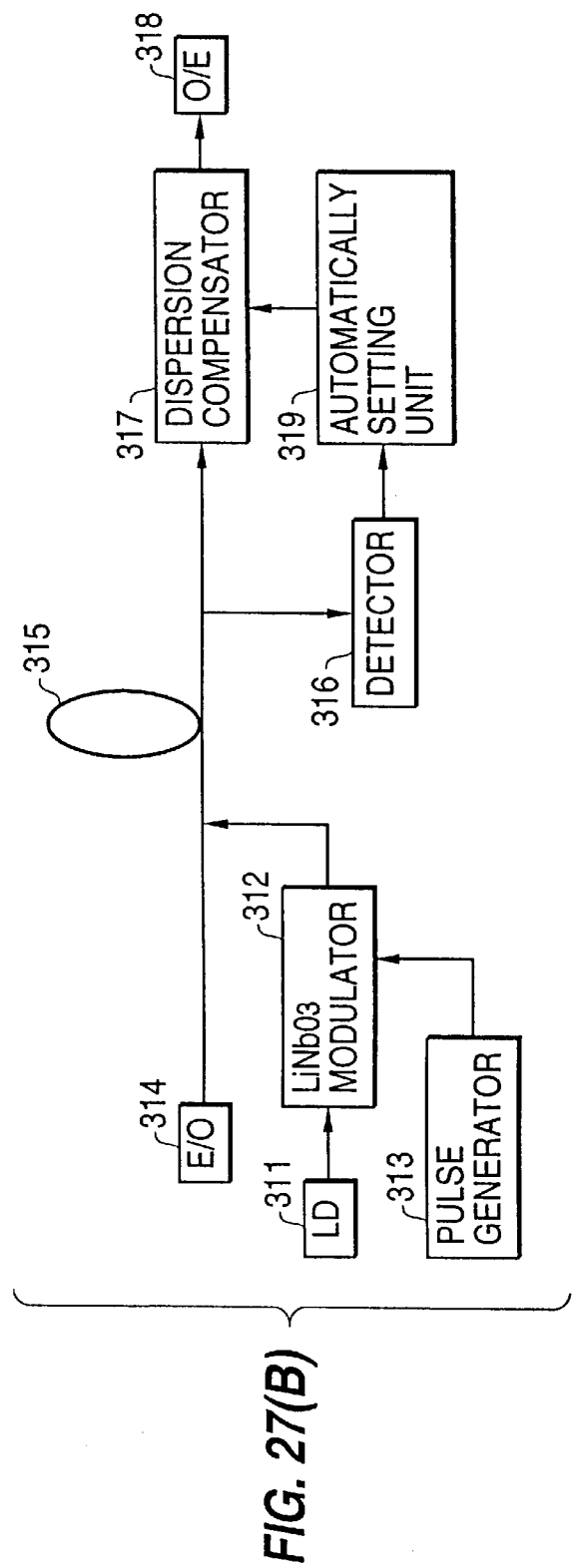

APPARATUS FOR DRIVING AN OPTICAL MODULATOR TO MEASURE, AND COMPENSATE FOR, DISPERSION IN AN OPTICAL TRANSMISSION LINE

CROSS-REFERENCE TO RELATED APPLICATIONS

This application is a Divisional of application Ser. No. 09/045,121, filed Mar. 20, 1998, now pending.

This application is based on, and claims priority to, Japanese application number 09-232011, filed Aug. 28, 1997, in Japan, and which is incorporated by reference.

BACKGROUND OF THE INVENTION

1. Field of the Invention

The present invention relates to the driving of an optical modulator and, more particularly, to the driving of an optical modulator to measure, and compensator for, dispersion in an optical transmission line.

2. Description of the Related Art

Optical transmission systems using fiber optical transmission lines are being used to transmit relatively large amounts of information. For example, optical transmission systems at 10 Gb/s are now in practical use. However, as users require larger amounts of information to be rapidly transmitted, and as more users are connected to the systems, a further increase in the capacity of optical transmission systems is required.

In an optical transmission system having a transmission speed equal to or higher than 10 Gb/s, the transmission wavelength is deteriorated by wavelength dispersion so that it becomes difficult to continue transmitting data. As a result, dispersion compensation must be performed.

For example, if a signal light having a wavelength of 1.55 $\mu$m is transmitted through an optical transmission system at a transmission speed equal to or higher than 10 Gb/s, using a 1.3 $\mu$m non-dispersion single mode fiber, then the wavelength dispersion increases by 18 ps/nm/km. This increase in wavelength dispersion is relatively high, thereby requiring dispersion compensation to be performed.

In an optical transmission system having a transmission speed equal to or lower than 10 Gb/s, the range of dispersion tolerance is relatively large, and dispersion compensation can be performed by commonly applying a dispersion compensator having a predetermined dispersion value. For example, when a signal light of 1.55 $\mu$m in wavelength is transmitted through a 1.3 $\mu$m non-dispersion single mode fiber (SMF), the dispersion tolerance is about 800 ps/nm. Therefore, a system can be designed in such a way that a dispersion compensator having a predetermined dispersion value, such as a dispersion compensation fiber (DCF) or a fiber grating, is commonly applied for short distance (for example, 20 km through 40 km) transmission systems using a 1.3 $\mu$m non-dispersion single mode fiber.

On the other hand, in an optical transmission system having a transmission speed equal to or higher than 10 Gb/s, the range of dispersion compensation tolerance is small, thereby requiring dispersion compensation to be performed with high precision. As a result, the change of dispersion in the transmission line must be measured and then dispersion compensation must be optimized.

FIGS. 29(A) and 29(B) show the results of an experiment indicating the relatively small amount of dispersion compensation tolerance at a transmission speed of 40 Gb/s.

More specifically, FIG. 29(A) is a diagram illustrating an optical transmission system, and FIG. 29(B) is a graph illustrating the deterioration of reception sensitivity (power penalty) versus the dispersion compensation ratio of the optical transmission system. Referring now to FIGS. 29(A) and 29(B), a signal is transmitted at 40 Gb/s from a transmission unit 341 through a 1.3 $\mu$m non-dispersion single mode fiber 342 for 50 km, and is then received by a receiving unit 344. Wavelength dispersion occurs at 920 ps/nm. Therefore, by adjusting the length of a dispersion compensation fiber 443, the wavelength dispersion of the 1.3 $\mu$m non-dispersion single mode fiber 342 can be compensated for.

As indicated by FIG. 29(B), when a power penalty equal to or less than 1 dB is an acceptable transmission condition, the dispersion compensation tolerance is only 30 ps/nm. Therefore, accurate dispersion compensation is required. However, in the existing transmission line using the 1.3 $\mu$m non-dispersion single mode fiber 342, the amount of dispersion is not correctly computed at a number of points. Furthermore, since the amount of dispersion changes with time, depending on, for example, the temperature or the stress applied to an optical fiber, the amount of the dispersion compensation should be appropriately set for each of such intermediate points by accurately measuring the amount and change of dispersion.

Recently, 1.55 $\mu$m non-dispersion shift fibers (DSF) have been adopted to perform extra-high-speed data transmission. The wavelength dispersion occurring when a signal light having the wavelength of 1.55 $\mu$m is transmitted through this fiber is equal to or smaller than ±2 ps/nm/km, and the influence of this dispersion is smaller than that with the 1.3 $\mu$m non-dispersion single mode fiber.

However, when the transmission speed is equal to or higher than 40 Gb/s, the dispersion compensation tolerance is very small so that dispersion compensation is required even if the 1.55 $\mu$m non-dispersion shift fiber is used. As a result, the amount of dispersion compensation should be constantly set to an optimum value to further prevent deterioration in transmission with time, as with the 1.3 $\mu$m non-dispersion single mode fiber.

FIGS. 30(A) and 30(B) are diagrams illustrating the conventional measurement of dispersion in an optical transmission system.

More specifically, FIG. 30(A) illustrates a twin-pulse method of measuring the wavelength dispersion. In the twin-pulse method, a group delay time difference is directly measured from the interval of pulses, to measure the wavelength dispersion.

Referring now to FIG. 30(A), a pulse signal output from a pulse generator 351 is provided to laser diodes 354 and 355 through drive units 352 and 353, respectively. Upon receipt of a pulse signal from drive unit 352, laser diode 354 outputs an optical pulse having a wavelength $\lambda 1$. Similarly, upon receipt of a pulse signal from drive unit 353, laser diode 355 outputs an optical pulse having a wavelength $\lambda 2$.

The optical pulse having the wavelength $\lambda 1$ output from laser diode 354 and the optical pulse having the wavelength $\lambda 2$ output from laser diode 355 are provided to an optical fiber 357 through a half mirror 356, and transmitted to a detector 358 through optical fiber 357.

When the optical pulses having the wavelengths $\lambda 1$ and $\lambda 2$ are transmitted through optical fiber 357, detector 358 outputs a detection result to a sampling oscilloscope 359. Sampling oscilloscope 359 compares the arrival time of the pulse signal received from pulse generator 351 through a delay circuit 360 with the arrival time of the optical pulses detected by detector 358. The amount of dispersion is obtained by detecting the delay difference between the two optical pulses after transmission through optical fiber 357.

FIG. 30(B) illustrates a phase method of measuring the wavelength dispersion. According to the phase method, the group delay time difference is not directly measured, but the wavelength dispersion is obtained from the phase difference between the optical modulation signals generated by the group delay time difference.

Referring now to FIG. 30(B), a synthesizer 371 modulates an optical signal output from laser diodes 372 through 374. Laser diode 372 outputs an optical signal having a wavelength λ1, laser diode 373 outputs an optical signal having a wavelength λ2, and laser diode 374 outputs an optical signal having a wavelength λ3. The optical signals output from laser diodes 372 through 374 are switched by an optical switch 375, provided to an optical fiber 376, and transmitted to an avalanche photodiode 377 through optical fiber 376.

Avalanche photodiode 377 converts the optical signal transmitted through optical fiber 376 into an electric signal, and outputs the electric signal to a vector voltmeter 379 through an amplifier 378. Vector voltmeter 379 compares the electric signal transmitted from synthesizer 371 with the electric signal transmitted from amplifier 378, and obtains the phase difference between the optical modulation signals, thereby computing the amount of dispersion.

However, a relatively large number of parts, such as laser diodes, are required by a conventional optical transmission system when the dispersion measurement systems shown in FIGS. 30(A) or 30(B) are incorporated into a transmitting/receiving unit as a part of the transmission system in order to set the amount of dispersion compensation to an optimum value. Therefore, the entire system becomes large and costly.

SUMMARY OF THE INVENTION

Accordingly, it is an object of the present invention to provide a small and inexpensive dispersion measurement device which can easily be incorporated into an optical transmission system, especially in an optical transmission system having a transmission speed equal to or higher than 10 Gb/s.

Additional objects and advantages of the invention will be set forth in part in the description which follows, and, in part, will be obvious from the description, or may be learned by practice of the invention.

Objects of the present invention are achieved by providing an (optical modulator which produces an optical output at a power level which increases and decreases in accordance with an increasing driving voltage for driving the optical modulator. A driving voltage setting device sets the driving voltage to increase and decrease the power level of the optical output.

Objects of the present invention are also achieved by providing an optical modulator which modulates an input light to produce a plurality of optical pulses having different wavelengths in accordance with a single pulse driving voltage for driving the optical modulator. A driving voltage generator generates the pulse driving voltage.

Objects of the present invention are achieved by providing a first optical modulator which modulates a first light and provides the modulated first light to a transmission line. A second optical modulator modulates a second light and provides the modulated second light to the transmission line. An optical device, such as a filter, retrieves the second light from the transmission line. A dispersion computation device computes an amount of dispersion in the transmission from the retrieved second light.

Further, objects of the present invention are achieved by providing a method of driving an optical modulator with a driving voltage. The optical modulator has an output power versus driving voltage characteristic curve indicating a periodical waveform. The method includes the steps of: (a) a first step of driving the optical modulator with a driving voltage which causes the optical modulator to produce an optical signal at a power level corresponding to the lowest point in the periodical waveform; (b) a second step, performed after the first step, of driving the optical modulator with a driving voltage which causes the optical modulator to produce an optical signal at a power level corresponding to the highest point in the periodical waveform; (c) a third step, performed after the second step, of driving the optical modulator with a driving voltage which causes the optical modulator to produce an optical signal at a power level corresponding to the lowest point in the periodical waveform; (d) a fourth step, performed after the third step, of driving the optical modulator with a driving voltage which causes the optical modulator to produce an optical signal at a power level corresponding to the highest point in the periodical waveform; and (e) a fifth step, performed after the fourth step, of driving the optical modulator with a driving voltage which causes the optical modulator to produce an optical signal at a power level corresponding to the lowest point in the periodical waveform.

In addition, objects of the present invention are achieved by a driving voltage generator which generates a pulse driving voltage having a rising edge and a decaying edge. An optical modulator produces a first pulse at the rising edge of the pulse driving voltage and a second pulse at the decaying edge of the pulse driving voltage. The first and second pulses are transmitted through a transmission line. Then, a detection device detects the first and second pulses after being transmitted through the transmission line. The amount of dispersion in the transmission line can then be computed from the time interval between the detected first and second pulses. Further, the frequency of the first pulse is determined by the slope of the rising edge of the pulse driving voltage and the frequency of the second pulse is determined by the slope of the decaying edge of the pulse driving voltage.

Objects of the present invention are further achieved by providing a Mach-Zehnder modulator having a corresponding half-wavelength voltage Vπ and being driven by a pulse driving voltage. The pulse driving voltage has a rising edge and a decaying edge and exceeds Vπ so that the Mach-Zehnder modulator produces a first pulse at the rising edge of the pulse driving voltage and a second pulse at the decaying edge of the pulse driving voltage.

BRIEF DESCRIPTION OF THE DRAWINGS

These and other objects and advantages of the invention will become apparent and more readily appreciated from the following description of the preferred embodiments, taken in conjunction with the accompanying drawings of which:

FIGS. 10(A) and 10(B) are diagrams illustrating the driving of a Mach-Zehnder modulator with a single pulse to produce a plurality of optical pulses, according to an embodiment of the present invention.

FIGS. 12(A), 12(B) and 12(C) are diagrams illustrating an optical pulse generation apparatus, according to an embodiment of the present invention.

FIGS. 20(A) (1), 20(A) (2), 20(B) (1), 20(B) (2), 20(C) (1) and 20(C) (2) are diagrams illustrating a method of measuring a dispersion value by comparing the spectrum element of a pulse string before and after transmission, according to an embodiment of the present invention.

FIG. 22(A) is a diagram illustrating a dispersion compensation apparatus applied to a transmission system without a repeater, according to an embodiment of the present invention.

FIG. 22(B) is a diagram illustrating a dispersion compensation apparatus applied to a multiple-repeater transmission system, according to an embodiment of the present invention.

FIG. 25(A) is a diagram illustrating a dispersion compensation apparatus applied to a transmission system without a repeater, according to an embodiment of the present invention.

FIG. 25(B) is a diagram illustrating a dispersion compensation apparatus applied to a multiple-repeater transmission system, according to an embodiment of the present invention.

FIG. 27(A) is a diagram illustrating a dispersion compensation apparatus, according to an embodiment of the present invention.

FIG. 27(B) is a diagram illustrating a dispersion compensation apparatus, according to a further embodiment of the present invention.

DESCRIPTION OF THE PREFERRED EMBODIMENTS

Figure 1:
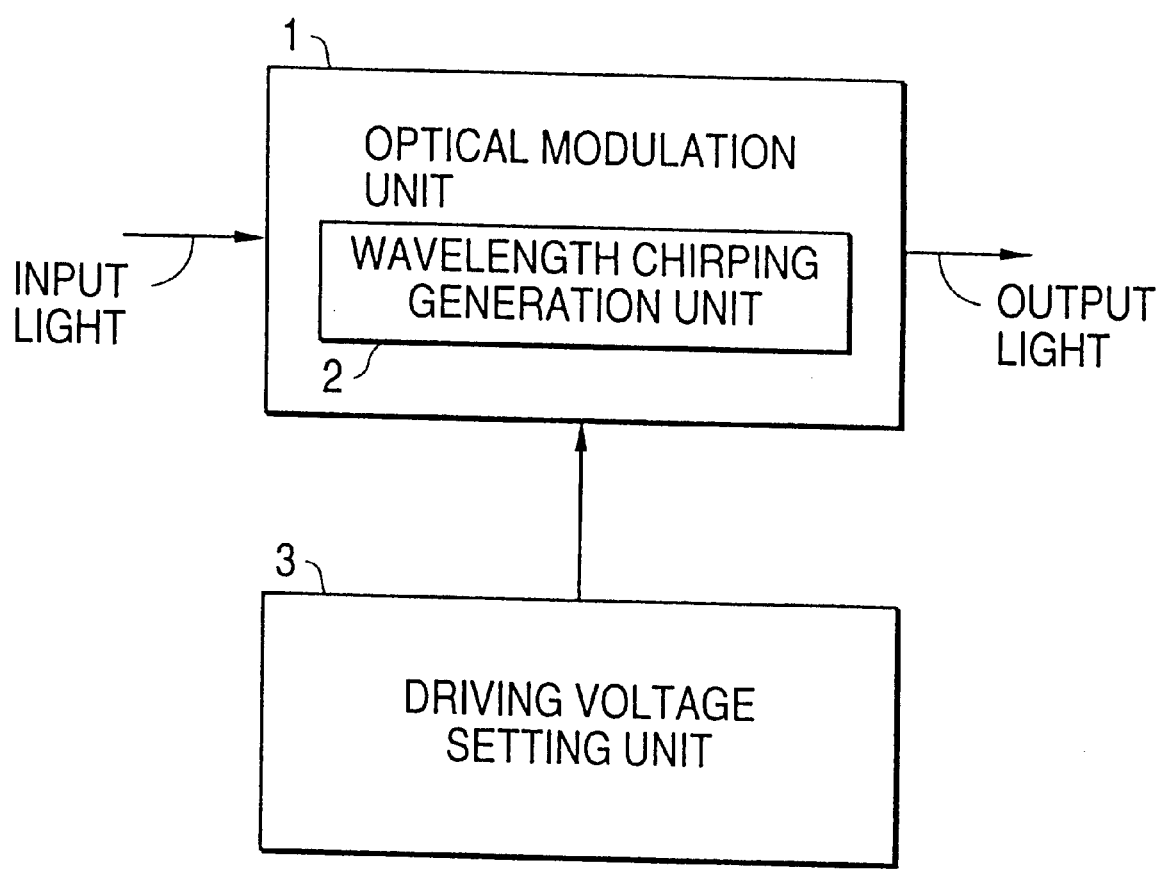
FIG. 1 is a diagram illustrating an optical pulse generation apparatus, according to an embodiment of the present invention.

Reference will now be made in detail to. the present preferred embodiments of the present invention, examples of which are illustrated in the accompanying drawings, wherein like reference numerals refer to like elements throughout.

FIG. 1 is a diagram illustrating an optical pulse generation apparatus, according to an embodiment of the present invention. Referring now to FIG. 1, an optical modulation unit 1 modulates an input light based on a driving voltage provided from a driving voltage setting unit 3. Optical modulation unit 1 increases or decreases the optical output in accordance with an increasing driving voltage. Therefore, by setting the range of the driving voltage to a range in which the optical output increases or decreases, an optical pulse is output by increasing the driving voltage. As a result, a plurality of optical pulses can be output if driving voltage setting unit 3 inputs a single pulse voltage to optical modulation unit 1.

Optical modulation unit 1 includes a wavelength chirping generation unit 2. Wavelength chirping generation unit 2 generates a wavelength chirping corresponding to the driving voltage increment ratio (that is, the "slope"). Therefore, the wavelength of the optical pulse output from optical modulation unit 1 when the driving voltage increases is different from the wavelength of the optical pulse output from optical modulation unit 1 when the driving voltage decreases. As a result, optical modulation unit 1 outputs a plurality of optical pulses having different wavelengths even if driving voltage setting unit 3 only inputs a single pulse voltage to optical modulation unit 1.

Thus, by providing an input light from a single light source, optical modulation unit 1 generates a plurality of optical pulses having different wavelengths. That is, a plurality of optical pulses having different wavelengths can be generated with a simple configuration. As a result, an optical transmission system can be smaller even when optical modulation unit 1 and driving voltage setting unit 3 are incorporated into the optical transmission system as signal sources for the dispersion measurement.

As a result, the optical transmission system can constantly perform dispersion measurement. If the amount of dispersion compensation in the optical transmission system is set to an optimum value, then the optical transmission can be correctly performed even if dispersion compensation tolerance is small.

Figure 2:
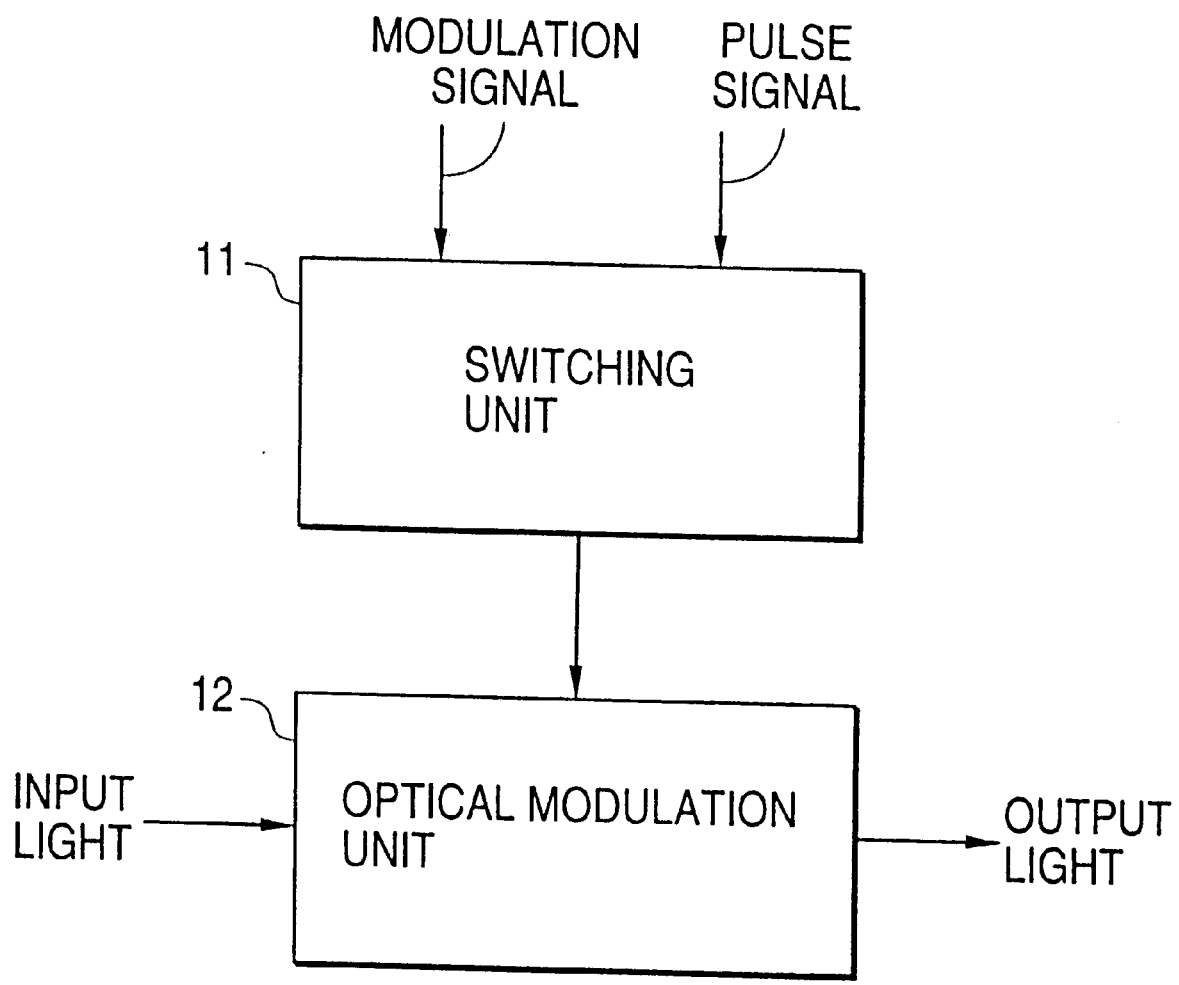
FIG. 2 is a diagram illustrating an optical modulation apparatus, according to an embodiment of the present invention.

FIG. 2 is a diagram illustrating an optical modulator, according to an embodiment of the present invention. Referring now to FIG. 2, an optical modulation unit 12 modulates an input light according to a modulation signal or a pulse signal provided by a switching unit 11. Optical modulation unit 12 increases or decreases an optical output with an increasing driving voltage. As a result, an optical pulse can be output at the rise time and the decay time of a pulse signal by setting the driving range through a pulse signal to a range in which an optical output increases or decreases. Therefore, a plurality of optical pulses can be output only by providing a single pulse voltage to optical modulation unit 1.

Switching unit 11 provides a modulation signal for optical modulation unit 12 when a main signal is modulated, and provides a pulse signal for optical modulation unit 12 when dispersion measurement is made. Therefore, a single optical modulation unit 12 can be shared between the modulation of a main signal and the dispersion measurement, thereby reducing the size of the optical transmission system.

Described below in detail is an example of a Mach-Zehnder modulator used as an optical modulation unit.

Figure 3:
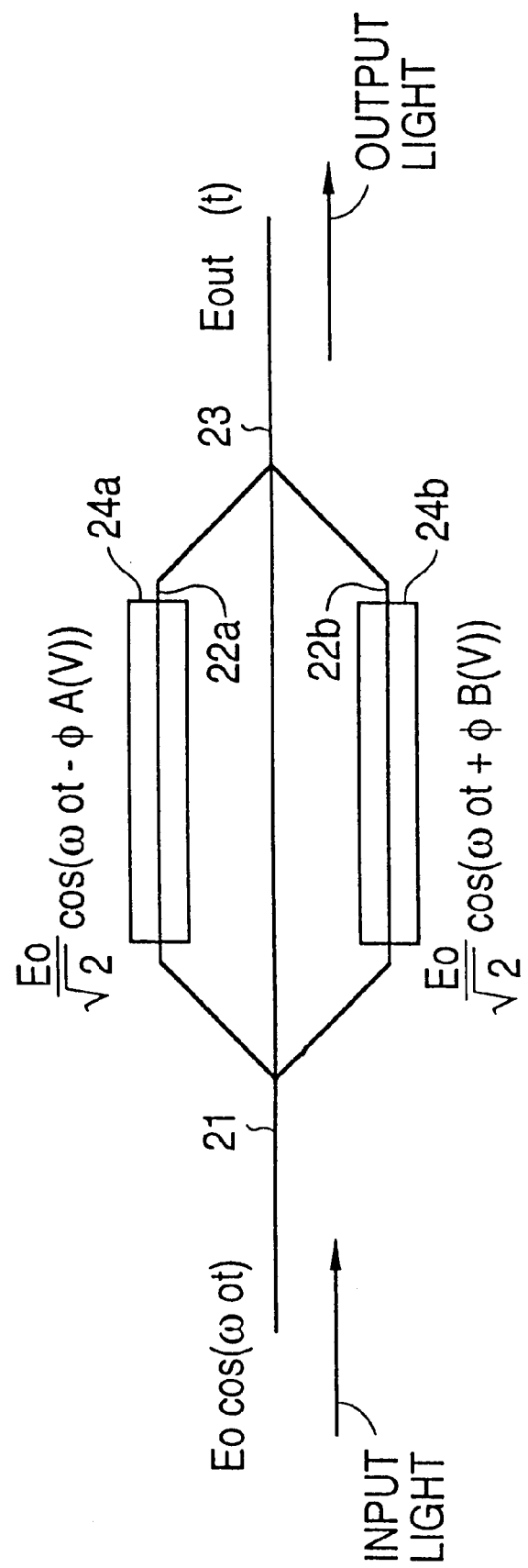
FIG. 3 is a diagram illustrating a Mach-Zehnder modulator, according to an embodiment of the present invention.

More specifically, FIG. 3 is a diagram illustrating the operation of a Mach-Zehnder modulator, according to an embodiment of the present invention. Referring now to FIG. 3, the Mach-Zehnder modulator comprises an optical waveguide 21. Optical waveguides 22a and 22b branch from optical waveguide 21. Optical waveguides 22a and 22b combine into optical waveguide 23. Electrodes 24a and 24b are for modulating the light passing through optical waveguides 22a and 22b, respectively.

When a light is input to optical waveguide 21, the input light is split to optical waveguides 22a and 22b. The split input light is phase-modulated in optical waveguides 22a and 22b. The split and phase-modulated input light is combined in optical waveguide 23, and output as an output light. The Mach-Zehnder modulator modulates the phase of light passing through optical waveguides 22a and 22b into a phase of the same size in an opposite direction. Thereby, wavelength chirping generated during the modulation can be successfully removed.

Assuming that a light whose electric field is expressed as $E0 \cos(\omega_0 t)$ is input to optical waveguide 21, and the phase changes are A (V) and B (V) in optical waveguides 22a and 22b, respectively. The electric field Eout (t) of the output light is expressed as follows:

$$\text{Eout}(t) = E0/\sqrt{2}\{\cos\{\omega_0 t - A(V) + \cos(\omega_0 t + B(V))\}\} \quad (3)$$

If the modulation efficiencies in optical waveguides 22a and 22b are a and b, respectively, then the phase changes A (V) and B (V) are expressed as follows:

$$A(V) = a(\text{Vin} + \text{BIA}) \quad (4)$$

$$B(V) = b(\text{Vin} + \text{BIA}) \quad (5)$$

where Vin indicates a driving voltage input to electrodes 24a and 24b, and BIA indicates a bias voltage of a Mach-Zehnder modulator.

Equation (3) is expanded into an amplitude portion and a phase portion as follows:

$$Eout(t) = E0/\sqrt{2}\,[\{\cos(A(V)) + \cos(B(V))\}\cos(\omega_0 t) + \{\sin(A(V)) - \sin(B(V))\}\sin(\omega_0 t)] \quad (6)$$

If $x = \cos(A(V)) + \cos(B(V))$, and
$y = \sin(A(V)) - \sin(B(V))$, then Equation (6) is expressed as follows:

$$\text{Eout}(t) = E0\sqrt{(x^2+y^2)/2}\cdot\cos\{\omega_0 t - \tan^{-1}(y/x)\} \quad (7)$$

where an optical output power P is expressed as follows:

$$P = x^2 + y^2 \quad (8)$$

Since the time differentiation of $\tan^{-1}(y/x)$ refers to the fluctuation of the angular frequency, the wavelength chirping $\Delta\lambda$ is expressed as follows:

$$\Delta\lambda = \lambda 0^2/(2\pi\cdot v)\cdot\Delta\omega$$

$$= d(\tan^{-1}(y/x)/dt\cdot\lambda 0^2/(2\pi\cdot v) \quad (9)$$

where $\lambda 0$ indicates the center wavelength, and $v$ indicates the optical velocity in an optical fiber.

The above described $\tan^{-1}(y/x)$ is expanded as follows:

$$y/x = (\sin(A(V)) - \sin(B(V)))/(\cos(A(V)) + \cos(B(V)))$$

$$= \tan(\{A(V) - B(V)\}/2)$$

Therefore, the following equation is expressed $$\tan^{-1}(y/x) = \{A(V) - B(V)\}/2$$

$$= (a-b)(\text{Vin} + \text{BIA})/2 \quad (10)$$

where a and b indicate modulation efficiencies.

As a result, the wavelength chirping $\Delta\lambda$ can be expressed as follows:

$$\Delta\lambda = d(\tan^{-1}(y/x))/dt \cdot \lambda 0^2/(2\pi \cdot v) \sim dVin/dt \qquad (11)$$

Namely, it is proportional to the differentiation of the driving voltage Vin.

As is indicated by Equation (10), the modulation efficiencies a and b should match each other to remove the wavelength chirping $\Delta\lambda$.

Figure 4A:
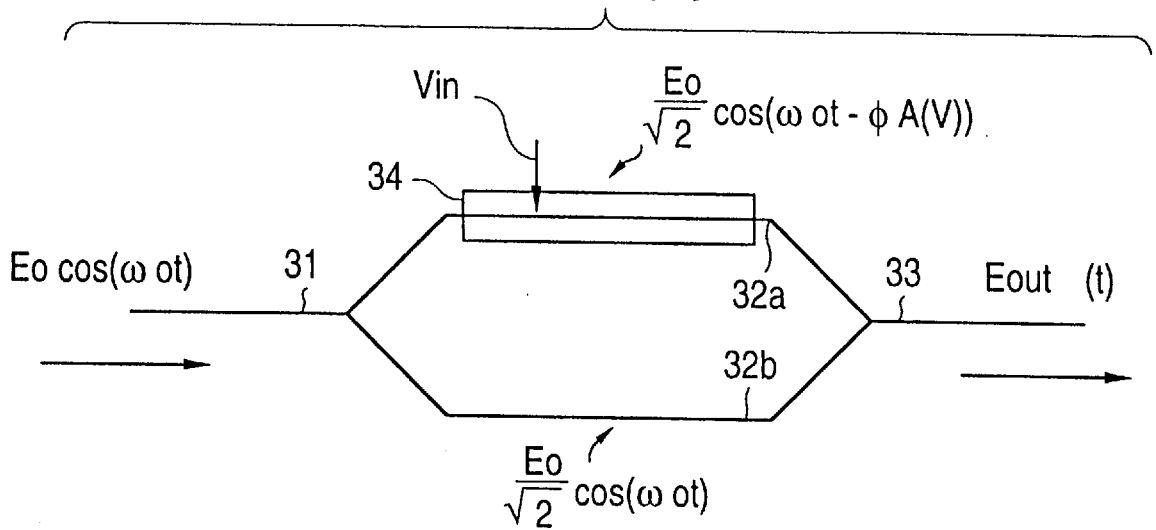
FIGS. 4(A), 4(B), 4(C) and 4(D) are diagrams illustrating a method of driving the Mach-Zehnder modulator, according to an embodiment of the present invention.
Figure 4B:
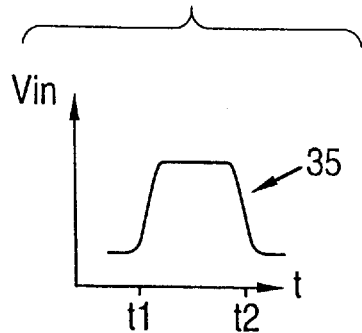
Figure 4C:
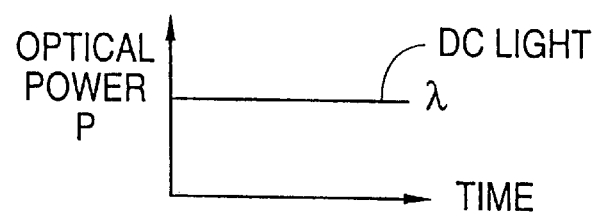
Figure 4D:
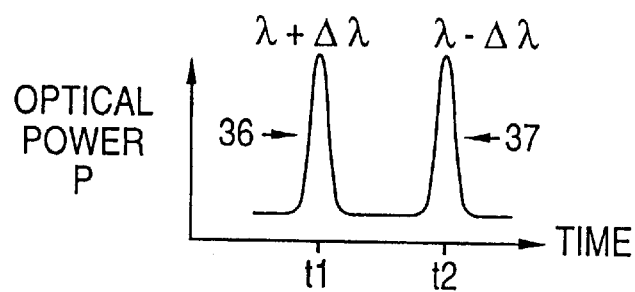

FIGS. 4(A), 4(B), 4(C) and 4(D) are diagrams illustrating a method of driving the Mach-Zehnder modulator, according to an embodiment of the present invention. More specifically, FIG. 4(A) is a diagram illustrating a Mach-Zehnder modulator. FIG. 4(B) is a graph illustrating a pulse driving voltage provided to the modulator. FIG. 4(C) is a diagram illustrating the optical power versus time of the modulator. FIG. 4(D) is a graph illustrating pulses output by the optical modulator in accordance with the pulse driving voltage in FIG. 4(B).

Referring now to FIGS. 4(A), 4(B), 4(C) and 4(D), the Mach-Zehnder modulator comprises an optical waveguide 31. Optical waveguides 32a and 32b branch from optical waveguide 31. Optical waveguides 32a and 32b are combined into optical waveguide 33. An electrode 34 is for modulating the light passing through optical waveguide 32a.

When a light is input to optical waveguide 31, the input light is split to optical waveguides 32a and 32b. Split input light is phase-modulated in optical waveguide 32a. The light phase-modulated by optical waveguide 32a and the light passing through optical waveguide 32b is combined in optical waveguide 33, and output as an output light.

Assume that a pulse voltage 35 which is twice the amplitude of the half-wavelength voltage V$\pi$ of the modulator is input to electrode 34 as a driving voltage Vin. In this case, an optical pulse 36 is output at the rise time of pulse voltage 35, and an optical pulse 37 is output at the decay time of pulse voltage 35. The wavelength chirping $\Delta\lambda$ arises in optical pulses 36 and 37, and the size of the wavelength chirping $\Delta\lambda$ is proportional to the differentiation of pulse voltage 35 as shown in Equation (11).

Thus, by providing a Mach-Zehnder modulator which received a DC light having a wavelength $\lambda$ with only one pulse voltage 35, optical pulse 37 having a wavelength $\lambda-\Delta\lambda$ and optical pulse 36 having a wavelength $\lambda+\Delta\lambda$ are generated.

As described above, the modulation efficiencies a and b are expressed as a:b=1:0 by operating the Mach-Zehnder modulator on one side only, and two optical pulses 36 and 37 having different wavelengths can be generated.

Figure 5:
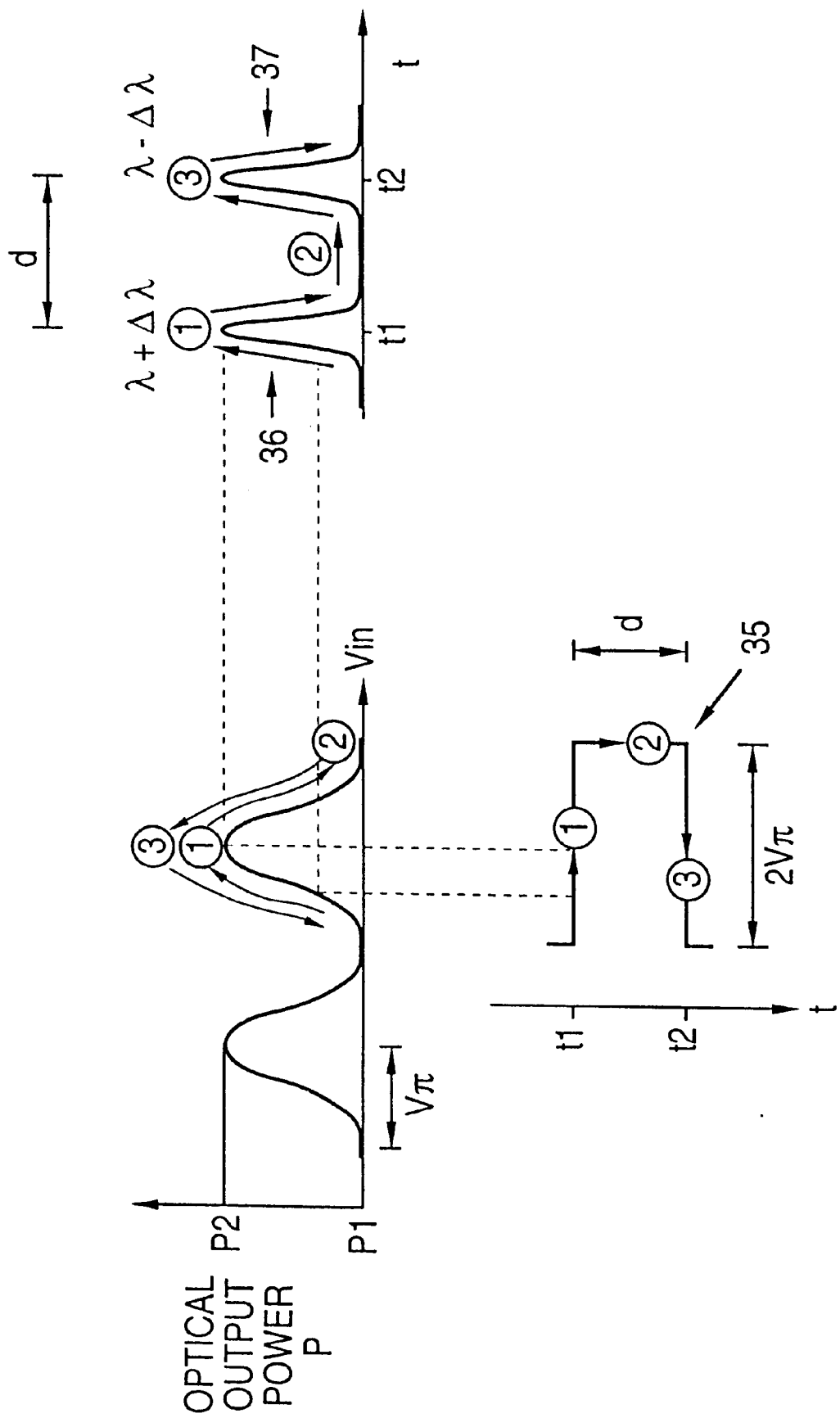
FIG. 5 is a diagram illustrating a method of generating an optical pulse, according to an embodiment of the present invention.

FIG. 5 is a diagram illustrating a method of generating an optical pulse, according to an embodiment of the present invention. Referring now to FIG. 5, if an input light having a wavelength $\lambda$ is input to optical waveguide 31, then the relationship between the driving voltage Vin provided to electrode 34 and the optical output power P output from optical waveguide 33 changes periodically on a cycle twice as long as the half-wavelength voltage V$\pi$. Therefore, when the amplitude of pulse voltage 35 is set to double the half-wavelength voltage V$\pi$, the optical output power P increases from P1 to P2, and then decreases from P2 to P1 at the rise time of the pulse voltage 35 (as indicated by (1) in FIG. 5). Therefore, optical pulse 36 is output from the optical waveguide 33 at the time t1 corresponding to the rise time of pulse voltage 35. Since the differentiation value at the rise time of pulse voltage 35 is positive, the wavelength of the optical pulse 36 is shifted by $\Delta\lambda$ into $\lambda+\Delta\lambda$.

After the duration d has passed (as indicated by (2) in FIG. 5), and pulse voltage 35 has decayed (as indicated by (3) in FIG. 5), the optical output power P increases again from P1 to P2 and then decreases from P2 to P1. Therefore, optical pulse 37 is output from optical waveguide 33 at the time t2 corresponding to the decay time of pulse voltage 35. Since the differentiation value at the decay time of the pulse voltage 35 is negative, the wavelength of the optical pulse 37 is shifted by $-\Delta\lambda$ into $\lambda-\Delta\lambda$.

That is, according to the present invention, a light having a plurality of wavelengths can be generated from a single light source. In this case, for example, a driving voltage is applied to a modulator for performing optical modulation. Referring to FIG. 5, the optical phase difference in an interferometer has a periodical interference characteristic. The optical phase difference to be applied to the modulator changes from the first phase difference at which the interferometer indicates the lowest optical output level in the periodical characteristic to a second phase difference at which the interferometer indicates the highest optical output level. Then, the modulator changes to a third phase difference at which the interferometer indicates the lowest optical output level. Thereafter, the modulator changes to the second phase difference at which the interferometer indicates the highest optical output level, and then to the first phase difference at which the interferometer indicates the lowest optical output level.

Figure 6:
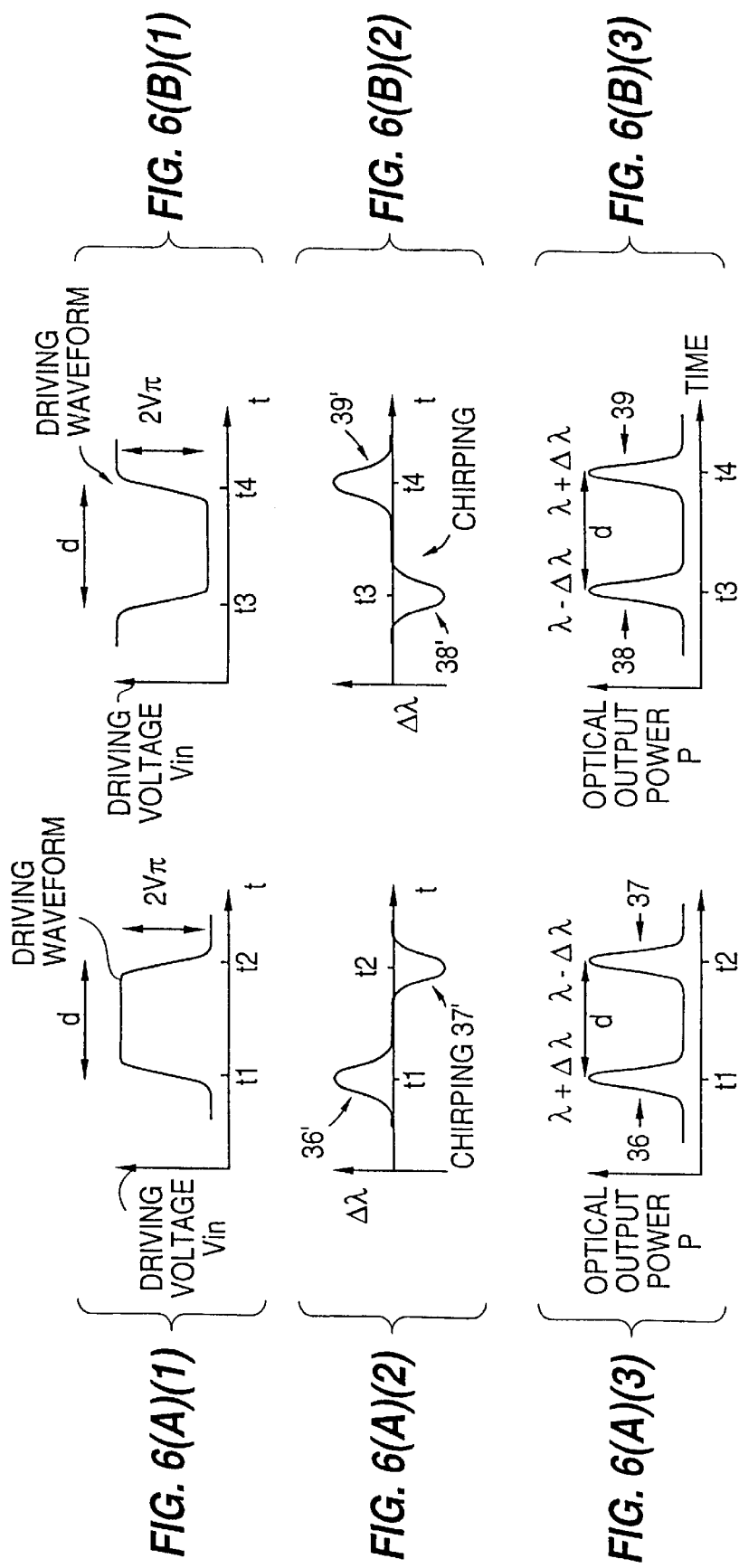
FIGS. 6(A) (1), 6(A) (2), 6(A) (3), 6(B) (1), 6(B) (2) and 6(B) (3) are diagrams illustrating a method of generating an optical pulse when waveform chirping is generated, according to an embodiment of the present invention.

FIGS. 6(A) (1), 6(A) (2), 6(A) (3), 6(B) (1), 6(B) (2) and 6(B) (3) are diagrams illustrating a method of generating an optical pulse when waveform chirping is generated, according to an embodiment of the present invention.

Referring now to FIGS. 6(A) (1), 6(A) (2) and 6(A) (3), if an input light having a wavelength $\lambda$ is input to a Mach-Zehnder modulator, then a wavelength chirping 36' corresponding to the differentiation value of the driving voltage Vin is generated when the driving voltage Vin rises at time t1, and optical pulse 36 having the wavelength $\lambda+\Delta\lambda$ is generated. When the time interval d has passed, a wavelength chirping 37' corresponding to the differentiation value of the driving voltage Vin is generated when the driving voltage Vin decays at time t2, and optical pulse 37 having the wavelength $\lambda=\Delta\lambda$ is generated.

Since the time interval between the two generated optical pulses is the same as the width d of a driving waveform, it can be optionally controlled by adjusting the width d of the driving waveform.

Referring now to FIGS. 6(B) (1), 6(B) (2) and 6(B) (3), a wavelength chirping 38' corresponding to the differentiation value of the driving voltage Vin is generated when the driving voltage Vin decays at time t3, and optical pulse 38 having the wavelength $\lambda-\Delta\lambda$ is generated. When the time interval d has passed, a wavelength chirping 39' corresponding to the differentiation value of the driving voltage Vin is generated when the driving voltage Vin rises at time t4, and optical pulse 39 having the wavelength $\lambda+\Delta\lambda$ is generated.

Thus, a Mach-Zehnder modulator normally modulates data at a half-wavelength voltage V$\pi$, but can generate short pulses at the rise time and the decay time of a driving waveform by modulating the data at a driving voltage 2V$\pi$ which is double the half-wavelength voltage V$\pi$.

Since the wavelength chirping $\Delta\lambda$ is proportional to the differentiation value of the driving voltage Vin as indicated by Equation (11), the signs for the wavelength chirping $\Delta\lambda$ are opposite between the rise time and the decay time of the driving waveform, thereby assigning the two generated short pulses with different wavelengths $\lambda+\Delta\lambda$ and $\lambda-\Delta\lambda$.

If two short pulses generated from a set of a laser diode and a Mach-Zehnder modulator are transmitted through an optical fiber, the pulse interval is extended by a group delay difference and changed from the pulse interval d before the transmission to the pulse interval d+Δd after the transmission.

The change Δd (ps) in pulse interval is expressed as follows:

$$\Delta d = D \cdot L \cdot \Delta \lambda c \quad (12)$$

where D (ps/nm/km) indicates a dispersion value of a transmission line, L(km) indicates a transmission distance, and Δλc indicates the Δλ of a pulse peak.

As a result, detecting the change Δd in pulse interval gives a dispersion value D in a transmission line. The change Δd in pulse interval can be directly read through, for example, a sampling oscilloscope. In a transmission line in which a dispersion value D can be approximately obtained, simple control can be performed by preliminarily adjusting the pulse interval d.

Figure 7:
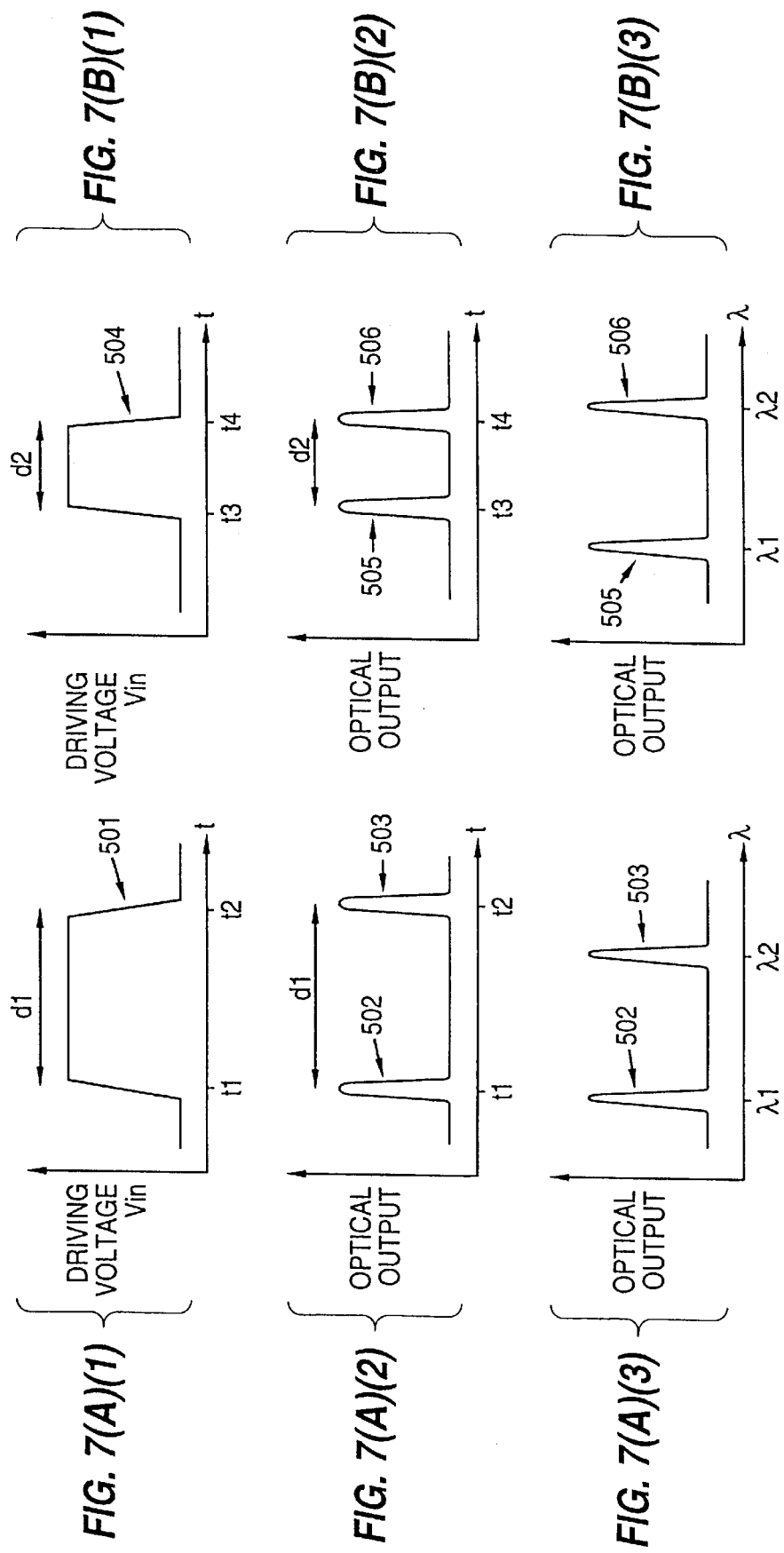
FIGS. 7(A) (1), 7(A) (2), 7(A) (3), 7(B) (1), 7(B) (2) and 7(B) (3) are diagrams illustrating a method of generating an optical pulse when the pulse width of a driving voltage is changed, according to an embodiment of the present invention.

FIGS. 7(A) (1), 7(A) (2), 7(A) (3), 7(B) (1), 7(B) (2) and 7(B) (3) are diagrams illustrating a method of generating an optical pulse when the pulse width of a driving voltage Vin is changed, according to an embodiment of the present invention.

In now to FIGS. 7(A) (1), 7(A) (2), 7(A) (3), when a pulse signal 501 having a pulse width d1 is input as a driving voltage Vin, an optical pulse 502 is generated at time t1 corresponding to the rise of pulse signal 501, and an optical pulse 503 is generated at time t2 corresponding to the decay of pulse signal 501. At this time, the wavelength chirping corresponding to the differentiation value at the rise time of pulse signal 501 is generated in optical pulse 502. Therefore, the wavelength of optical pulse 502 is λ1. The wavelength chirping corresponding to the differentiation value at the decay time of pulse signal 501 is generated in optical pulse 503. Therefore, the wavelength of optical pulse 503 is λ2.

Referring now to FIGS. 7(B) (1), 7(B) (2) and 7(B) (3), if the pulse width of the driving voltage Vin is changed and a pulse signal 504 having a pulse width d2 is input as a driving voltage Vin, an optical pulse 505 is generated at time t3 when pulse signal 504 rises, and an optical pulse 506 is generated at time t4 when pulse signal 504 decays. At this time, the wavelength chirping corresponding to the differentiation value at the rise time of pulse signal 504 is generated in optical pulse 505. Therefore, the wavelength of optical pulse 505 is λ1. The wavelength chirping corresponding to the differentiation value at the decay time of pulse signal 504 is generated in optical pulse 506. Therefore, the wavelength of optical pulse 506 is λ2.

Figure 8:
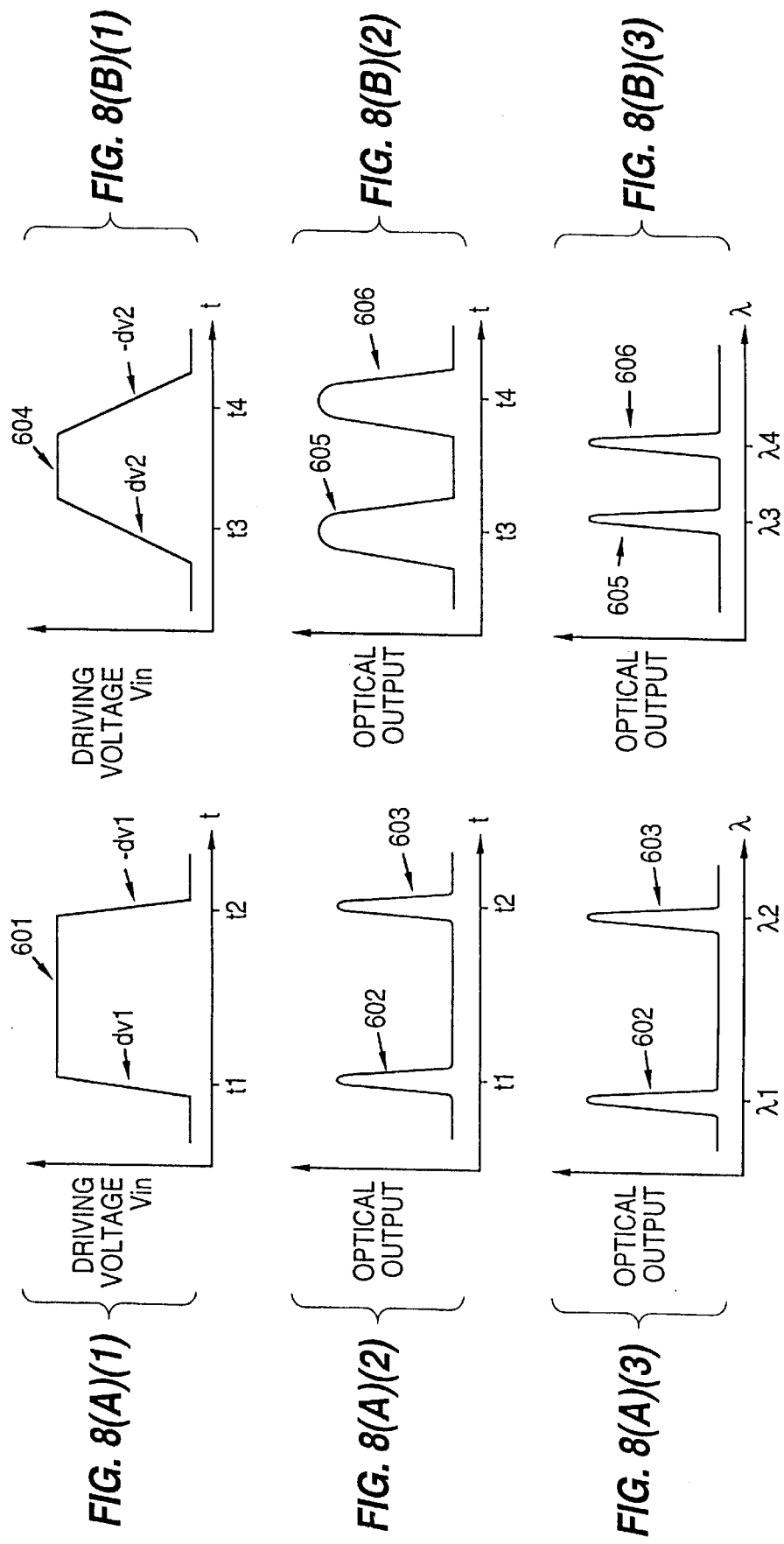
FIGS. 8(A) (1), 8(A) (2), 8(A) (3), 8(B) (1), 8(B) (2) and 8(B) (3) are diagrams illustrating a method of generating an optical pulse when the differentiation value of a driving voltage is changed, according to an embodiment of the present invention.

FIGS. 8(A) (1), 8(A) (2), 8(A) (3), 8(B) (1), 8(B) (2) and 8(B) (3) are diagrams illustrating a method of generating an optical pulse when the slope of a driving voltage is changed, according to an embodiment of the present invention.

Referring now to FIGS. 8(A) (1), 8(A) (2) and 8(A) (3), when a pulse signal 601 having a differential value at the rise time is dv1 and a differential value at the decay time is –dV1 is input as a driving voltage Vin, an optical pulse 602 is generated at time t1 corresponding to the rise of pulse signal 601, and an optical pulse 603 is generated at time t2 corresponding to the decay of pulse signal 601. At this time, the wavelength chirping corresponding to the differentiation value dV1 at the rise time of pulse signal 601 is generated in optical pulse 602. Therefore, the wavelength of optical pulse 602 is λ1.

The wavelength chirping corresponding to the differentiation value –dV1 at the decay time of pulse signal 601 is generated in optical pulse 603. Therefore, the wavelength of optical pulse 603 is λ2.

Referring now to FIGS. 8(B) (1), 8(B) (2) and 8(B) (3), if the differentiation value of the driving voltage Vin is changed and a pulse signal 604 having a differential value at the rise time is dV2 and a differential value at the decay time is –dV2 is input as a driving voltage Vin, an optical pulse 605 is generated at time t3 when the pulse signal 604 rises, and an optical pulse 606 is generated at time t4 when the pulse signal 604 decays. At this time, the wavelength chirping corresponding to the differentiation value dV2 at the rise time of pulse signal 604 is generated in optical pulse 605. Therefore, the wavelength of optical pulse 605 is λ3.

The wavelength chirping corresponding to the differentiation value –dV2 at the decay time of pulse signal 604 is generated in optical pulse 606. Therefore, the wavelength of optical pulse 606 is λ3.

As can be seen from above, the present invention uses an optical modulator, such as a Mach-Zehnder modulator, in a much different manner than conventional techniques.

Figure 9:
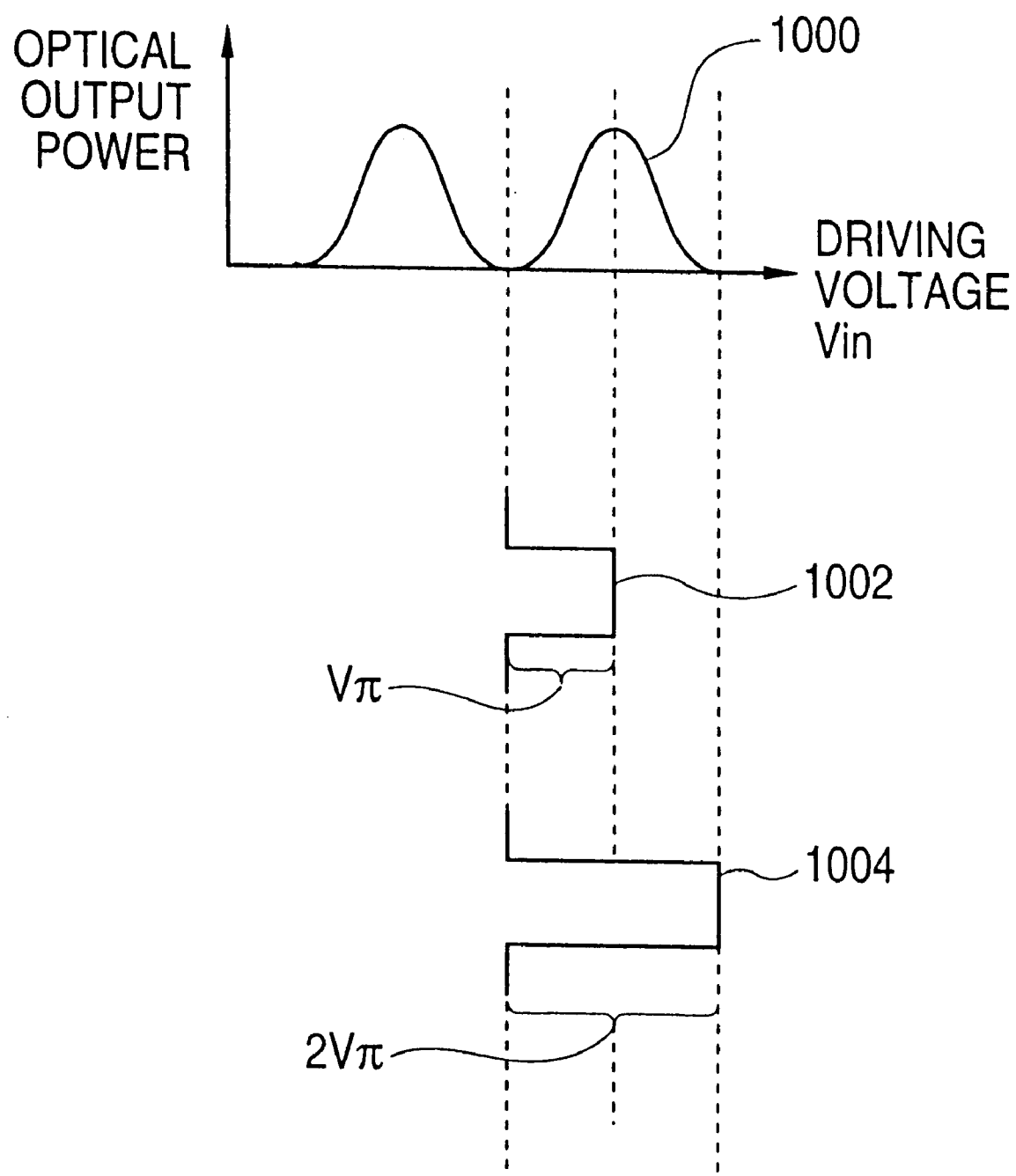
FIG. 9 is a diagram illustrating a comparison of a convention pulse driving voltage and a pulse driving voltage according to an embodiment of the present invention.

For example, FIG. 9 is a diagram illustrating a comparison of a convention pulse driving voltage and a pulse driving voltage according to an embodiment of the present invention. Referring now to FIG. 9, a Mach-Zehnder modulator has an output power versus driving voltage characteristic curve indicating a periodic waveform 1000. Waveform 1000 has a half-wavelength voltage Vπ. Conventionally, a Mach-Zehnder modulator is driven with a pulse driving voltage having a height of Vπ, such as pulse driving voltage 1002, to produce either an optical "1" or "0". As a result, conventionally, the optical output power of a Mach-Zehnder modulator increases and decreases in accordance with an increasing and decreasing driving voltage, respectively.

By contrast, according to embodiments of the present invention, a modulator, such as a Mach-Zehnder modulator, is driven with a pulse driving voltage that exceeds the half-wavelength voltage Vπ. For example, as illustrated in FIG. 9, a Mach-Zehnder modulator is driven with a pulse driving voltage having a height of 2Vπ, such as pulse driving voltage 1004. Therefore, according to embodiments of the present invention, the optical output power of the Mach-Zehnder modulator increases and decreases in accordance with an increasing driving voltage. In other words, the driving voltage does not have to decrease to produce a decreasing optical output power.

By referring to FIG. 5, it can also be seen that the optical output power increases and decreases during the cycle (1), where the driving voltage Vin in increasing. Therefore, an increasing driving voltage produces an increasing and decreasing optical output power.

Therefore, according to the above embodiments of the present invention, an optical modulator, such as a Mach-Zehnder modulator, is driven with a single pulse driving voltage which causes the optical modulator to produce a plurality of optical pulses.

For example, FIGS. 10(A) and 10(B) are diagrams illustrating the driving of a Mach-Zehnder modulator with a single pulse to produce a plurality of optical pulses.

Referring now to FIG. 10(A), a single pulse driving voltage 1006 is applied to a Mach-Zehnder modulator. As a result, as illustrated in FIG. 10(B), a plurality of optical pulses will be output by the Mach-Zehnder modulator. The wavelength of the pulses can be changed by changing the slope of the rising and decaying times of the pulse driving voltage. Further, time intervals between pulses can be changed by changing the duration of the pulse driving voltage.

As described above, conventionally, a Mach-Zehnder modulator is used to generate an optical "1" or "0". For this purpose, it is not necessary to use a driving voltage exceeding the half-wavelength voltage Vπ. By contrast, according to embodiments of the present invention, as will be discussed in more detail below, a Mach-Zehnder modulator is used to measure, and compensate for, dispersion. Conventionally, a Mach-Zehnder modulator is not used for this purpose. This difference in the use of a Mach-Zehnder modulator is an important reason why a Mach-Zehnder modulator is not conventionally driven at a voltage exceeding the half-wavelength voltage Vπ.

Figure 11A:
FIGS. 11(A), 11(B) and 11(C) are diagrams illustrating waveforms resulting from transmitting an optical pulse, according to an embodiment of the present invention.
Figure 11B:
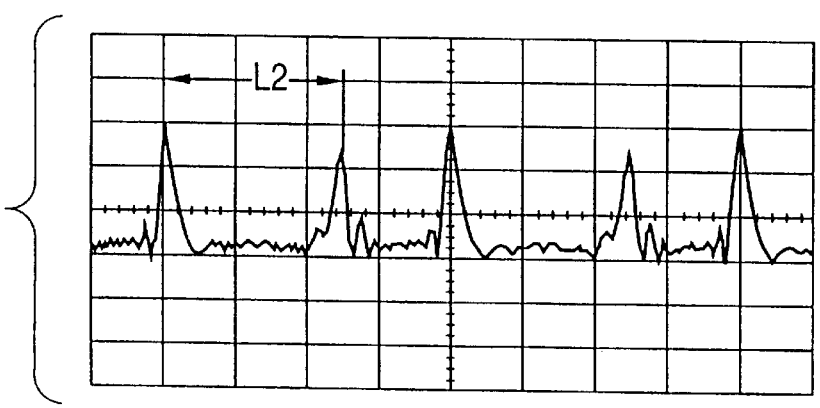
Figure 11C:
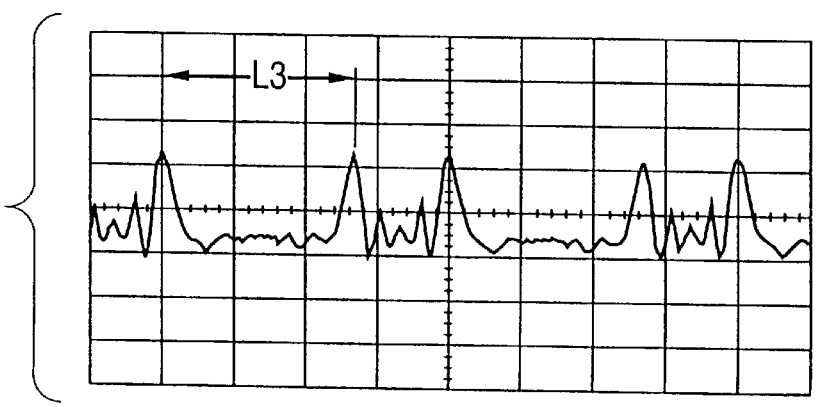

FIGS. 11(A), 11(B) and 11(C) are diagrams illustrating waveforms from an experiment on optical pulse transmission, according to an embodiment of the present invention.

FIG. 11(A) illustrates a transmission pulse string before being transmitted through a single mode fiber and having a transmission interval L1 of 400 ps. FIG. 11(B) illustrates the pulse string after transmission through 25 km of the single mode fiber. As shown in FIG. 11(B), the interval between the optical pulses is extended to L2. FIG. 11(C) illustrates the pulse string after transmission through 50 km of the single mode fiber. As shown in FIG. 11(C), the interval of optical pulses is extended to L3. Thus, the interval between the optical pulses depends on the dispersion value (length of the transmission line). The wavelength dispersion of the single mode fiber used in this experiment is about 17 ps/nm/km.

Therefore, measuring the optical pulse interval after the transmission through the single mode fiber enables the dispersion measurement and dispersion compensation of a fiber transmission line working at super-high speed transmission speeds through an existing transmission line to be easily performed at low cost.

FIGS. 12(A), 12(B) and 12(C) are diagrams illustrating an optical pulse generation apparatus, according to an embodiment of the present invention.

Referring now to FIG. 12(A), laser light emitted from a laser diode 41 is input to a Mach-Zehnder modulator 42 and, simultaneously, a pulse signal 401 generated by a pulse generator 43 is input to Mach-Zehnder modulator 42. For example, pulse generator 43 drives Mach-Zehnder modulator 42 on one side only, and sets the driving voltage Vin to double the half-wavelength voltage Vπ.

Thus, by providing only one pulse signal, two optical pulses 402 and 403 are output from Mach-Zehnder modulator 42, and a wavelength chirping is generated corresponding to the increment ratio of the pulse signal, thereby producing the different wavelengths of optical pulses 402 and 403 output from Mach-Zehnder modulator 42. Furthermore, the time interval d of optical pulses 402 and 403 output from Mach-Zehnder modulator 42 can be optionally set by changing the pulse width d of pulse signal 401 output from pulse generator 43.

FIG. 12(B) is a diagram illustrating an LiNbO$_3$ modulator 45 as Mach-Zehnder modulator 42 shown in FIG. 12(A). Referring now to FIG. 12(B), laser light emitted from a laser diode 44 is input to LiNbO$_3$ modulator 45 and, simultaneously, a pulse signal 404 generated by a pulse generator 46 is input to LiNbO$_3$ modulator 45. For example, pulse generator 46 drives LiNbO$_3$ modulator 45 on one side only, and sets the driving voltage Vin to double the half-wavelength voltage Vπ.

Thus, by providing only one pulse signal 404, two optical pulses 405 and 406 are output from LiNbO$_3$ modulator 45, and a wavelength chirping is generated corresponding to the increment ratio of the pulse signal, thereby providing different wavelengths for optical pulses 405 and 406 output from LiNbO$_3$ modulator 45. Furthermore, the time interval d of optical pulses 405 and 406 output from LiNbO$_3$ modulator 45 can be optionally set by changing the pulse width d of pulse signal 404 output from pulse generator 46.

Mach-Zehnder modulator 42 can use a strong dielectric crystal such as KDP, LiTaO$_2$, etc. for a substrate as well as LiNbO$_3$.

FIG. 12(C) is a diagram illustrating an example in which a semiconductor modulator 48 is applied as the substrate in Mach-Zehnder modulator 42 shown in FIG. 12(A). Referring now to FIG. 12(C), a laser light emitted from a laser diode 47 is input to semiconductor modulator 48 and, simultaneously, a pulse signal 407 generated by a pulse generator 49 is input to semiconductor modulator 48. For example, pulse generator 49 drives semiconductor modulator 48 on one side only, and sets the driving voltage Vin to double the half-wavelength voltage Vπ.

Thus, by providing only one pulse signal 407, two optical pulses 408 and 409 are output from semiconductor modulator 48, and a wavelength chirping is generated corresponding to the increment ratio of pulse signal 407, thereby providing different wavelengths for optical pulses 408 and 409 output from semiconductor modulator 48. Furthermore, the time interval d of optical pulses 408 and 409 output from semiconductor modulator 48 can be optionally set by changing the pulse width d of pulse signal 407 output from pulse generator 49.

Using semiconductor modulator 48 as the substrate in Mach-Zehnder modulator 42, laser diode 47 can be easily integrated into semiconductor modulator 48. Since laser diode 47 and semiconductor modulator 48 can be designed as one unit, the dispersion measurement apparatus can be smaller, lighter, and less expensive.

Figure 13A:
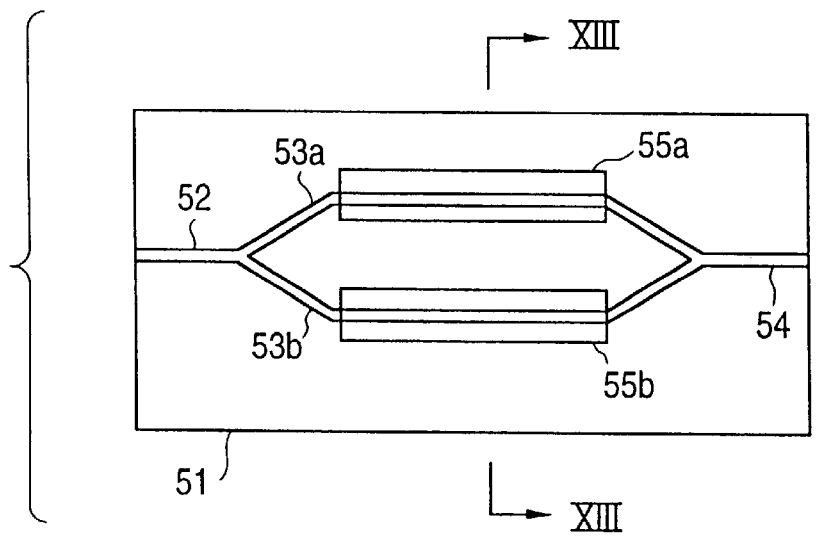
FIG. 13(A) is a diagram illustrating a top view of a semiconductor modulator, according to an embodiment of the present invention.
Figure 13B:
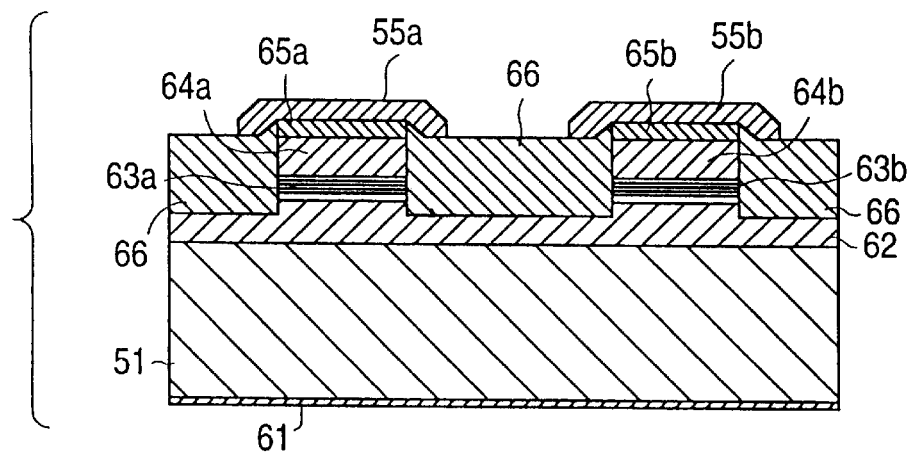
FIG. 13(B) is a diagram illustrating a sectional view of the semiconductor modulator in FIG. 13(A) along lines XIII—XIII, according to an embodiment of the present invention.

FIG. 13(A) is a top view of semiconductor modulator 48 shown in FIG. 12(C). FIG. 13(B) is a sectional view of the semiconductor modulator when cut vertically along line XIII—XIII in FIG. 13(A).

Referring now to FIG. 13(A), an n-InP substrate 51 has an optical waveguide 52. Optical waveguides 53a and 53b branch from optical waveguide 52. An optical waveguide 54 is obtained by combining optical waveguides 53a and 53b. Optical waveguides 53a and 53b individually have electrodes 55a and 55b, respectively.

Referring now to FIG. 13(B), an electrode 61 is provided under n-InP substrate 51, and an n-InAlAs layer 62 is provided on n-InP substrate 51. Furthermore, multiple quantum well layers 63a and 63b, p-InAlAs layers 64a and 64b, and p-InGaAs layers 65a and 65b are laid as optical waveguides 53a and 53b. A polyamide resin 66 filled in the area between optical waveguides 53a and 53b. The multiple quantum well layers 63a and 63b are formed by alternately laying an InGaAs layer and an InAlAs layer of several nm each in thickness.

Thus, a multiple-quantum-well-structured optical waveguide can realize a semiconductor modulator 48 having a high phase modulation efficiency.

Figure 14A:
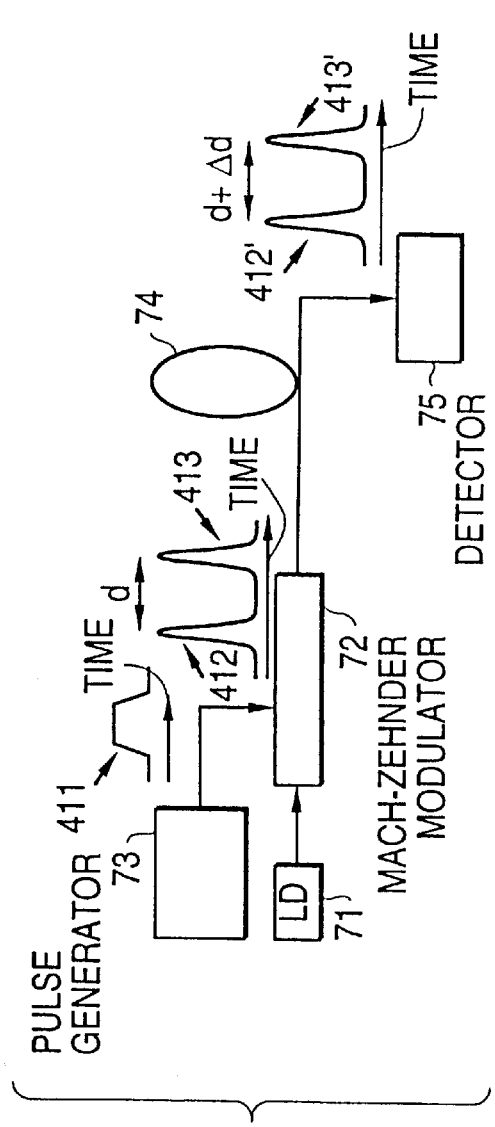
FIG. 14(A) is a diagram illustrating a dispersion measurement apparatus with an optical pulse generation apparatus on the transmission side, according to an embodiment of the present invention.

FIG. 14(A) is a diagram illustrating a dispersion measurement apparatus with an optical pulse generation apparatus on the transmission side, according to an embodiment of the present invention.

Referring now to FIG. 14(A), a laser diode 71, a Mach-Zehnder modulator 72, and a pulse generator 73 are provided on the transmission side of the optical transmission system. Laser light emitted from laser diode 71 is input to Mach-Zehnder modulator 72 and, simultaneously, a pulse signal 411 generated by pulse generator 73 is input to Mach-Zehnder modulator 72. For example, pulse generator 73 drives Mach-Zehnder modulator 72 on one side only, and sets the driving voltage Vin to double the half-wavelength voltage Vπ.

Thus, by inputting only one pulse signal 411, two optical pulses 412 and 413 are output from Mach-Zehnder modulator 72, and a wavelength chirping is generated corresponding to the increment ratio of the pulse signal 411, thereby producing the different wavelengths of optical pulses 412 and 413 output from Mach-Zehnder modulator 72.

Optical pulses 412 and 413 output from Mach-Zehnder modulator 72 are input to an optical fiber 74, and optical pulses 412' and 413' transmitted through optical fiber 74 are detected by a detector 75. The pulse interval d+Δd of optical pulses 412' and 413' is measured and compared with the pulse interval d of optical pulses 412 and 413 to compute the change Δd of the pulse interval. As a result, the wavelength dispersion of optical fiber 74 can be obtained by Equation (12) based on the change Δd of the pulse interval.

Figure 14B:
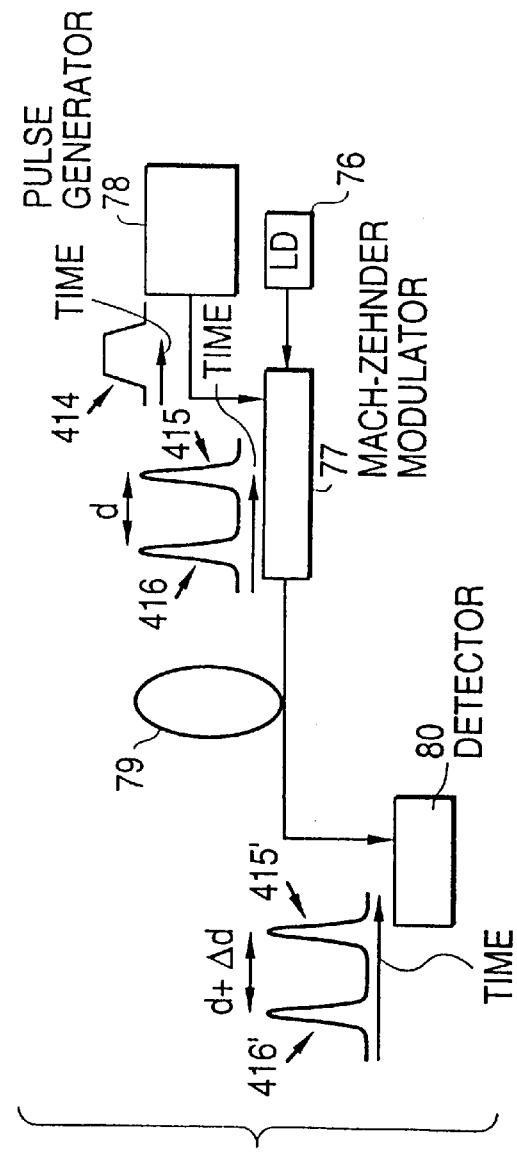
FIG. 14(B) is a diagram illustrating a dispersion measurement apparatus with an optical pulse generation apparatus on the receiving side, according to an embodiment of the present invention.

FIG. 14(B) is a diagram illustrating a dispersion measurement apparatus with an optical pulse generation apparatus on the receiving side, according to an embodiment of the present invention.

Referring now to FIG. 14(B), a laser diode 76, a Mach-Zehnder modulator 77, and a pulse generator 78 are provided on the receiving side of the optical transmission system. Laser light emitted from laser diode 76 is input to Mach-Zehnder modulator 72 and, simultaneously, a pulse signal 414 generated by pulse generator 78 is input to Mach-Zehnder modulator 77. For example, pulse generator 78 drives Mach-Zehnder modulator 77 on one side only, and sets the driving voltage Vin to double the half-wavelength voltage Vπ.

Thus, by inputting only one pulse signal 414, two optical pulses 415 and 416 are output from Mach-Zehnder modulator 77, and a wavelength chirping is generated corresponding to the increment ratio of pulse signal 414, thereby producing the different wavelengths of optical pulses 415 and 416 output from Mach-Zehnder modulator 77.

Optical pulses 415 and 416 output from Mach-Zehnder modulator 77 are input to an optical fiber 79, and optical pulses 415' and 416' transmitted through optical fiber 79 are detected by a detector 80. The pulse interval d+Δd of optical pulses 415' and 416' is measured and compared with the pulse interval d of optical pulses 415 and 416 to compute the change Δd of the pulse interval. As a result, the wavelength dispersion of optical fiber 79 can be obtained by Equation (12) based on the change Δd of the pulse interval. Setting the apparatus near an object whose dispersion value is to be adjusted realizes easy adjustment.

Figure 15A:
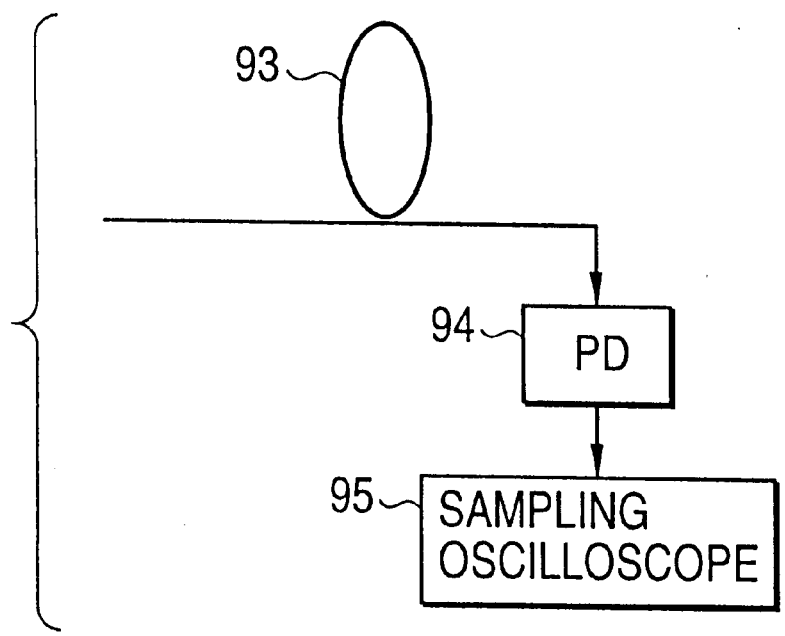
FIGS. 15(A) and 15(B) are diagrams illustrating a detector, according to an embodiment of the present invention.

FIG. 15(A) is a diagram illustrating an example of detectors 75 and 80. Referring now to FIG. 15(A), the wavelength dispersion of an optical fiber 93 is obtained by directly reading the pulse interval between optical pulses. The optical pulses transmitted through optical fiber 93 are detected by a photodiode 94. The detection result of photodiode 94 is output to a sampling oscilloscope 95 to read the pulse interval of optical pulses 415 and 416.

Figure 15B:
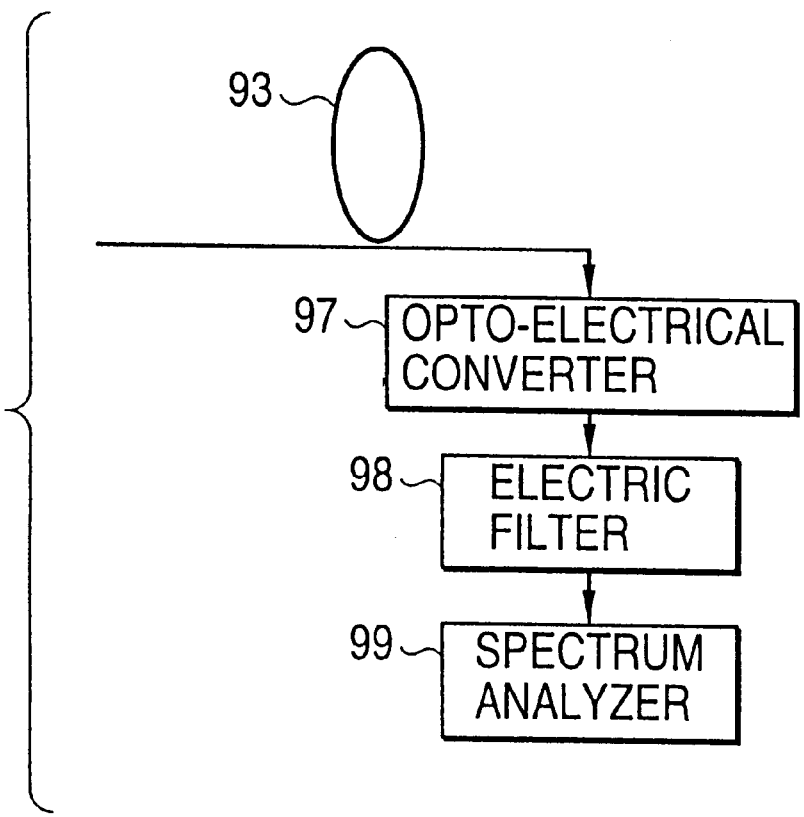

FIG. 15(B) is a diagram illustrating an additional example of detectors 75 and 80. Referring now to FIG. 15(B), the wavelength dispersion of an optical fiber 96 is obtained by measuring the frequency element based on the pulse interval between optical pulses. The optical pulses transmitted through optical fiber 93 are converted into an electric signal by an opto-electrical converter 97. After a specified frequency element is retrieved by an electric filter 98, a spectrum analyzer 99 analyzes the frequency to compute the wavelength dispersion of the optical fiber.

Figure 16A:
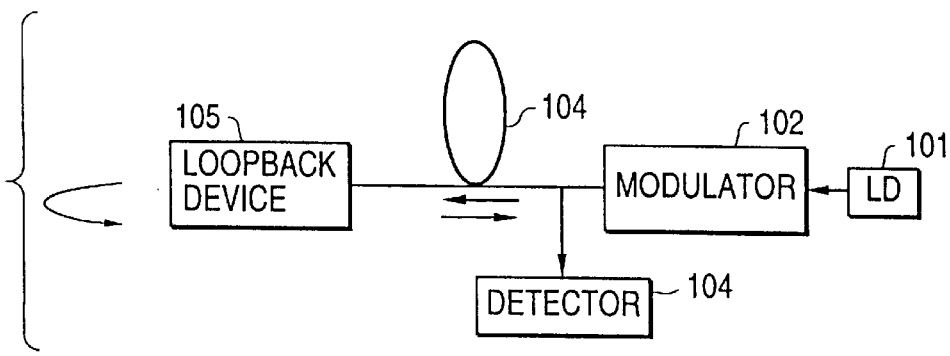
FIGS. 16(A), 16(B) and 16(C) are diagrams illustrating a dispersion measurement apparatus according to an embodiment of the present invention.
Figure 16B:
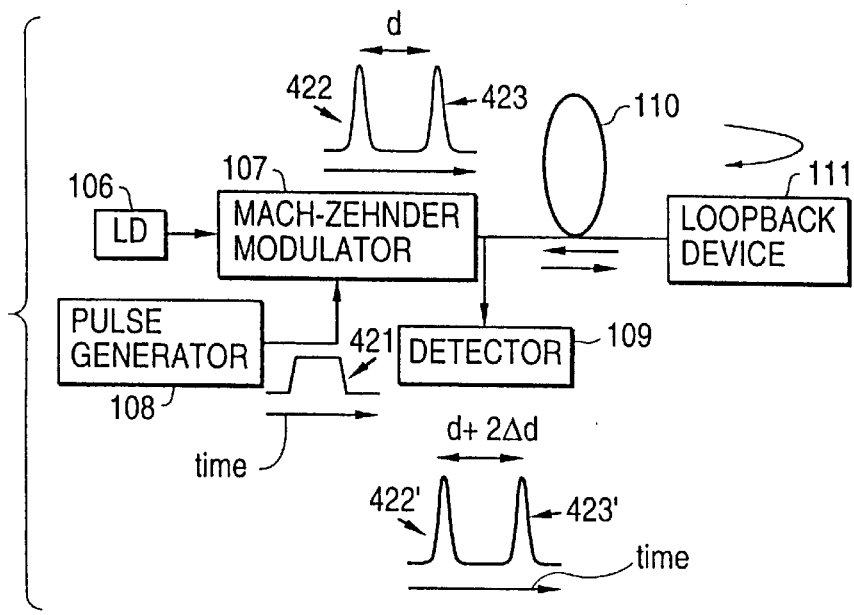
Figure 16C:
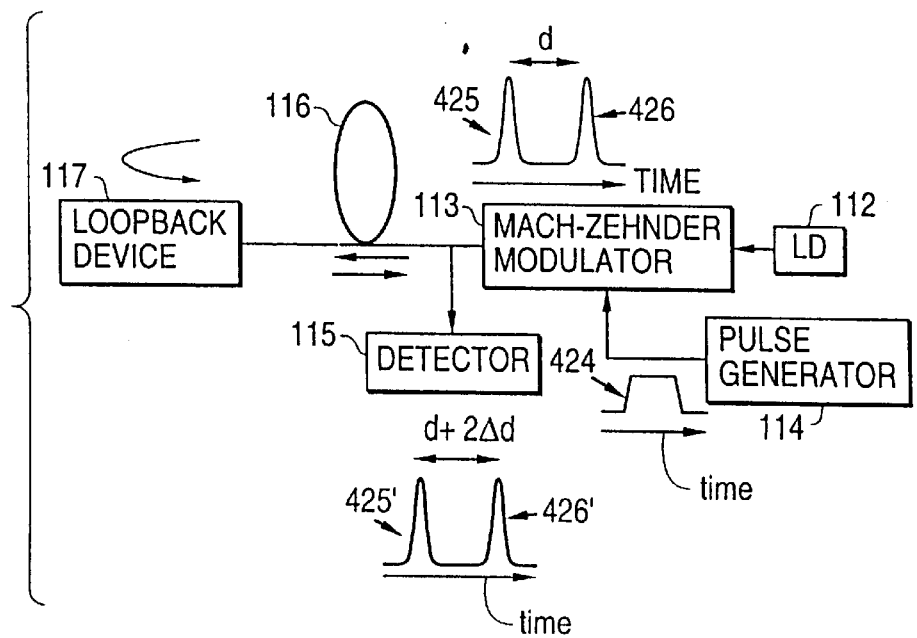

FIGS. 16(A), 16(B) and 16(C) are diagrams illustrating examples of a dispersion measurement apparatus, according to an embodiment of the present invention, wherein the precision of the dispersion measurement is improved by transmitting an optical pulse and then returning it.

Referring now to FIG. 16(A), laser light emitted from a laser diode 101 is modulated by a modulator 102 and transmitted through an optical fiber 104. The light transmitted through optical fiber 104 is reflected by a loopback device 105, and input to a detector 103 after being transmitted through optical fiber 104 again.

Thus, the measured amount of dispersion generated through optical fiber 104 can be doubled by reflecting the light by loopback device 105 and transmitting and returning the light through optical fiber 104. The dispersion can be detected with high precision even if optical fiber 104 is short or the dispersion of optical fiber 104 is small.

Referring now to FIG. 16(B), a laser diode 106, a Mach-Zehnder modulator 107, a pulse generator 108, and a detector 109 are provided on the transmission side of the optical transmission system. Laser light emitted from laser diode 106 is input to Mach-Zehnder modulator 107 and, simultaneously, a pulse signal 421 generated by pulse generator 108 is input to Mach-Zehnder modulator 107. For example, pulse generator 108 drives Mach-Zehnder modulator 107 on one side only, and sets the driving voltage Vin to double the half-wavelength voltage Vπ.

Thus, by providing only one pulse signal 421, two optical pulses 422 and 423 are output from Mach-Zehnder modulator 107, and a wavelength chirping is generated corresponding to the increment ratio of pulse signal 421, thereby producing the different wavelengths of optical pulses 422 and 423 output from Mach-Zehnder modulator 107.

Optical pulses 422 and 423 output from Mach-Zehnder modulator 107 are transmitted through an optical fiber 110, reflected by a loopback device 111 and returned to optical fiber 110. Thus, the pulses are transmitted and returned through optical fiber 110. Optical pulses 422' and 423' transmitted and returned through optical fiber 110 are detected by detector 109. The change of the pulse interval between optical pulses 422' and 423' is double the change of the pulse interval measured when the pulses pass through optical fiber 110 only once.

The pulse interval d+2Δd of optical pulses 422' and 423' is measured and compared with the pulse interval d of optical pulses 422 and 423 to compute the change 2Δd of the pulse interval. As a result, the wavelength dispersion of optical fiber 110 can be obtained by Equation (12) based on the change 2Δd of the pulse interval. High-precision measurement can be realized even if a dispersion value of optical fiber 110 and wavelength chirping Δλ are small. Laser diode 106, Mach-Zehnder modulator 107, pulse generator 108, and detector 109 can be provided on the transmission side of the optical transmission system by looping back optical pulses 422 and 423 by loopback device 111. As a result, a system configuration of a small size can be realized.

Referring now to FIG. 16(C), a laser diode 112, a Mach-Zehnder modulator 113, a pulse generator 114, and a detector 115 are provided on the receiving side of the optical transmission system. Laser light emitted from laser diode 112 is input to Mach-Zehnder modulator 113 and, simultaneously, a pulse signal 424 generated by pulse generator 114 is input to Mach-Zehnder modulator 113. For example, pulse generator 114 drives Mach-Zehnder modulator 113 on one side only, and sets the driving voltage Vin to double the half-wavelength voltage Vπ.

Thus, by providing only one pulse signal 424, two optical pulses 425 and 426 are output from Mach-Zehnder modulator 113, and a wavelength chirping is generated corresponding to the increment ratio of pulse signal 424, thereby producing the different wavelengths of optical pulses 425 and 426 output from Mach-Zehnder modulator 113.

Optical pulses 425 and 426 output from Mach-Zehnder modulator 113 are transmitted through an optical fiber 116, reflected by a loopback device 117 and returned to optical fiber 116. Thus, the pulses are transmitted and returned through optical fiber 116. Optical pulses 425' and 426' transmitted and returned through the optical fiber 116 are detected by detector 115. The change of the pulse interval of optical pulses 425' and 426' is double the change of the pulse interval measured when the pulses pass through optical fiber 116 only once.

The pulse interval d+2Δd of optical pulses 425' and 426' is measured and compared with the pulse interval d of optical pulses 425 and 426 to compute the change 2Δλ of the pulse interval. As a result, the wavelength dispersion of optical fiber 116 can be obtained by Equation (12) based on the change 2Δd of the pulse interval. High-precision measurement can be realized even if a dispersion value of optical fiber 116 and wavelength chirping Δλ are small.

Laser diode 112, Mach-Zehnder modulator 113, pulse generator 114, and detector 115 can be provided on the transmission side of the optical transmission system by looping back optical pulses 425 and 426 by loopback device 117. As a result, a system configuration of a small size can be realized.

In the examples shown in FIGS. 16(A), 16(B) and 16(C), an optical pulse is transmitted and returned through an optical fiber only once, but the optical pulse can be transmitted and returned through the optical fiber plural times.

Figure 17A:
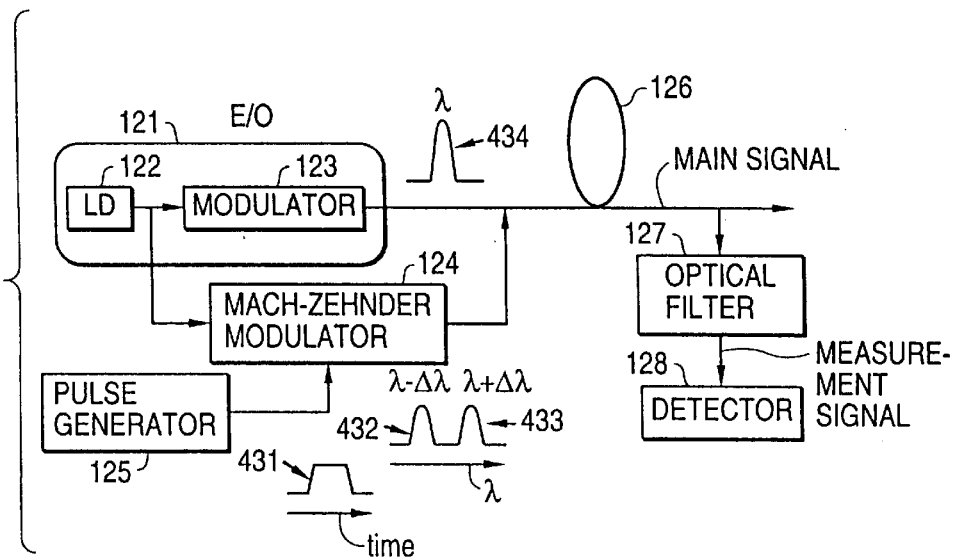
FIG. 17(A) is a diagram illustrating a dispersion measurement apparatus.
Figure 17B:
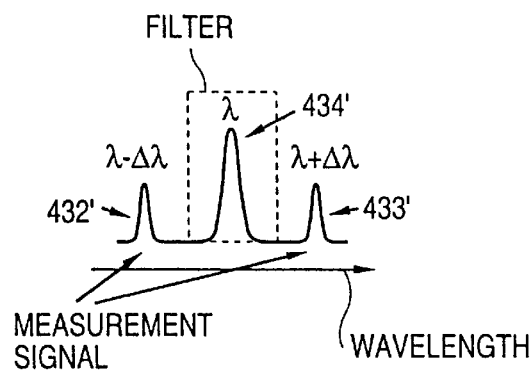
FIG. 17(B) is a diagram illustrating the extraction of a measurement signal in the dispersion measurement apparatus, according to an embodiment of the present invention.

FIG. 17(A) is a diagram illustrating a dispersion measurement apparatus, and FIG. 17(B) is a diagram illustrating the extraction of a measurement signal in the dispersion measurement apparatus, according to an embodiment of the present invention. The dispersion measurement apparatus illustrated by FIGS. 17(A) and 17(B) realizes a small, light, and inexpensive optical transmission system by using the source light of the main signal also as the source light for dispersion measurement.

Referring now to FIGS. 17(A) and 17(B), a main signal generation unit 121 is provided with a laser diode 122 and a modulator 123. A laser light having a wavelength λ emitted from laser diode 122 is modulated by modulator 123 and transmitted through an optical fiber 126. The laser light having a wavelength λ emitted from a laser diode 122 is also input to a Mach-Zehnder modulator 124 and, simultaneously, a pulse signal 431 generated by a pulse generator 125 is input to Mach-Zehnder modulator 124. For example, pulse generator 125 drives Mach-Zehnder modulator 124 on one side only, and sets the driving voltage Vin to double the half-wavelength voltage Vπ.

When pulse generator 125 inputs pulse signal 431 to Mach-Zehnder modulator 124, an optical pulse 432 having a wavelength λ−Δλ and an optical pulse 433 having a wavelength λ+Δλ are output from Mach-Zehnder modulator 124. Optical pulses 432 and 433 are transmitted through optical fiber 126 together with an optical pulse 434 of a main signal output from modulator 123.

Only optical pulse 432' having a wavelength λ−Δλ and optical pulse 433' having a wavelength λ+Δλ are extracted through an optical filter 127 from among optical pulse 432' having a wavelength λ−Δλ, optical pulse 433' having a wavelength λ+Δλ, and optical pulse 434' having a wavelength λ transmitted through optical fiber 126. The extracted pulses are transmitted to a detector 128.

Detector 128 detects optical pulses 432' and 433', measures the pulse interval d+Δd of optical pulses 432' and 433', compares the pulse interval d of optical pulses 432 and 433 before the transmission, and computes the change Δd of the pulse interval. As a result, the wavelength dispersion of optical fiber 126 is obtained by Equation (12) based on the change Δd of the pulse interval.

Thus, a part of the laser light emitted from laser diode 122 is transmitted to Mach-Zehnder modulator 124, and optical pulses 432 and 433 for dispersion measurement are generated to avoid the necessity of providing a light source exclusively for the dispersion measurement. As a result, a small, light, and inexpensive dispersion measurement apparatus can be realized.

Figure 18A:
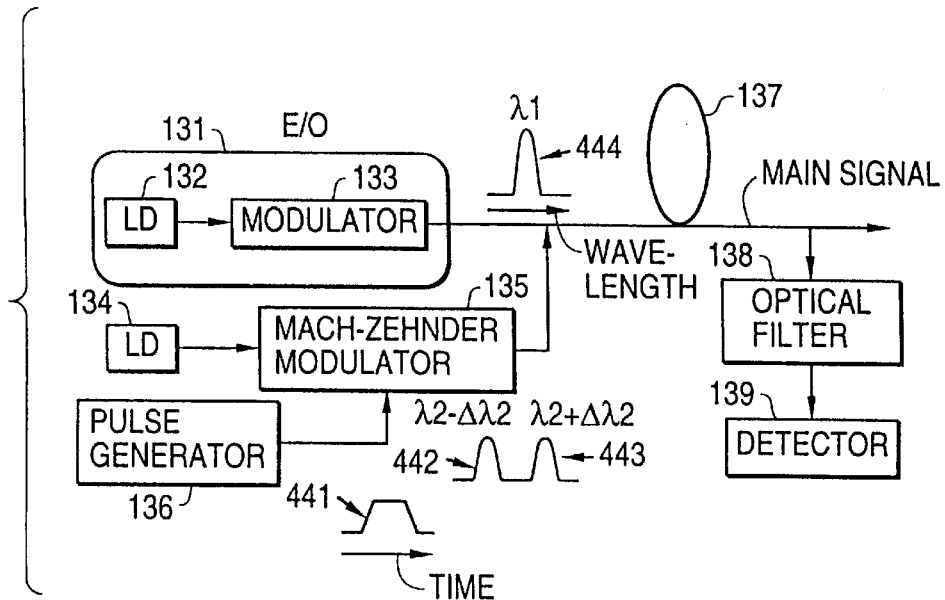
FIG. 18(A) is a diagram illustrating a dispersion measurement apparatus.
Figure 18B:
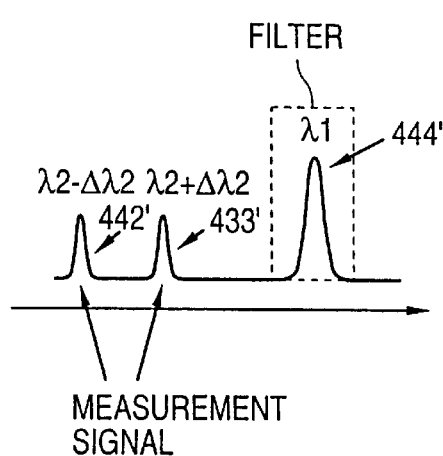
FIG. 18(B) is a diagram illustrating the extraction of a measurement signal in the dispersion measurement apparatus, according to an embodiment of the present invention.

FIG. 18(A) is a diagram illustrating a dispersion measurement apparatus, and FIG. 18(B) is a diagram illustrating the extraction of a measurement signal in the dispersion measurement apparatus, according to an embodiment of the present invention. The dispersion measurement apparatus in FIGS. 18(A) and 18(B) provides a light source for a main signal separately from a light source for dispersion measurement to reduce the influence of the main signal when performing the dispersion measurement by using one optical wavelength for the main signal and a different wavelength for the dispersion measurement.

Referring now to FIGS. 18(A) and 18(B), a main signal generation unit 131 is provided with a laser diode 132 and a modulator 133. A laser light having a wavelength λ1 emitted from laser diode 132 is modulated by modulator 133 and transmitted through an optical fiber 137. The laser light having a wavelength λ2 emitted from a laser diode 134 is input to a Mach-Zehnder modulator 135 and, simultaneously, a pulse signal 441 generated by a pulse generator 136 is input to Mach-Zehnder modulator 135. For example, pulse generator 136 drives Mach-Zehnder modulator 135 on one side only, and sets the driving voltage Vin to double the half-wavelength voltage Vπ.

When pulse generator 136 inputs pulse signal 441 to Mach-Zehnder modulator 135, an optical pulse 442 having a wavelength λ2−Δλ2 and an optical pulse 443 having a wavelength λ2+Δλ2 are output from Mach-Zehnder modulator 135. Optical pulses 442 and 443 are transmitted through optical fiber 137 together with an optical pulse 444 of a main signal output from modulator 133.

Only optical pulse 442' having a wavelength λ2−Δλ2 and optical pulse 443' having a wavelength λ2+Δλ2 are extracted through an optical filter 138 from among optical pulse 442' having a wavelength λ2−Δλ2, optical pulse 443' having a wavelength λ2+Δλ2, and optical pulse 444' having a wavelength λ1 transmitted through optical fiber 137. The extracted pulses are transmitted to a detector 139.

Detector 139 detects optical pulses 442' and 443', measures the pulse interval d+Δd between optical pulses 442' and 443', compares the pulse interval d of optical pulses 442 and 443 before the transmission, and computes the change Δd of the pulse interval. As a result, the wavelength dispersion of optical fiber 137 is obtained by Equation (12) based on the change Δd of the pulse interval.

Using the wavelength λ1 of optical pulse 444' of a main signal which is different from the wavelengths λ2−Δλ2 and λ2+Δλ2 for optical pulses 442' and 443', respectively, for dispersion measurement, only optical pulses 442' and 443' can be easily extracted through optical filter 138 from a signal containing optical pulse 444' and optical pulses 442' and 443'.

When the wavelength of the light source for dispersion measurement is different from the wavelength of a main signal light, a dispersion value can also be measured in consideration of the secondary dispersion of optical fiber 137 from the difference in wavelength.

Figure 19:
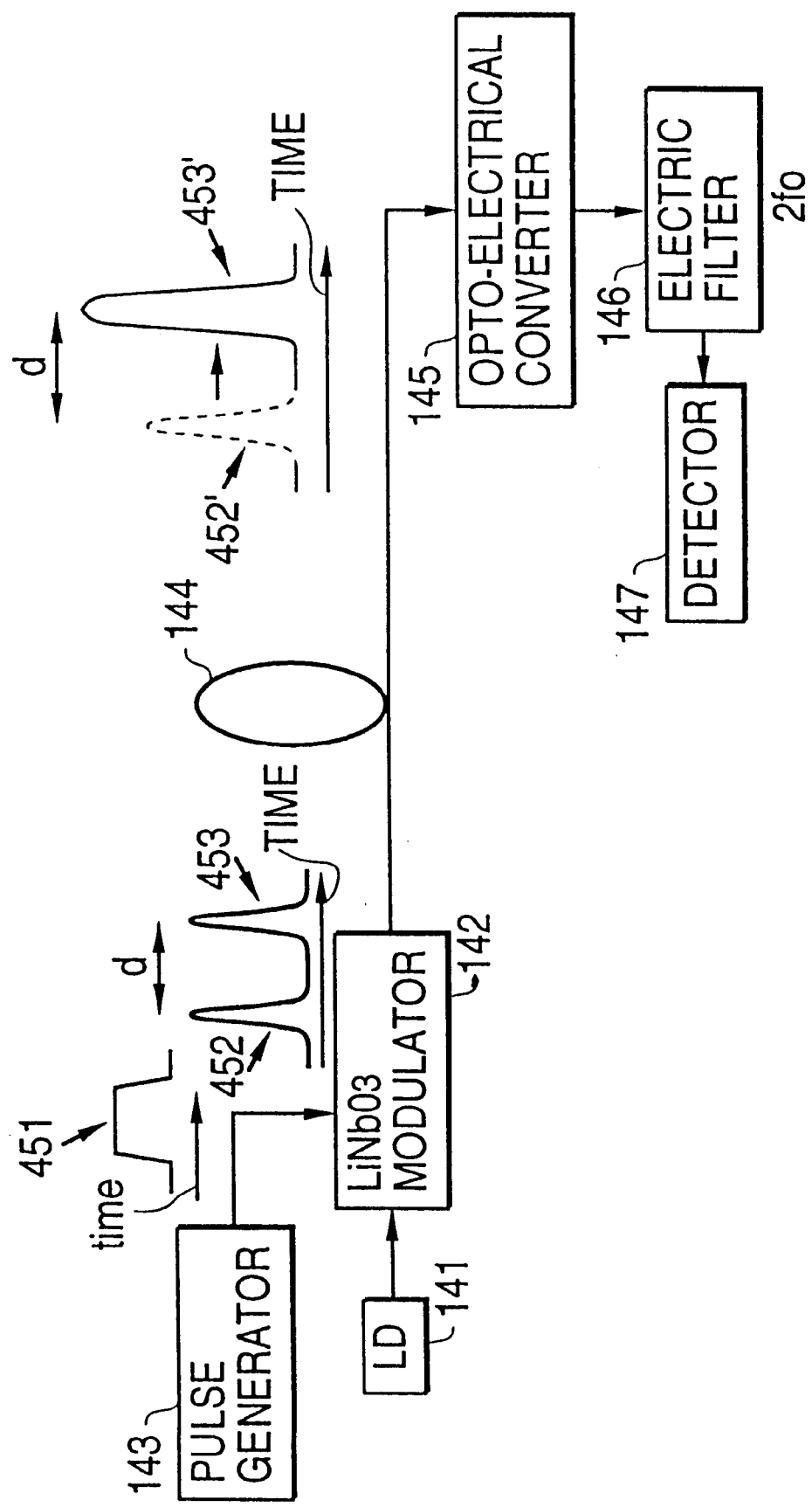
FIG. 19 is a diagram illustrating a dispersion measurement apparatus, according to a further embodiment of the present invention.

FIG. 19 is a diagram illustrating a dispersion measurement apparatus, according to a further embodiment of the present invention. The dispersion measurement apparatus in FIG. 19 converts a transmitted optical pulse into an electric signal, and obtains the amount of dispersion in a transmission line based on a frequency element of the electric signal. In FIG. 19, an LiNbO$_3$ modulator is used as a Mach-Zehnder modulator.

Referring now to FIG. 19, laser light emitted from a laser diode 141 is input to LiNbO$_3$ modulator 142 and, simultaneously, a pulse signal 451 generated by a pulse generator 143 is input to LiNbO$_3$ modulator 142. For example, pulse generator 143 drives LiNbO$_3$ modulator 142 on one side only, and sets the driving voltage Vin to double the half-wavelength voltage Vπ.

Thus, by providing only one pulse signal 451, two optical pulses 452 and 453 are output from LiNbO$_3$ modulator 142, and a wavelength chirping is generated corresponding to the increment ratio of pulse signal 451, thereby producing the different wavelengths of optical pulses 452 and 453 output from LiNbO$_3$ modulator 142.

Optical pulses 452 and 453 output from LiNbO$_3$ modulator 142 are input to an optical fiber 144. Optical pulse 452' transmitted through optical fiber 144 can be incorporated into optical pulse 453' by adjusting the time interval between optical pulses 452 and 453. Therefore, assuming that the frequency element of optical pulses 452 and 453 before the transmission is 2f0, the frequency element of optical pulse 453' after the transmission through optical fiber 144 is f0.

Optical pulse 453' is converted into an electric signal by an opto-electrical converter 145, and a signal of a frequency element 2f0 is extracted through an electric filter 146 and output to a detector 147. Then, the wavelength dispersion of optical fiber 144 can be obtained by reading the time interval d when the detected signal is only a signal of the frequency element f0 and the frequency element 2f0 becomes 0.

FIGS. 20(A) (1), 20(A) (2), 20(B) (1), 20(B) (2), 20(C) (1) and 20(C) (2) are diagrams illustrating a method of measuring a dispersion value by comparing the spectrum element of a pulse string before and after transmission, according to an embodiment of the present invention.

More specifically, FIG. 20(A) (1) is a graph illustrating various pulses before transmission through an optical fiber. FIG. 20(A) (2) illustrates the Fourier transform of FIG. 20(A) (1). FIG. 20(B) (1) is a graph illustrating the pulses after transmission through an optical fiber. FIG. 20(B) (2) illustrates the Fourier transform of FIG. 20(B) (1). FIG. 20(C) (1) is a graph illustrating the pulses after further transmission through the optical fiber. FIG. 20(C) (2) illustrates the Fourier transform of FIG. 20(C) (1).

Referring now to FIGS. 20(A) (1), 20(A) (2), 20(B) (1), 20(B) (2), 20(C) (1) and 20(C) (2), optical pulses 462 through 464 are generated corresponding to the rise and decay of pulse signals 461 and 465 whose frequency is 1/f0. Therefore, the frequency element through optical pulses 462 through 464 is 2f0. Since optical pulses 462 and 465 generated at the rise time of pulse signals 461 and 465 are different in wavelength from an optical pulse 463 generated at the decay time of pulse signal 461, a group delay difference occurs between optical pulses 462 and 465 and optical pulse 463 when optical pulses 462 through 464 are transmitted. Thus, there is a difference in pulse interval between optical pulses 462 through 464 before the transmission and optical pulses 462' through 464' after the transmission.

If the transmission continues, optical pulse 463' is incorporated into optical pulse 464', and an optical pulse 464" is generated. At this time, the frequency element through optical pulses 462" and 464" is f0.

The amount of dispersion compensation can be set by detecting the frequency element through the optical pulse after the transmission.

Figure 21A:
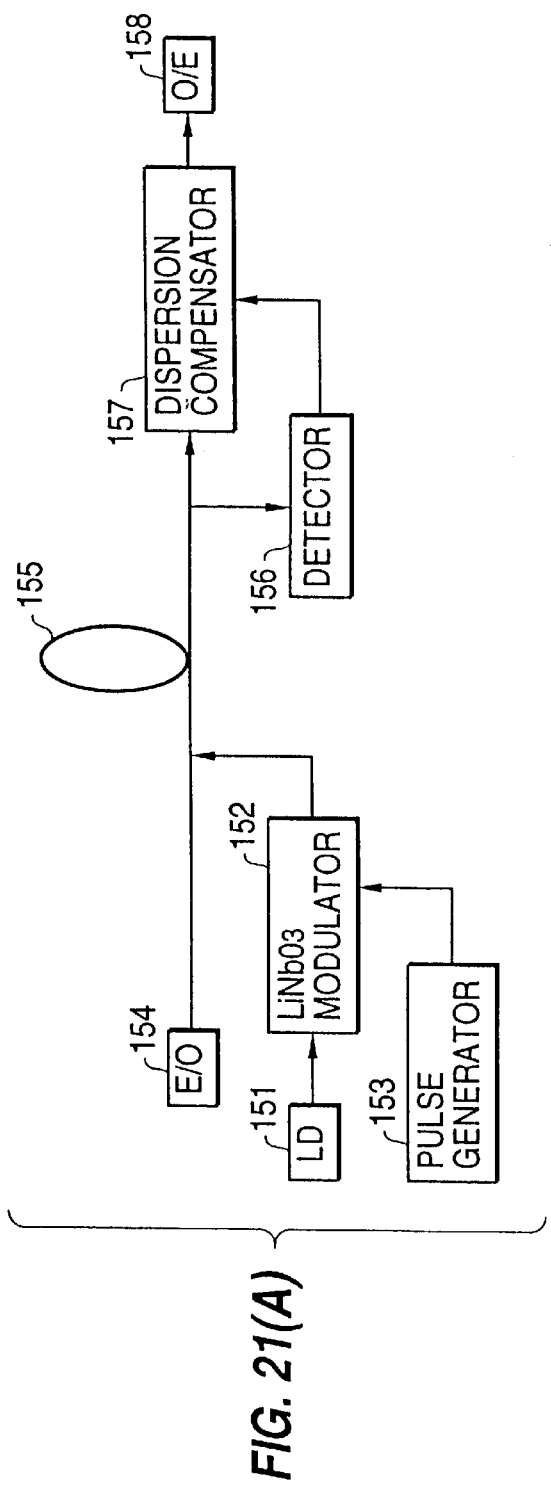
FIG. 21(A) is a diagram illustrating a dispersion compensation apparatus applied to a transmission system without a repeater, according to an embodiment of the present invention.

FIG. 21(A) is a diagram illustrating a dispersion compensation apparatus applied to a transmission system without a repeater, according to an embodiment of the present invention. The dispersion compensation apparatus of FIG. 21(A) converts a light output from a single light source into a plurality of optical pulses having different wavelengths, and performs dispersion compensation of a transmission line based on a measured dispersion amount when the optical pulses are transmitted through the transmission line. This method is available when it is necessary to measure the dispersion value of a transmission line when the system is first started.

Referring now to FIG. 21(A), laser light emitted from a laser diode 151 is input to an LiNbO$_3$ modulator 152 and, simultaneously, a pulse signal generated by a pulse generator 153 is input to LiNbO$_3$ modulator 152. For example, pulse generator 153 drives LiNbO$_3$ modulator 152 on one side only, and sets the driving voltage Vin to double the half-wavelength voltage Vπ.

Thus, by providing only one pulse signal, two optical pulses are output from LiNbO$_3$ modulator 152, and a wavelength chirping is generated corresponding to the increment ratio of the pulse signal, thereby producing the different wavelengths of the optical pulses output from LiNbO$_3$ modulator 152, and thereby easily facilitating dispersion measurement.

The two optical pulses output from LiNbO$_3$ modulator 152 are input to an optical fiber 155, and the optical pulses obtained through optical fiber 155 are detected by a detector 156. The pulse interval d+Δd between the optical pulses after the transmission through optical fiber 155 is measured, and compared with the pulse interval d of the optical pulses before the transmission through optical fiber 155 in order to compute the change Δd of the pulse interval. As a result, the wavelength dispersion of optical fiber 155 is obtained by Equation (12) based on the change Δd of the pulse interval.

Detector 156 outputs the detection result of the wavelength dispersion to a dispersion compensator 157. Dispersion compensator 157 compensates the wavelength dispersion of optical fiber 155 based on the detection result of the wavelength dispersion output from detector 156. As a result, when a main signal output from a main signal generation unit 154 is transmitted through optical fiber 155 to a main signal detection unit 158, the wavelength dispersion generated during the transmission through optical fiber 155 can be compensated for by dispersion compensator 157, thereby realizing super-high-speed optical transmission.

For example, when a signal of 40 Gb/s is transmitted for 50 km through a 1.3 μm zero-dispersion single mode fiber, the wavelength dispersion of the 1.3 μm zero-dispersion single mode fiber can be exactly compensated for by accurately adjusting the length of the dispersion compensation fiber based on the detection result of the wavelength dispersion output from detector 156. Therefore, an optical signal can be correctly transmitted even when there is only a small dispersion compensation tolerance.

Figure 21B:
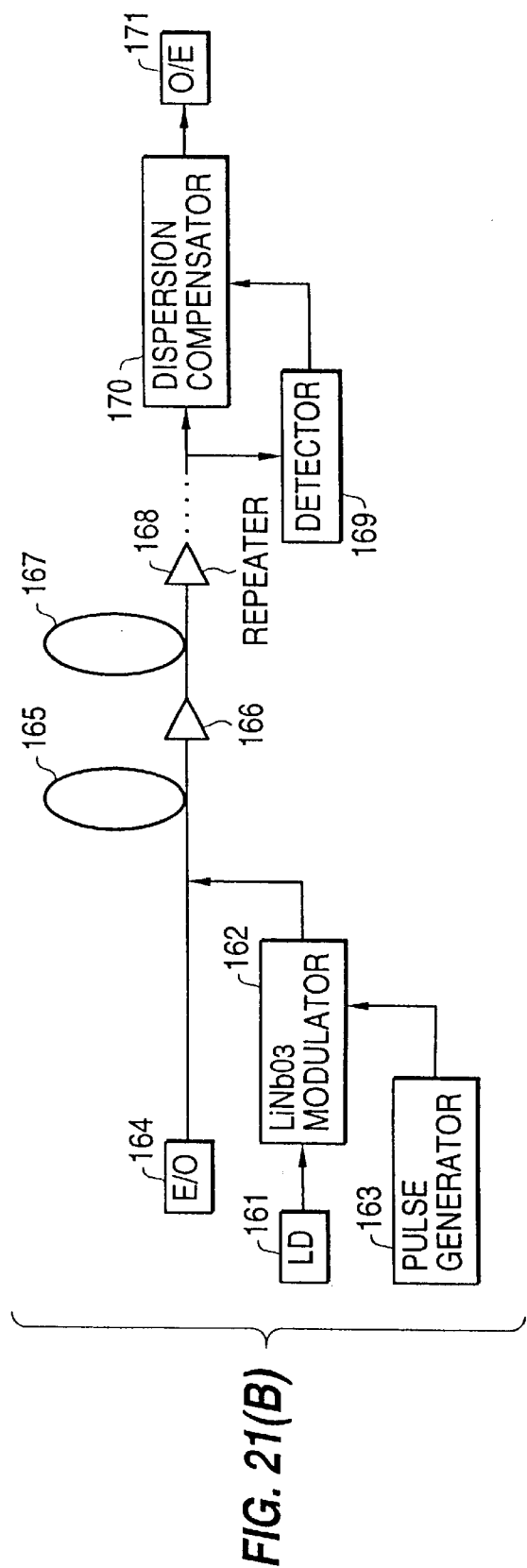
FIG. 21(B) is a diagram illustrating a dispersion compensation apparatus applied to a multiple-repeater transmission system, according to an embodiment of the present invention.

FIG. 21(B) is a diagram illustrating a dispersion compensation apparatus applied to a multiple-repeater transmission system, according to an embodiment of the present invention.

Referring now to FIG. 21(B), laser light emitted from a laser diode 161 is input to LiNbO$_3$ modulator 162 and, simultaneously, a pulse signal generated by a pulse generator 163 is input to LiNbO$_3$ modulator 162. For example, pulse generator 163 drives LiNbO$_3$ modulator 162 on one side only, and sets the driving voltage Vin to double the half-wavelength voltage Vπ.

Thus, by providing only one pulse signal, two optical pulses are output from LiNbO$_3$ modulator 162, and a wavelength chirping is generated corresponding to the increment ratio of the pulse signal, thereby producing the different wavelengths of the optical pulses output from LiNbO$_3$ modulator 162, and thereby easily facilitating dispersion measurement.

The two optical pulses output from LiNbO$_3$ modulator 162 are input to and transmitted through an optical fiber 165, and then amplified in a repeater 166. The optical pulses amplified in repeater 166 are input to and transmitted through an optical fiber 167, and then amplified in a repeater 168. The optical pulses amplified by repeater 168 are detected by a detector 169. The pulse interval d+Δd between the optical pulses after the transmission through optical fibers 165 and 167 is measured, and compared with the pulse interval d of the optical pulses before the transmission through optical fibers 165 and 167 in order to compute the change Δd of the pulse interval. As a result, the wavelength dispersion of optical fibers 165 and 167 is obtained by Equation (12) based on the change Δd of the pulse interval.

Detector 169 outputs the detection result of the wavelength dispersion to a dispersion compensator 170. Dispersion compensator 170 compensates the wavelength dispersion of optical fibers 165 and 167 based on the detection result of the wavelength dispersion output from detector 169. As a result, when a main signal output from a main signal generation unit 164 is transmitted through optical fibers 165 and 167 to a main signal detection unit 171, any loss caused during the transmission through optical fibers 165 and 167 can be compensated by repeaters 166 and 168, and the wavelength dispersion generated during the transmission through optical fibers 165 and 167 can be compensated by dispersion compensator 170, thereby realizing super-high-speed and long-distance optical transmission.

FIG. 22(A) is a diagram illustrating a dispersion compensation apparatus applied to a transmission system without a repeater, according to an embodiment of the present invention. The dispersion compensation apparatus illustrated in FIG. 22(A) converts a light output from a single light source into a plurality of optical pulses having different wavelengths, and dynamically performs dispersion compensation of a transmission line based on a dispersion amount when the optical pulses are transmitted through the transmission line. This method is not only available when it is necessary to measure the dispersion value of a transmission line when the system is started, but also applicable when it is necessary to constantly monitor a dispersion value during operation, and to appropriately set the amount of dispersion compensation.

Referring now to FIG. 22(A), laser light emitted from a laser diode 181 is input to LiNbO$_3$ modulator 182 and, simultaneously, a pulse signal generated by a pulse generator 183 is input to LiNbO$_3$ modulator 182. For example, pulse generator 183 drives LiNbO$_3$ modulator 182 on one side only, and sets the driving voltage Vin to double the half-wavelength voltage Vπ.

Thus, by providing only one pulse signal, two optical pulses are output from LiNbO$_3$ modulator 182, and a wavelength chirping is generated corresponding to the increment ratio of the pulse signal, thereby producing the different wavelengths of the optical pulses output from LiNbO$_3$ modulator 182, and thereby easily facilitating dispersion measurement.

The two optical pulses output from LiNbO$_3$ modulator 182 are input to an optical fiber 185, and the optical pulse obtained through optical fiber 185 is detected by a detector 186. The pulse interval d+Δd between the optical pulses after the transmission through optical fiber 185 is measured, and compared with the pulse interval d of the optical pulses before the transmission through optical fiber 185 in order to compute the change Δd of the pulse interval. As a result, the wavelength dispersion of optical fiber 185 is obtained by Equation (12) based on the change Δd of the pulse interval.

Detector 186 outputs the detection result of the wavelength dispersion to a variable dispersion compensator 187. Variable dispersion compensator 187 compensates in real time the wavelength dispersion of optical fiber 185 based on the detection result of the wavelength dispersion output from detector 186. When the pulse intervals before and after the transmission match each other, the dispersion of optical fiber 185 is completely compensated for. As a result, when a main signal output from a main signal generation unit 184 is transmitted through optical fiber 185 to a main signal detection unit 188, the wavelength dispersion generated during the transmission through optical fiber 185 can be constantly and optimally compensated for by dispersion compensator 187, thereby constantly and stably realizing super-high-speed optical transmission.

FIG. 22(B) is a diagram illustrating a dispersion compensation apparatus applied to a multiple-repeater transmission system, according to an embodiment of the present invention.

Referring now to FIG. 22(B), laser light emitted from a laser diode 191 is input to LiNbO$_3$ modulator 192 and, simultaneously, a pulse signal generated by a pulse generator 193 is input to LiNbO$_3$ modulator 192. For example, pulse generator 193 drives LiNbO$_3$ modulator 192 on one side only, and sets the driving voltage Vin to double the half-wavelength voltage Vπ.

Thus, by providing only one pulse signal, two optical pulses are output from LiNbO$_3$ modulator 192, and a wavelength chirping is generated corresponding to the increment ratio of the pulse signal, thereby producing the different wavelengths of the optical pulses output from LiNbO$_3$ modulator 192, and thereby easily facilitating dispersion measurement.

The two optical pulses output from LiNbO$_3$ modulator 192 are input to and transmitted through an optical fiber 195, and then amplified in a repeater 196. The optical pulses amplified in repeater 196 are input to and transmitted through an optical fiber 197, and then amplified by repeater 198. The optical pulses amplified by repeater 198 are detected by a detector 199. The pulse interval d+Δd between the optical pulses after the transmission through optical fibers 195 and 197 is measured, and compared with the pulse interval d of the optical pulses before the transmission through optical fibers 195 and 197 in order to compute the change Δd of the pulse interval. As a result, the wavelength dispersion of optical fibers 195 and 197 is obtained by Equation (12) based on the change Δd of the pulse interval.

Detector 199 outputs the detection result of the wavelength dispersion to a variable dispersion compensator 200. Variable dispersion compensator 200 compensates in real time the wavelength dispersion of optical fibers 195 and 197 based on the detection result of the wavelength dispersion output from detector 199. When the pulse intervals before and after the transmission match each other, the dispersion of optical fibers 195 and 197 is completely compensated for. As a result, when a main signal output from an optical transmitter 194 is transmitted through optical fibers 195 and 197 to an optical receiver 201, any loss caused during the transmission through optical fibers 195 and 197 can be compensated for by repeaters 196 and 198, and the wavelength dispersion generated during the transmission through optical fibers 195 and 197 can be compensated for by dispersion compensator 200, thereby realizing super-high-speed and long-distance optical transmission. Variable dispersion compensators 187 and 200 can also be used with a fixed dispersion compensator.

Figure 23:
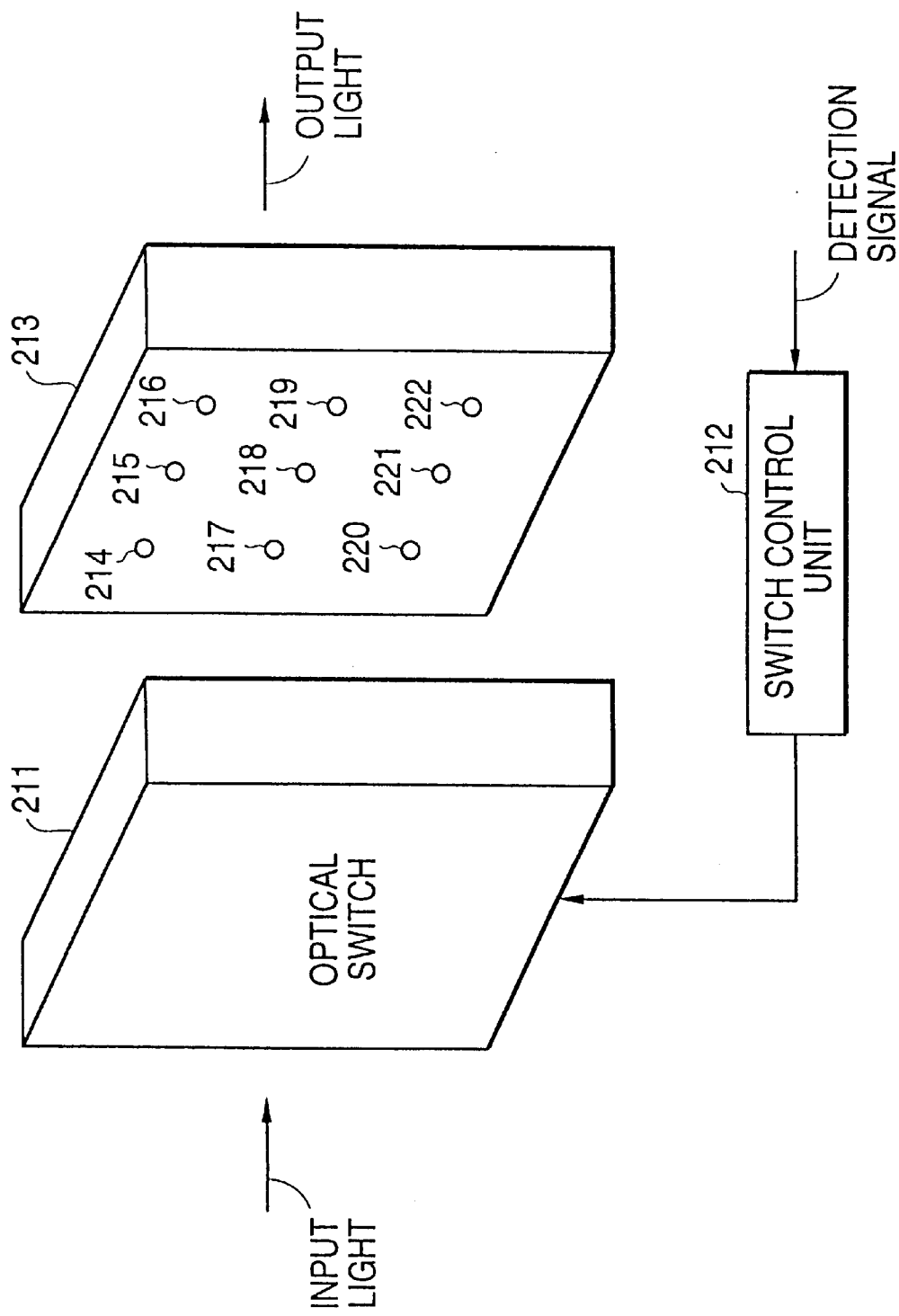
FIG. 23 is a diagram illustrating a variable dispersion compensation apparatus, according to an embodiment of the present invention.

FIG. 23 is a diagram illustrating an example of the configuration of variable dispersion compensators 187 and 200 in FIG. 22, according to an embodiment of the present invention.

Referring now to FIG. 23, the variable dispersion compensator comprises an optical switch 211, a switch control unit 212 controlling optical switch 211 according to a wavelength dispersion detection signal, and a dispersion compensator 213. Dispersion compensator 213 includes dispersion compensation fibers 214 through 222 which are different in length.

Switch control unit 212 receives a wavelength dispersion detection signal and selects one of dispersion compensation fibers 214 through 222 for compensating the input wavelength dispersion by controlling optical switch 211. When switch control unit 212 switches optical switch 211, an input light is led to and enters the selected one of dispersion compensation fibers 214 through 222. When the input light passes through the selected one of dispersion compensation fibers 214 through 222, the dispersion of the input light is compensated for.

Figures 24A, 24B:
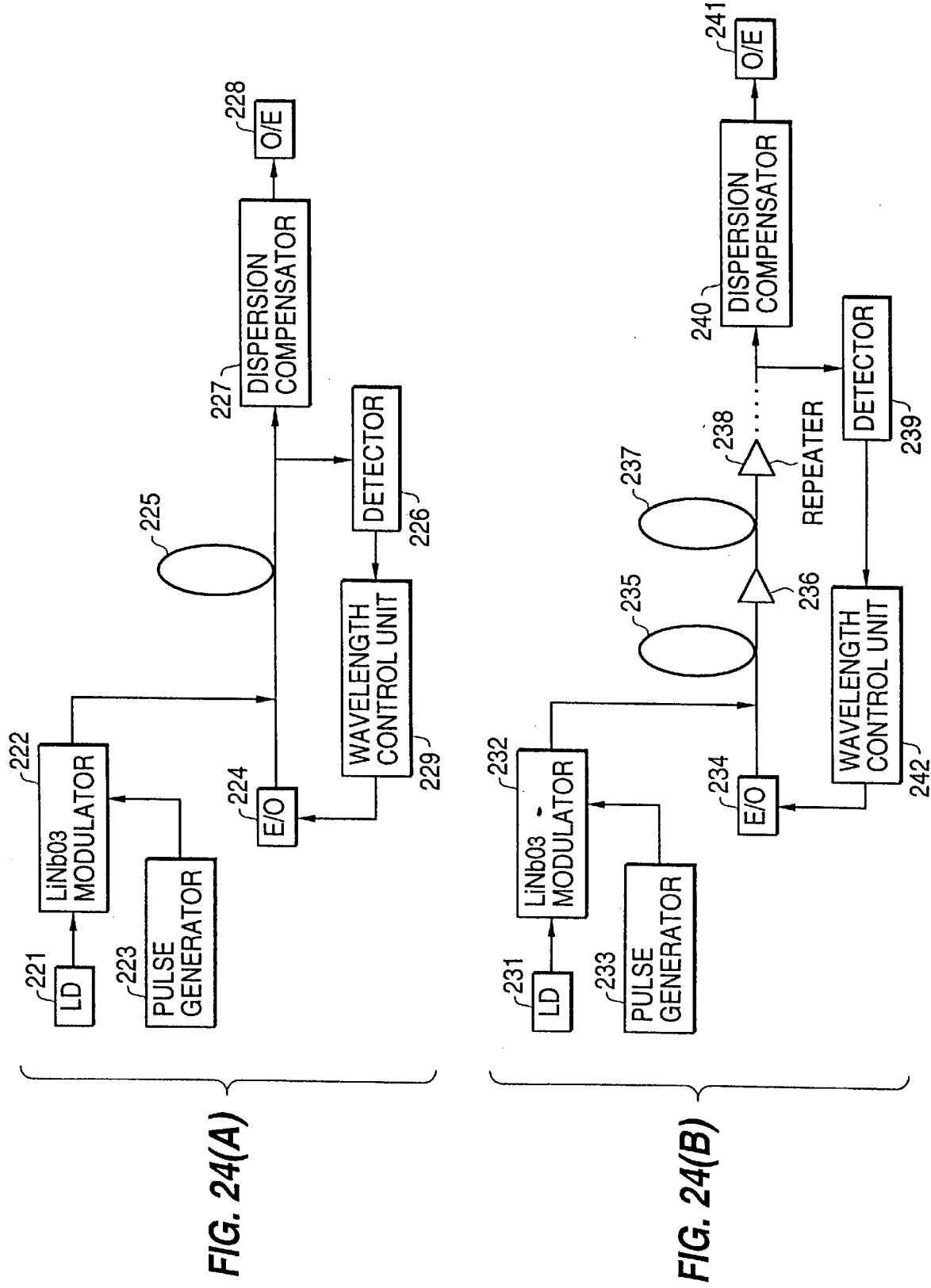
FIG. 24(A) is a diagram illustrating a dispersion compensation is apparatus, applied to a transmission system without a repeater, according to an embodiment of the present invention.
FIG. 24(B) is a diagram illustrating a dispersion compensation apparatus applied to a multiple-repeater transmission system, according to an embodiment of the present invention.

FIG. 24(A) is a diagram illustrating a dispersion compensation apparatus applied to a transmission system without a repeater, according to an embodiment of the present invention. The dispersion compensation apparatus in FIG. 24(A) compensates the wavelength dispersion of a main signal light by changing the wavelength of the main signal light based on the amount of dispersion in a transmission line.

Referring now to FIG. 24(A), laser light emitted from a laser diode 221 is input to LiNbO$_3$ modulator 222 and, simultaneously, a pulse signal generated by a pulse generator 223 is input to LiNbO$_3$ modulator 222. For example, pulse generator 223 drives LiNbO$_3$ modulator 222 on one side only, and sets the driving voltage Vin to double the half-wavelength voltage Vπ.

Thus, by providing only one pulse signal, two optical pulses are output from LiNbO$_3$ modulator 222, and a wavelength chirping is generated corresponding to the increment ratio of the pulse signal, thereby producing the different wavelengths of the optical pulses output from LiNbO$_3$ modulator 222, and thereby easily facilitating dispersion measurement.

The two optical pulses output from LiNbO$_3$ modulator 222 are input to an optical fiber 225, and the optical pulses transmitted through optical fiber 225 are detected by a detector 226. The pulse interval d+Δd between the optical pulses after the transmission through optical fiber 225 is measured, and compared with the pulse interval d of the optical pulses before the transmission through optical fiber 225 in order to compute the change Δd of the pulse interval. As a result, the wavelength dispersion of optical fiber 225 is obtained by Equation (12) based on the change Δd of the pulse interval.

Detector 226 outputs the wavelength dispersion detection result to a wavelength control unit 229. The wavelength control unit 229 changes the wavelength of a laser light output from a main signal generation unit 224 according to the wavelength dispersion detection result output from detector 226, and thereby compensates for the wavelength dispersion of optical fiber 225. The amount of wavelength change Δλ' (nm) of the laser light output from main signal generation unit 224 is computed as follows:

$$\Delta\lambda' = \Delta d/(D \cdot L) \quad (13)$$

where Δd (ps) indicates the change of a pulse interval, D (ps/nm/km) indicates the wavelength dispersion in a transmission line, and L indicates a transmission distance.

As a result, when a main signal output from a main signal generation unit 224 is transmitted through optical fiber 225 to a main signal detection unit 228, the wavelength dispersion generated during the transmission through optical fiber 225 can be compensated for, thereby realizing a super-high-speed optical transmission.

Thus, the dispersion compensation can be performed in a transmission line by adjusting the wavelength of a light source. As a result, a small, light, and inexpensive dispersion compensation apparatus can be realized by reducing the number of parts required in the dispersion compensation system.

To change the wavelength of laser light output from main signal generation unit 224, a wavelength variable laser can be used as a light source for main signal generation unit 224.

The dispersion compensation of optical fiber 225 can be performed with high precision by providing a dispersion compensator 227 in the transmission line, approximately performing the dispersion compensation of optical fiber 225 through dispersion compensator 227, and by changing the wavelength of the laser light output from main signal generation unit 224.

FIG. 24(B) is a diagram illustrating a dispersion compensation apparatus applied to a multiple-repeater transmission system, according to an embodiment of the present invention.

Referring now to FIG. 24(B), laser light emitted from a laser diode 231 is input to LiNbO$_3$ modulator 232 and, simultaneously, a pulse signal generated by a pulse generator 233 is input to LiNbO$_3$ modulator 232. For example, pulse generator 233 drives LiNbO$_3$ modulator 232 on one side only, and sets the driving voltage Vin to double the half-wavelength voltage Vπ.

Thus, by inputting only one pulse signal, two optical pulses are output from LiNbO$_3$ modulator 232, and a wavelength chirping is generated corresponding to the increment ratio of the pulse signal, thereby producing the different wavelengths of the optical pulses output from LiNbO$_3$ modulator 232, and thereby easily facilitating dispersion measurement.

The two optical pulses output from LiNbO$_3$ modulator 232 are input to and transmitted through an optical fiber 235, and then amplified in a repeater 236. The optical pulses amplified in repeater 236 are input to and transmitted through an optical fiber 237, and then amplified by repeater 238. The optical pulses amplified by repeater 238 are detected by a detector 239. The pulse interval d+Δd of the optical pulses after the transmission through optical fibers 235 and 237 is measured, and compared with the pulse interval d of the optical pulses before the transmission through optical fibers 235 and 237 in order to compute the change Δd of the pulse interval. As a result, the wavelength dispersion of optical fibers 235 and 237 is obtained by Equation (12) based on the change Δd of the pulse interval.

Detector 239 outputs the wavelength dispersion detection result to a wavelength control unit 242. Wavelength control unit 242 changes the wavelength of a laser light output from a main signal generation unit 234 according to the wavelength dispersion detection result output from detector 239, and compensates the wavelength dispersion of optical fibers 235 and 237. The amount of wavelength change $\Delta\lambda'$ (nm) of the laser light output from main signal generation unit 234 is computed by Equation (13).

As a result, when a main signal output from main signal generation unit 234 is transmitted through optical fibers 235 and 237 to a main signal detection unit 241, the loss caused during the transmission can be compensated for by repeaters 236 and 238, and the wavelength dispersion generated during the transmission can be compensated for, thereby realizing a super-high-speed and long-distance optical transmission.

To change the wavelength of a laser light output from main signal generation unit 234, a wavelength variable laser can be used as a light source for main signal generation unit 234.

The dispersion compensation of optical fibers 235 and 237 can be performed with high precision by providing a dispersion compensator 240 in a transmission line, approximately performing the dispersion compensation of optical fibers 235 and 237 through dispersion compensator 240, and changing the wavelength of the laser light output from main signal generation unit 234.

FIG. 25(A) is a diagram illustrating a dispersion compensation apparatus applied to a transmission system without a repeater, according to an embodiment of the present invention. The dispersion compensation apparatus in FIG. 25(A) compensates the wavelength dispersion of a main signal light by changing the output power of the main signal light based on the amount of dispersion in a transmission line.

Referring now to FIG. 25(A), laser light emitted from a laser diode 251 is input to LiNbO$_3$ modulator 252 and, simultaneously, a pulse signal generated by a pulse generator 253 is input to LiNbO$_3$ modulator 252. For example, pulse generator 253 drives LiNbO$_3$ modulator 252 on one side only, and sets the driving voltage Vin to double the half-wavelength voltage V$\pi$.

Thus, by providing only one pulse signal, two optical pulses are output from LiNbO$_3$ modulator 252, and a wavelength chirping is generated corresponding to the increment ratio of the pulse signal, thereby producing the different wavelengths of the optical pulses output from LiNbO$_3$ modulator 252, and thereby easily facilitating dispersion measurement.

The two optical pulses output from LiNbO$_3$ modulator 252 are input to an optical fiber 255, and the optical pulses transmitted through optical fiber 255 are detected by a detector 256. The pulse interval d+$\Delta$d of the optical pulses after the transmission through optical fiber 255 is measured, and compared with the pulse interval d of the optical pulses before the transmission through optical fiber 255 in order to compute the change $\Delta$d of the pulse interval. As a result, the wavelength dispersion of optical fiber 255 is obtained by Equation (12) based on the change $\Delta$d of the pulse interval.

Detector 256 outputs the wavelength dispersion detection result to a optical power control unit 259. Optical power control unit 259 changes the optical power of a laser light output from a main signal generation unit 254 according to the wavelength dispersion detection result output from detector 256, and compensates for the wavelength dispersion of optical fiber 255. Nonlinearity generated depending on the intensity of the optical input power to optical fiber 255 is adopted to compensate for the wavelength dispersion by changing an optical power of a laser light. Through this nonlinearity, an optical pulse passing through optical fiber 255 is subject to compression or expansion. Therefore, the influence of the dispersion of a main signal light can be adjusted by changing an optical output power.

As a result, when a main signal output from a main signal generation unit 254 is transmitted through optical fiber 255 to a main signal detection unit 258, the wavelength dispersion generated during the transmission through optical fiber 255 can be compensated for, thereby realizing a super-high-speed optical transmission.

Thus, the dispersion compensation can be performed in a transmission line by adjusting an optical output power. As a result, a small, light, and inexpensive dispersion compensation apparatus can be realized by reducing the number of parts required in the dispersion compensation.

The dispersion compensation of optical fiber 255 can be performed with high precision by providing a dispersion compensator 257 in the transmission line, approximately performing the dispersion compensation of optical fiber 255 through dispersion compensator 257, and then changing the optical output power of the laser light output from main signal generation unit 254.

The dispersion compensation of optical fiber 255 can be performed by changing the optical output power of a laser light output from main signal generation unit 254, and also by simultaneously changing the wavelength of the laser light output from main signal generation unit 254.

FIG. 25(B) is a diagram illustrating a dispersion compensation apparatus applied to a multiple-repeater transmission system, according to an embodiment of the present invention.

Referring now to FIG. 25(B), laser light emitted from a laser diode 261 is input to LiNbO$_3$ modulator 262 and, simultaneously, a pulse signal generated by a pulse generator 263 is input to LiNbO$_3$ modulator 262. For example, pulse generator 263 drives LiNbO$_3$ modulator 262 on one side only, and sets the driving voltage Vin to double the half-wavelength voltage V$\pi$.

Thus, by inputting only one pulse signal, two optical pulses are output from LiNbO$_3$ modulator 262, and a wavelength chirping is generated corresponding to the increment ratio of the pulse signal, thereby producing the different wavelengths of the optical pulses output from LiNbO$_3$ modulator 262, and thereby easily facilitating dispersion measurement.

The two optical pulses output from LiNbO$_3$ modulator 262 are input to and transmitted through an optical fiber 265, and then amplified in a repeater 266. The optical pulses amplified in repeater 266 are input to and transmitted through an optical fiber 267, and then amplified by repeater 268. The optical pulses amplified by repeater 268 are detected by a detector 269. The pulse interval d+$\Delta$d of the optical pulses after the transmission through optical fibers 265 and 267 is measured, and compared with the pulse interval d of the optical pulses before the transmission through optical fibers 265 and 267 in order to compute the change $\Delta$d of the pulse interval. As a result, the wavelength dispersion of optical fibers 265 and 267 is obtained by Equation (12) based on the change $\Delta$d of the pulse interval.

Detector 269 outputs the wavelength dispersion detection result to an optical power control unit 272. Optical power control unit 272 changes the optical power of the laser light output from a main signal generation unit 264 according to the wavelength dispersion detection result output from detector 269, and thereby compensates for the wavelength dispersion of optical fibers 265 and 267. Nonlinearity generated depending on the intensity of the optical input power to optical fibers 265 and 267 is adopted to compensate for the wavelength dispersion by changing an optical power of a laser light. Through the nonlinearity, an optical pulse passing through optical fibers 265 and 267 is subject to compression or expansion. Therefore, the influence of the dispersion of a main signal light can be adjusted by changing an optical output power.

As a result, when a main signal output from main signal generation unit 264 is transmitted through optical fibers 265 and 267 to a main signal detection unit 271, the loss caused during the transmission can be compensated for by repeaters 266 and 268, and the wavelength dispersion generated during the transmission can be compensated for, thereby realizing a super-high-speed and long-distance optical transmission.

The dispersion compensation of optical fibers 265 and 267 can be performed with high precision by providing a dispersion compensator 270 in the transmission line, approximately performing the dispersion compensation of optical fibers 265 and 267 through dispersion compensator 270, and changing the optical output power of the laser light output from main signal generation unit 264.

The dispersion compensation of optical fibers 265 and 267 can be performed by changing the optical output power of the laser light output from main signal generation unit 264, and also by simultaneously changing the wavelength of the laser light output from main signal generation unit 264.

Figure 26:
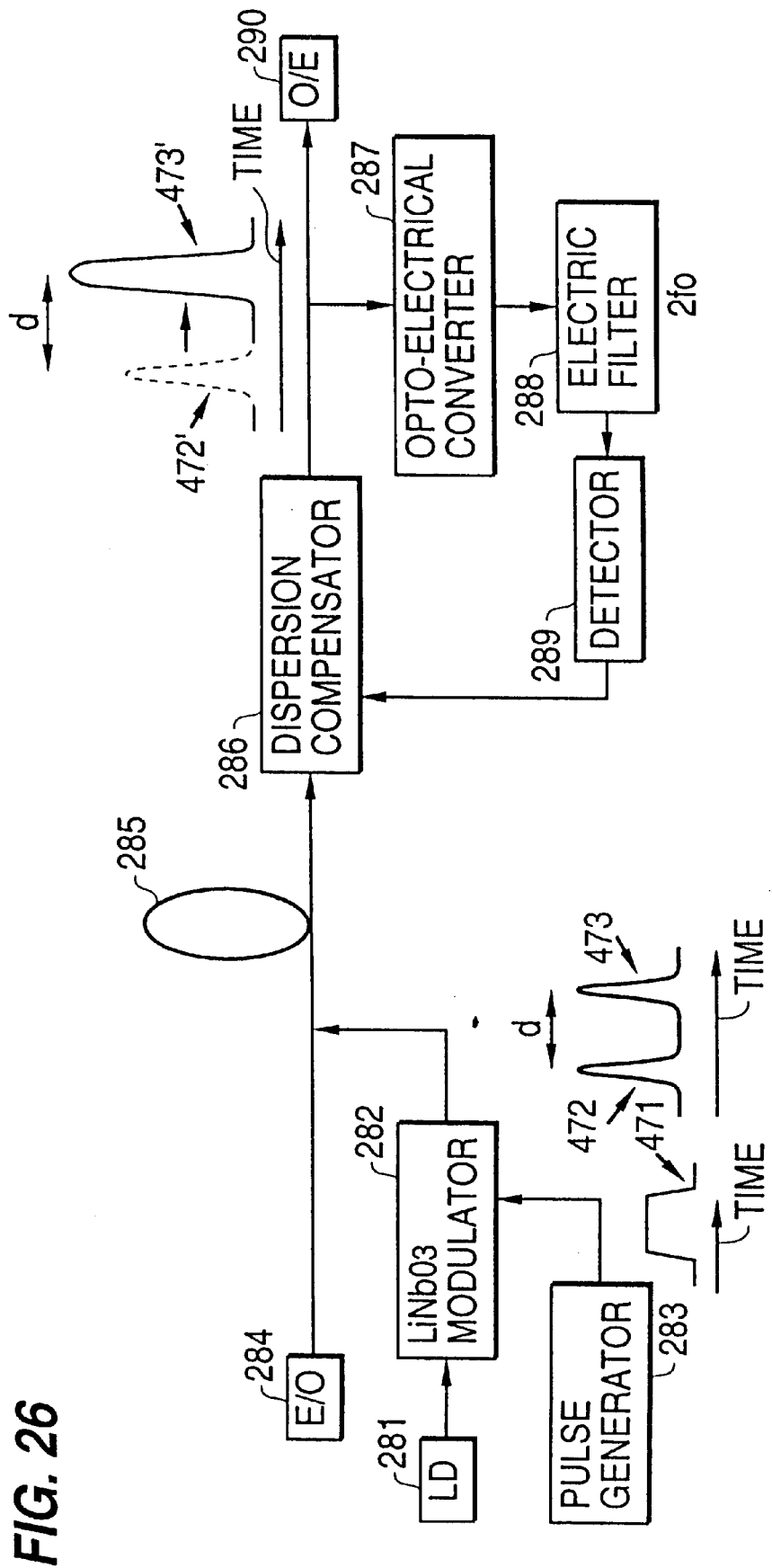
FIG. 26 is a diagram illustrating a dispersion compensation apparatus, according to an additional embodiment of the present invention.

FIG. 26 is a diagram illustrating a dispersion compensation apparatus, according to an additional embodiment of the present invention. The dispersion compensation apparatus in FIG. 26 constantly sets the amount of dispersion compensation to an optimum value by comparing the spectrum elements of a pulse string before and after the transmission.

Referring now to FIG. 26, laser light emitted from a laser diode 281 is input to LiNbO$_3$ modulator 282 and, simultaneously, a pulse signal 471 generated by a pulse generator 283 is input to LiNbO$_3$ modulator 282. For example, pulse generator 283 drives LiNbO$_3$ modulator 282 on one side only, and sets the driving voltage Vin to double the half-wavelength voltage V$\pi$.

Thus, by providing only one pulse signal 471, two optical pulses 472 and 473 are output from LiNbO$_3$ modulator 282, and a wavelength chirping is generated corresponding to the increment ratio of pulse signal 471, thereby producing the different wavelengths of optical pulses 472 and 473 output from LiNbO$_3$ modulator 282.

Optical pulses 472 and 473 output from LiNbO$_3$ modulator 282 are input to an optical fiber 285. Optical pulse 472' transmitted through optical fiber 285 can be incorporated into optical pulse 473' by adjusting the time interval between optical pulses 472 and 473. Therefore, assuming that the frequency element of optical pulses 472 and 473 before the transmission is 2f0, the frequency element of optical pulse 473' after the transmission through optical fiber 285 is f0.

Optical pulse 473' is converted into an electric signal by an opto-electrical converter 287, and a signal of a frequency element 2f0 is extracted through an electric filter 288 and output to a detector 289. Then, the wavelength dispersion of optical fiber 285 can be obtained by reading the time interval d when the detected signal is only a signal of the frequency element f0 and the frequency element 2f0 becomes 0.

Detector 289 compares the spectrum element 2f0 of the pulse string extracted through electric filter 288 with the spectrum element 2f0 of the pulse string before transmission, and sets the amount of dispersion compensation such that these spectrum elements constantly match each other. Dispersion compensator 286 compensates a dispersion value generated through optical fiber 285 based on the amount of dispersion compensation output by detector 289. As a result, when a main signal output from a main signal generation unit 284 is transmitted through optical fiber 285 to a main signal detection unit 290, the wavelength dispersion generated during the transmission through optical fiber 285 can be compensated for by dispersion compensator 286, thereby realizing a super-high-speed optical transmission.

FIG. 27(A) is a diagram illustrating a dispersion compensation apparatus, according to an embodiment of the present invention. The dispersion compensation apparatus in FIG. 27(A) determines the amount of dispersion compensation from the measured dispersion value to allow an operator to manually change the amount of dispersion compensation. This method is applicable when the system is started or when the measurement is periodically performed.

Referring now to FIG. 27(A), laser light emitted from a laser diode 301 is input to LiNbO$_3$ modulator 302 and, simultaneously, a pulse signal generated by a pulse generator 303 is input to LiNbO$_3$ modulator 302. For example, pulse generator 303 drives LiNbO$_3$ modulator 302 on one side only, and sets the driving voltage Vin to double the half-wavelength voltage V$\pi$.

Thus, by providing only one pulse signal, two optical pulses are output from LiNbO$_3$ modulator 302, and a wavelength chirping is generated corresponding to the increment ratio of the pulse signal, thereby producing the different wavelengths of the optical pulses output from LiNbO$_3$ modulator 302.

The two optical pulses output from LiNbO$_3$ modulator 302 are input to an optical fiber 305, and the optical pulses obtained through optical fiber 305 are detected by a detector 306. The pulse interval d+$\Delta$d between the optical pulses after the transmission through optical fiber 305 is measured, and compared with the pulse interval d of the optical pulses before the transmission through the optical fiber 305 in order to compute the change $\Delta$d of the pulse interval. As a result, the wavelength dispersion of optical fiber 305 is obtained by Equation (12) based on the change $\Delta$d of the pulse interval.

Detector 306 outputs the wavelength dispersion detection result to a manually-setting unit 309. Manually-setting unit 309 allows the amount of dispersion compensation of a dispersion compensator 307 to be manually set based on the wavelength dispersion detection result output from detector 306. Dispersion compensator 307 compensates for the wavelength dispersion of optical fiber 305 based on the amount of dispersion compensation set by manually-setting unit 309. As a result, when a main signal output from a main signal generation unit 304 is transmitted through optical fiber 305 to a main signal detection unit 308, the wavelength dispersion generated during the transmission through optical fiber 305 can be compensated by dispersion compensator 307, thereby realizing a super-high-speed optical transmission.

FIG. 27(B) is a diagram illustrating a dispersion compensation apparatus, according to a further embodiment of the present invention. The dispersion compensation apparatus in FIG. 27(B) determines the amount of dispersion compensation from a measured dispersion value, and automatically changes the amount of dispersion compensation.

Referring now to FIG. 27(B), laser light emitted from a laser diode 311 is input to LiNbO$_3$ modulator 312 and, simultaneously, a pulse signal generated by a pulse generator 313 is input to LiNbO$_3$ modulator 312. For example, pulse generator 313 drives LiNbO$_3$ modulator 312 on one side only, and sets the driving voltage Vin to double the half-wavelength voltage V$\pi$.

Thus, by inputting only one pulse signal, two optical pulses are output from LiNbO₃ modulator 312, and a wavelength chirping is generated corresponding to the increment ratio of the pulse signal, thereby producing the different wavelengths of the optical pulses output from LiNbO₃ modulator 312.

The two optical pulses output from LiNbO₃ modulator 312 are input to an optical fiber 315, and the optical pulses obtained through optical fiber 315 are detected by a detector 316. The pulse interval d+Δd between the optical pulses after the transmission through optical fiber 315 is measured, and compared with the pulse interval d of the optical pulses before the transmission through optical fiber 315 in order to compute the change Δd of the pulse interval. As a result, the wavelength dispersion of optical fiber 315 is obtained by Equation (12) based on the change Δd of the pulse interval.

Detector 316 outputs the wavelength dispersion detection result to an automatically-setting unit 319. Automatically-setting unit 319 allows the amount of dispersion compensation of a dispersion compensator 317 to be automatically set based on the wavelength dispersion detection result output from detector 316. Dispersion compensator 317 compensates the wavelength dispersion of optical fiber 315 based on the amount of dispersion compensation set by automatically-setting unit 319.

As a result, when a main signal output from a main signal generation unit 314 is transmitted to a main signal detection unit 318 through optical fiber 315, the wavelength dispersion generated during the transmission through optical fiber 315 can be compensated for by dispersion compensator 317 in real time, thereby stably realizing a super-high-speed transmission. Furthermore, using a CPU, etc, system management of such as the measurement of a dispersion value, the setting of dispersion compensation, etc. can be performed.

Figure 28:
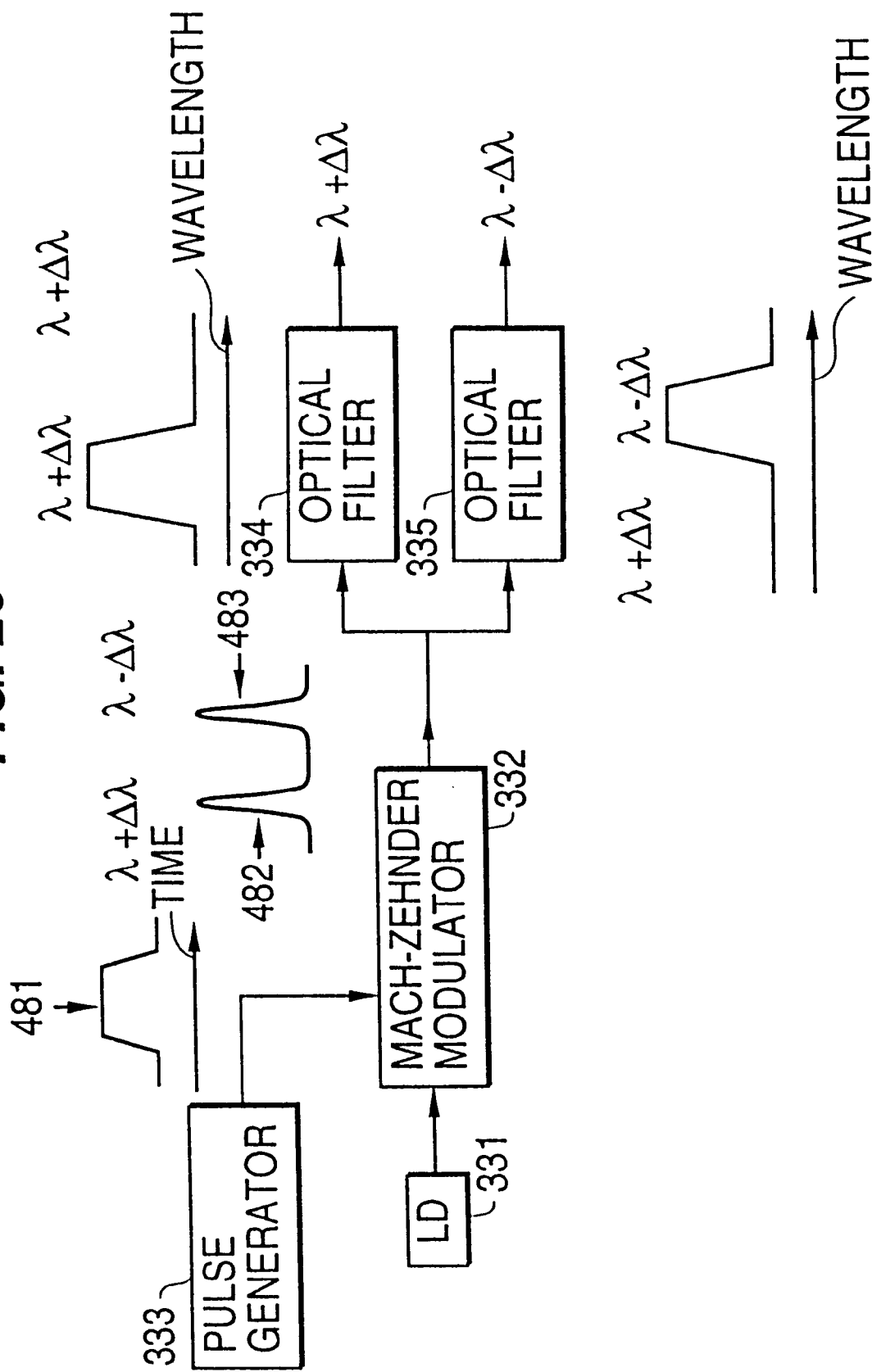
FIG. 28 is a diagram illustrating an optical pulse generation apparatus, according to an embodiment of the present invention.
Figure 29A:
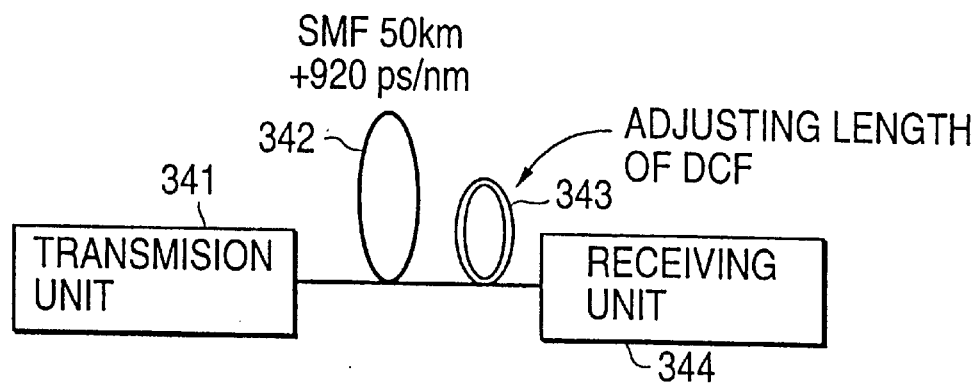
FIGS. 29(A) (prior art) and 29(B) are diagrams illustrating an experiment result indicating the size of dispersion compensation tolerance at a transmission speed of 40 Gb/s.
Figure 29B:
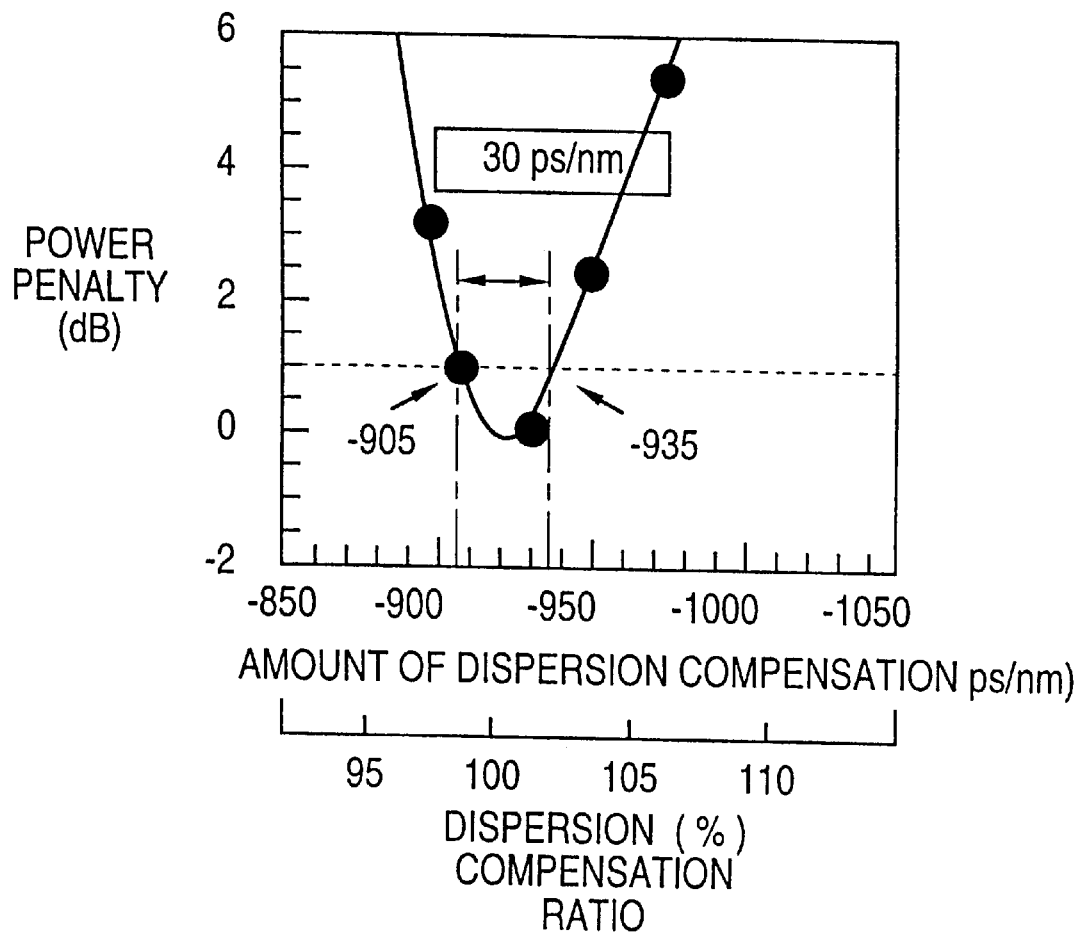
Figure 30A:
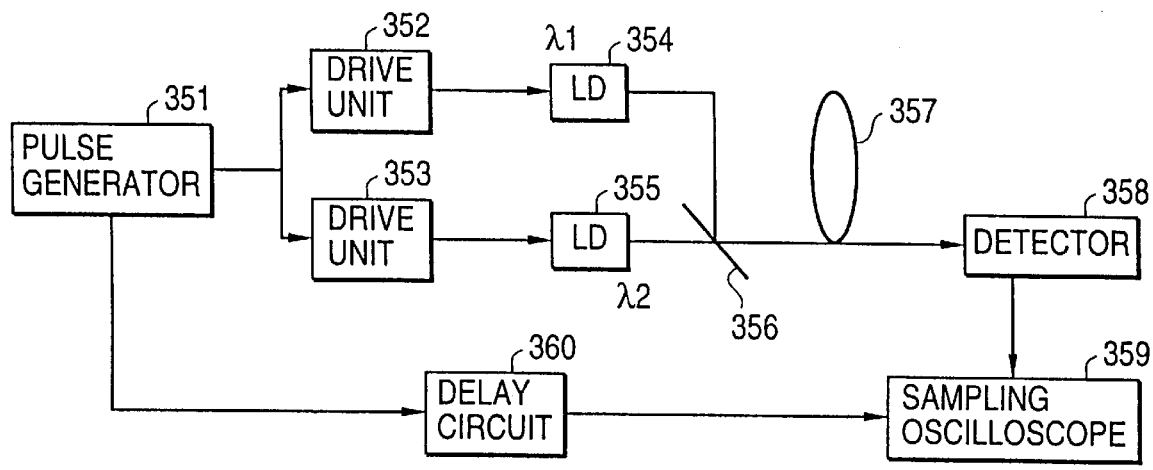
FIGS. 30(A) and 30(B) (prior art) are diagrams illustrating conventional dispersion measurement apparatuses.
Figure 30B:
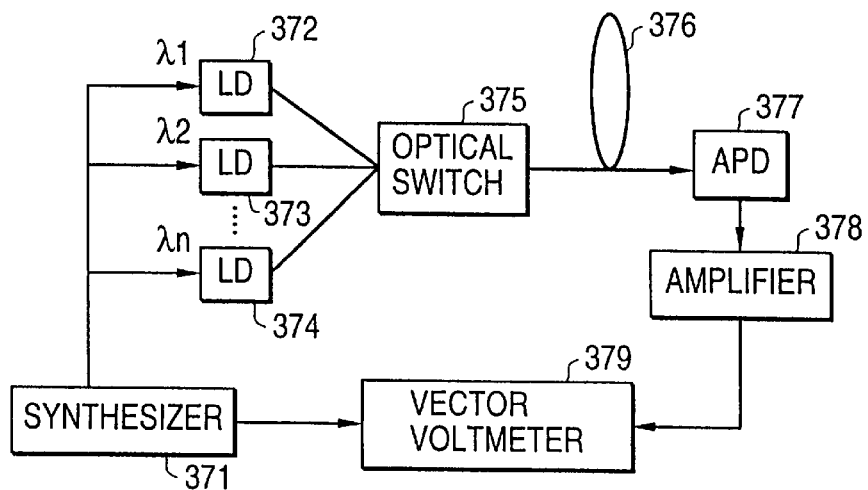

FIG. 28 is a diagram illustrating an optical pulse generation apparatus, according to an embodiment of the present invention.

Referring now to FIG. 28, laser light having a wavelength λ emitted from a laser diode 331 is input to a Mach-Zehnder modulator 332 and, simultaneously, a pulse signal 481 generated by a pulse generator 333 is input to Mach-Zehnder modulator 332. For example, pulse generator 333 drives Mach-Zehnder modulator 332 on one side only, and sets the driving voltage Vin to double the half-wavelength voltage Vπ.

Thus, by providing only one pulse signal, two optical pulses 482 and 483 are output from Mach-Zehnder modulator 332, and a wavelength chirping Δλ is generated corresponding to the increment ratio of the pulse signal, thereby producing the different wavelengths of optical pulses 482 and 483 output from Mach-Zehnder modulator 332. Furthermore, the time interval of optical pulses 482 and 483 output from Mach-Zehnder modulator 332 can be optionally set by changing the pulse width of pulse signal 481 output from pulse generator 333.

Optical pulse 482 having a wavelength λ+Δλ and optical pulse 483 having a wavelength λ−Δλ output from Mach-Zehnder modulator 332 are input to optical filters 334 and 335. Optical filter 334 passes the light having the wavelength λ+Δλ and cuts off the light having the wavelength λ−Δλ. Optical filter 335 passes the light having the wavelength λ−Δλ and cuts off the light having the wavelength λ+Δλ. Therefore, optical pulse 482 having the wavelength λ+Δλ is output from optical filter 334, and optical pulse 483 having the wavelength λ−Δλ is output from optical filter 335. Thus, optical pulses 482 and 483 having different wavelengths can be separately processed.

Thus, optical pulses 482 and 483 output from Mach-Zehnder modulator 332 are used as two-wavelength light sources in wavelength-multiplexed transmission.

Optical pulses 482 and 483 output from Mach-Zehnder modulator 332 can be used as short-pulse light sources, and can be applied as wavelength light sources in a super-high-speed optical time demultiplexing (OTDM) transmission and Soliton transmission systems.

The present invention is not intended to be limited to the above described embodiments, and can be used in various applications within the technological concept of the present invention. For example, according to the above described embodiments of the present invention, optical pulses with different wavelengths are generated by generating wavelength chirping for the optical pulses output from a Mach-Zehnder modulator. The optical pulses can also be designed to match each other in wavelength. When a plurality of optical pulses matching each other in wavelength are generated, the phases of the lights passing through two optical waveguides of a Mach-Zehnder modulator are modulated at the same intensity but in opposite directions. As a result, the modulation can be performed without wavelength chirping, and the light source can be applied to optical time-demultiplexing transmission and Soliton transmission systems.

Furthermore, a differentiation value of a pulse signal for use in driving a Mach-Zehnder modulator can be changed for each pulse. Since the value of wavelength chirping can be variable, optical pulses having various wavelengths can be generated and a wavelength light source applicable for wavelength combining transmission can be obtained.

As described above, according to the above embodiments of the present invention, when a single pulse voltage is input to an optical modulator, a plurality of optical pulses can be output, and a short optical pulse can be output from a simple configuration by generating an optical pulse at the rise time of a driving voltage and generating an optical pulse also at the decay time of the driving voltage.

According to the above embodiments of the present invention, by generating wavelength chirping corresponding to the increment ratio of a driving voltage, it becomes possible to produce a difference between a wavelength of an optical pulse output when the driving voltage increases and a wavelength of an optical pulse output when the driving voltage decreases. That is, by inputting a single pulse voltage, a plurality of optical pulses having different wavelengths are output.

According to the above embodiments of the present invention, using a Mach-Zehnder modulator, optical output can be periodically changed with an increasing driving voltage, and by inputting a pulse voltage exceeding a half-wavelength voltage, a plurality of optical pulses are output. Furthermore, the wavelength of an optical pulse can be variable by generating a wavelength chirping corresponding to the increment ratio of a pulse voltage.

In addition, according to the above embodiments of the present invention, an LiNbO₃ modulator allows the external modulation to be efficiently performed. Further, a semiconductor modulator allows a laser diode and the Mach-Zehnder modulator to be easily integrated. Therefore, a dispersion measurement apparatus can be smaller and lighter-weight.

According to the above embodiments of the present invention, an optical filter separates a plurality of optical pulses having different wavelengths. This allows a short optical pulse having a single wavelength to be output from a system with a simple configuration, thereby easily providing an optical source for use in a super-high-speed optical transmission.

Moreover, according to the above embodiments of the present invention, a plurality of optical pulses can be output by modulating a split light at a voltage exceeding a half-wavelength voltage, and a wavelength chirping can be generated corresponding to the increment ratio of the voltage input from the drive signal input unit. Also, a voltage exceeding a half-wavelength voltage can be input to one electrode to modulate the phase of the split light at different modulation efficiencies. Thus, a single light source can generate a plurality of optical pulses having different wavelengths.

According to the above embodiments of the present invention, a plurality of light pulses having different wavelengths can be input from the transmission or receiving side of a transmission line, and the transmitted light pulses are detected on the receiving or transmission side of the transmission line. As a result, optical pulses can be easily input to a transmission line without having any influence on a main signal transmitted through the transmission line, and can also be easily retrieved from the transmission line after the transmission.

According to the above embodiments of the present invention, the amount of dispersion generated in a transmission line can be increased by looping back optical pulses. To loop back the optical pulses, a loopback unit can be positioned on the transmission or receiving side of a transmission line. With this configuration, the dispersion in the transmission line can be detected with high precision even when the dispersion in the transmission line is low, and an optical pulse generation apparatus and a detection apparatus can be positioned at the same point, thereby facilitating the design of the optical pulse generation apparatus and the detection apparatus as a single structure and realizing a compact configuration for a dispersion measurement system.

According to the above embodiments of the present invention, generating optical pulses for dispersion measurement from a part of a main signal light enables a light source to be shared between a main signal and dispersion measurement system, thereby realizing a smaller and lighter-weight dispersion measurement system.

According to the above embodiments of the present invention, light sources are individually provided for a main signal and dispersion measurement system. This eliminates any influence from the main signal when the dispersion measurement is performed.

Moreover, according to the above embodiments of the present invention, the wavelength of the light for a main signal is different from the wavelength of the light for dispersion measurement. Thus, the light of the main signal can be easily removed using an optical filter even when the light of the main signal is detected during the dispersion measuring process, thereby allowing the light for the dispersion measurement to be solely extracted.

Moreover, according to the above embodiments of the present invention, by performing dispersion compensation based on a result of transmitting a plurality of optical pulses having different wavelengths generated from a single light source, a single light source provided in a transmission line allows dispersion compensation to be performed in the transmission line using a system with a simple configuration.

According to the above embodiments of the present invention, a dispersion compensation unit is provided on the transmission or receiving side of a transmission line or in a repeater. As a result, an optical pulse generation apparatus, a detection apparatus, and a dispersion compensation unit can be positioned at the same point, thereby facilitating the design of the optical pulse generation apparatus, the detection apparatus, and the dispersion compensation unit as a single structure, and realizing a compact configuration for a dispersion measurement system.

According to the above embodiments of the present invention, an amount of dispersion compensation can be variable. Thus, dispersion compensation in a transmission line can be performed with high precision not only when a dispersion value for a transmission line is computed when a system is started, but also when a dispersion value for the transmission line is measured in real time while the transmission line is being used. As a result, the optical transmission can be performed at a higher speed.

According to the above embodiments of the present invention, the wavelength of a main signal is changed depending on the amount of dispersion in a transmission line. Therefore, the dispersion compensation can be performed in the transmission line only by adjusting the wavelength of a light source. As a result, the number of units required when the dispersion compensation is performed can be reduced, thereby realizing a smaller, lighter-weight and inexpensive dispersion compensation system.

According to the above embodiments of the present invention, the output power of a main signal light can be varied depending on the amount of dispersion in a transmission line. Since the optical pulses transmitted through a transmission line can be compressed of extended based on the nonlinearity of the output power of the main signal light, the influence of the dispersion on the light of the main signal can be reduced.

Moreover, according to the above embodiments of the present invention, dispersion compensation in a transmission line is performed in such a way that the frequency elements before and after transmission match each other. As a result, the dispersion compensation in the transmission line can be easily realized.

According to the above embodiments of the present invention, an optical modulation unit increases/decreases optical output with an increasing driving voltage. Thus, only increasing a driving voltage causes an optical pulse to be output. Furthermore, only decreasing a driving voltage also causes an optical pulse to be output. As a result, when a single pulse driving voltage is input, a plurality of optical pulses can be output, and a short optical pulse can be output from a system with a simple configuration.

According to the above embodiments of the present invention, a modulator is a Mach-Zehnder $LiNbO_3$ modulator. This allows a laser diode and the Mach-Zehnder modulator to be easily integrated, and a light source can be incorporated into the Mach-Zehnder modulator. Therefore, a dispersion measurement apparatus can become smaller and lighter-weight.

According to the above embodiments of the present invention, an optical filter separates a plurality of optical pulses having different wavelengths. This allows a short optical pulse having a single wavelength to be output from a system with a simple configuration, thereby easily generating an optical source for a super-high-speed optical transmission.

According to the above embodiments of the present invention, the wavelength of the light for a main signal is different from the wavelength of the light for dispersion measurement. Thus, the light of the main signal can be easily removed using an optical filter even when the light of the main signal is detected during the dispersion measuring process, thereby allowing the light for the dispersion measurement to be solely extracted.

According to the above embodiments of the present invention, a dispersion compensation unit is positioned on the transmission or receiving side of the transmission line or in a repeater. Thus, an optical pulse generation apparatus, a detection apparatus, and a dispersion compensation unit can be positioned at the same point, thereby facilitating the design of an optical pulse generation apparatus, the detection apparatus, and the dispersion compensation unit as a single structure, and realizing a compact configuration for a dispersion measurement system.

According to the above embodiments of the present invention, an amount of dispersion compensation can be manually or automatically varied. When manually varied, the dispersion compensation in a transmission line can be periodically performed. When automatically varied, the dispersion compensation in the transmission line can be performed in real time with high precision.

According to the above embodiments of the present invention, the wavelength of a main signal is changed depending on the amount of dispersion in a transmission line. Therefore, the amount of dispersion in the transmission line can be varied, and the dispersion compensation can be performed in the transmission line only by adjusting the wavelength of a light source. As a result, the number of units required when the dispersion compensation is performed can be reduced, thereby realizing a smaller, lighter-weight and inexpensive dispersion compensation system.

According to the above embodiments of the present invention, the output power of a main signal light can be varied depending on the amount of dispersion in a transmission line. Since the optical pulse transmitted through a transmission line can be compressed or extended based on the nonlinearity of the output power of the main signal light, the influence of the dispersion on the light of the main signal can be reduced.

According to the above embodiments of the present invention, optical pulses can be generated at predetermined intervals based on electric pulses of a predetermined frequency. The generated optical pulses are transmitted through a transmission line, and the transmitted optical pulses are converted into electric signals. Then, the dispersion compensation in the transmission line is performed in such a way that the frequency elements of the electric signals can refer to the predetermined frequency. Thus, the dispersion compensation in a transmission line can be easily realized.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus comprising:
   a splitter splitting an input light into a first light and a second light;
   a phase modulator modulating phases of the first and second lights with different modulation efficiencies in accordance with a drive voltage for driving the phase modulator; and
   a combiner combining the phase modulated first and second input lights, into a combined light, wherein
   the combined light is at an output power corresponding to an output power versus drive voltage characteristic curve indicating a periodic waveform with a corresponding half-wavelength voltage, $V\pi$, and
   the drive voltage for driving the phase modulator exceeds $V\pi$.

2. An optical modulator comprising:
   first, second, third and fourth waveguides, the first waveguide branching into the second and third waveguides, and the second and third waveguides combining into the fourth waveguide;
   a first electrode applying a voltage to the second waveguide;
   a second electrode applying a voltage to the third waveguide;
   a driving voltage generator generating a driving voltage applied to one of the group consisting of the first and second electrode, wherein
   the optical modulator has an output power versus drive voltage characteristic curve indicating a periodic waveform with a corresponding half-wavelength voltage, $V\pi$, and
   the drive voltage applied by the driving voltage generator exceeds $V\pi$.

3. An optical modulator as in claim 2, wherein the drive voltage applied by the driving voltage generator is substantially equal to $2V\pi$.

4. An apparatus comprising:
   a transmission line;
   a first optical modulator modulating a first light and providing the modulated first light to the transmission line;
   a second optical modulator modulating a second light and providing the modulated second light to the transmission line;
   an optical device retrieving the second light from the transmission line; and
   a dispersion computation device computing an amount of dispersion in the transmission from the retrieved second light.

5. An apparatus as in claim 4, wherein the optical device is an optical filter.

6. An apparatus as in claim 4, wherein the second optical modulator produces an optical output at a power level which increases and decreases in accordance with an increasing driving voltage for driving the optical modulator.

7. An apparatus as in claim 4, wherein the second optical modulator is a Mach-Zehnder modulator having a corresponding half-wavelength voltage, $V\pi$, and is driven with a pulse voltage exceeding $V\pi$.

8. An apparatus as in claim 7, wherein the second optical modulator is driven with a pulse voltage equal to $2V\pi$.

9. An apparatus as in claim 4, wherein the first and second lights are at different wavelengths.

10. An apparatus as in claim 4, wherein the first and second lights are at the same wavelength.

11. An apparatus as in claim 4, further comprising:
    a single light source producing both the first and second lights at the same wavelength.

* * * * *